US012739565B2

(12) United States Patent
Kim et al.

(10) Patent No.: US 12,739,565 B2
(45) Date of Patent: Sep. 15, 2026

(54) APPARATUS

(71) Applicant: LG Display Co., Ltd., Seoul (KR)

(72) Inventors: Taehyung Kim, Paju-si (KR); SeulKi Nam, Paju-si (KR); ImGeun Lee, Paju-si (KR); GyungBo Ha, Paju-si (KR); Nohwon Park, Paju-si (KR); Minjung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 399 days.

(21) Appl. No.: 18/218,176

(22) Filed: Jul. 5, 2023

(65) Prior Publication Data

US 2024/0015442 A1 Jan. 11, 2024

(30) Foreign Application Priority Data

Jul. 5, 2022 (KR) ........................ 10-2022-0082809
Dec. 29, 2022 (KR) ........................ 10-2022-0189184

(51) Int. Cl.

| | |
|---|---|
| ***H04R 7/04*** | (2006.01) |
| ***H04R 1/28*** | (2006.01) |
| ***H04R 1/32*** | (2006.01) |
| ***H04R 9/02*** | (2006.01) |
| ***H04R 9/04*** | (2006.01) |

(52) U.S. Cl.

CPC ........... *H04R 7/045* (2013.01); *H04R 1/2857* (2013.01); *H04R 1/323* (2013.01); *H04R 9/025* (2013.01); *H04R 9/046* (2013.01); *H04R 2499/15* (2013.01)

(58) Field of Classification Search

None

See application file for complete search history.

(56) References Cited

U.S. PATENT DOCUMENTS

| | | | | |
|---|---|---|---|---|
| 2016/0105740 | A1 | 4/2016 | Suzuki et al. | |
| 2017/0205858 | A1 * | 7/2017 | Wong .................. | H04R 1/2834 |
| 2019/0191240 | A1 | 6/2019 | Ham et al. | |
| 2020/0404213 | A1 | 12/2020 | Won et al. | |
| 2021/0026590 | A1 * | 1/2021 | Nam ...................... | B60K 35/26 |
| 2021/0345037 | A1 * | 11/2021 | Rhim ..................... | H04R 1/403 |
| 2022/0182743 | A1 | 6/2022 | Nam et al. | |

(Continued)

FOREIGN PATENT DOCUMENTS

| | | | |
|---|---|---|---|
| CN | 114286236 | A | 4/2022 |
| EP | 2999238 | A1 | 3/2016 |
| JP | 2021-018436 | A | 2/2021 |

(Continued)

OTHER PUBLICATIONS

Extended European Search Report issued Nov. 27, 2023 for counterpart European Patent Application No. 23182808.8.

(Continued)

*Primary Examiner* — Walter F Briney, III

(74) *Attorney, Agent, or Firm* — Morgan, Lewis & Bockius LLP

(57) ABSTRACT

An apparatus may include a vibration member, a supporting member at a rear surface of the vibration member, and a sound generating apparatus at a rear surface of the supporting member. The sound generating apparatus may be configured to output a first sound in a first direction and to output a second sound in a second direction different from the first direction.

10 Claims, 27 Drawing Sheets

(56) References Cited

U.S. PATENT DOCUMENTS

| | | | | |
|---|---|---|---|---|
| 2024/0015426 A1* | 1/2024 | Ikuma | ...................... | H04R 5/02 |

FOREIGN PATENT DOCUMENTS

| | | | |
|---|---|---|---|
| JP | 2021-174007 | A | 11/2021 |
| JP | 2022-091134 | A | 6/2022 |
| WO | 2022/138128 | A1 | 6/2022 |

OTHER PUBLICATIONS

Office Action dated Dec. 5, 2024 issued in corresponding Japanese Patent Application No. 2023-109845. (Note: WO 2022/138128 A1, JP 2021-174007 A, US 2020/0404213 A1, and US 2019/0191240 A1 cited in this JP Office Action were cited in prior IDSs).

Office Action issued Jul. 23, 2024 for Japanese Patent Application No. 2023-109845 (Note: US 2020/0404213 A1 & US 2019/0191240 A1 were cited in a prior IDS.).

Office Action dated Jun. 18, 2024 issued in corresponding Taiwanese Patent Application No. 112124753. (Note: US 2020/0404213 A1 and US 2019/0191240 A1 were previously cited).

* cited by examiner

511b: 511b1, 511b2 513c: 513c1, 513c2

APPARATUS

CROSS-REFERENCE TO RELATED APPLICATIONS

This application claims the benefit of and priority to Korean Patent Application No. 10-2022-0082809, filed on Jul. 5, 2022, and No. 10-2022-0189184 filed on Dec. 29, 2022, the entirety of each which is incorporated herein by reference for all purposes as if fully set forth herein.

BACKGROUND

Technical Field

The present disclosure relates to an apparatus and, more particularly, to an apparatus for outputting a sound.

Discussion of the Related Art

Such apparatuses as display apparatuses are equipped in electronic devices or home appliances, such as televisions (TVs), monitors, notebook computers, smartphones, tablet computers, electronic pads, wearable devices, watch phones, portable information devices, navigation devices, or automotive control display devices, or the like, and are used as a screen for displaying an image.

Display apparatuses may include a display panel for displaying an image and a sound apparatus for outputting a sound associated with the image.

However, in display apparatuses, because a sound output from a sound apparatus may travel in a rearward or downward direction of the display panel, sound quality may be degraded due to an interference between sound waves reflected from walls and the ground. For this reason, it may be difficult to transfer an accurate sound, and an immersion experience of a viewer may be reduced.

SUMMARY

Therefore, the inventors of the present disclosure have recognized problems of the apparatuses described above and have performed experiments so that, when a user in front of a vibration member (or a display member, or a display module, or a passive vibration member) is watching an image, a traveling direction of a sound is toward a front surface of the vibration member, and the sound quality is thus enhanced. Through the extensive research and experiments, the inventors of the present disclosure have invented an apparatus having a new structure, which may generate a sound so that the sound travels toward a front surface of the vibration member, thereby enhancing the sound quality. One or more aspects of the present disclosure are directed to providing an apparatus which may vibrate a vibration member according to a sound generated based on a vibration (or driving) of a sound generating apparatus (or a vibration generating apparatus) configured on a rear surface of a supporting member (or a cover bottom) at a rear surface of the vibration member, thereby outputting a sound in a forward direction (or a front direction) of the vibration member.

One or more aspects of the present disclosure are directed to providing an apparatus in which a sound characteristic and/or a sound pressure level characteristic may be enhanced by a sound having a normal-phase component and a reverse-phase (or anti-phase) component generated based on a reverse-direction arrangement of a sound generating apparatus.

One or more aspects of the present disclosure are directed to providing an apparatus having a reverse-phase amplification hybrid radiation structure passing through a circuit cover (or a cover shield) covering a circuit part.

One or more aspects of the present disclosure are directed to providing an apparatus which may output a sound, generated based on a vibration of a sound generating apparatus through a sound path passing through a circuit cover (or a cover shield) covering a circuit part, in a vertical direction (or a downward direction and/or an upward direction) and a forward direction of a vibration member.

One or more aspects of the present disclosure are directed to providing an apparatus in which a sound characteristic and/or a sound pressure level characteristic of a sound band including a low-pitched sound band may be enhanced by a reverse-phase sound radiated through a lower end of a circuit cover (or a cover shield) and a normal-phase sound diffraction-radiated through an upper end of the circuit cover.

One or more aspects of the present disclosure are directed to providing an apparatus in which a sound having a reverse-phase component is radiated through a circuit cover and/or a hole of a supporting member, based on a reverse-direction arrangement of a sound generating apparatus, thereby enhancing a sound characteristic and/or a sound pressure level characteristic.

One or more aspects of the present disclosure are directed to providing an apparatus in which a first-phase sound and a second-phase sound, which is different from or opposite to the first-phase sound, are generated based on a vibration of a sound generating apparatus and are output (or radiated, emitted or discharged, or diffraction-radiated) in different directions, thereby enhancing a sound characteristic and/or a sound pressure level characteristic.

Additional features, advantages, and aspects of the present disclosure are set forth in part in the present disclosure and will also be apparent from the present disclosure or may be learned by practice of the inventive concepts provided herein. Other features, advantages, and aspects of the present disclosure may be realized and attained by the structure particularly pointed out in the present disclosure, or derivable therefrom, and claims hereof as well as the appended drawings.

To achieve these and other e aspects of the present disclosure, as embodied and broadly described herein, in one or more aspects, an apparatus may include a vibration member, a supporting member at a rear surface of the vibration member, and a sound generating apparatus at a rear surface of the supporting member. The sound generating apparatus may be configured to output a first sound in a first direction and to output a second sound in a second direction different from the first direction.

An apparatus according to one or more embodiments of the present disclosure may output a sound in a forward direction of a vibration member or a display panel.

An apparatus according to one or more embodiments of the present disclosure may improve sound quality and may increase an immersion experience of a viewer.

An apparatus according to one or more embodiments of the present disclosure may generate or output a sound in a forward direction of a display member using the display member including a display panel as a vibration plate.

An apparatus according to one or more embodiments of the present disclosure may enhance a sound characteristic and/or a sound pressure level characteristic of a sound.

An apparatus according to one or more embodiments of the present disclosure may enhance a sound characteristic and/or a sound pressure level characteristic of a sound of a low-pitched sound band.

In an apparatus according to one or more embodiments of the present disclosure, a sound generating apparatus may be arranged without being significantly limited by an arrangement structure of each of a flexible circuit film and/or a printed circuit board of a driving circuit. Thus, the degree of design freedom of a set cover (or a rear cover) may be enhanced.

In an apparatus according to one or more embodiments of the present disclosure, a rear design of a supporting member or a rear surface may be improved, and the degree of design freedom of a rear surface of a supporting member or a rear surface may be improved regardless of a structure of a sound generating apparatus.

In an apparatus according to one or more embodiments of the present disclosure, a sound characteristic and/or a sound pressure level characteristic of a sound may be enhanced through the recycling of reverse-phase sound energy or normal-phase sound energy.

In an apparatus according to one or more embodiments of the present disclosure, a sound of a high-pitched sound band may be reproduced by a vibration of a coil-type sound generating apparatus where a sound output of a low-pitched sound band is excellent, even without a separate sound apparatus (for example, a piezoelectric device) for outputting a sound of the high-pitched sound band.

In an apparatus according to one or more embodiments of the present disclosure, the assembling properties of a sound generating apparatus may be improved by assembling the sound generating apparatus with a display apparatus in a final assembly step of the display apparatus.

In an apparatus according to one or more embodiments of the present disclosure, a damper may be provided in a circuit cover. Thus, potential noise caused by a vibration of a sound generating apparatus may be reduced.

Other systems, methods, features, and advantages will be, or will become, apparent to one with skill in the art upon examination of the following figures and detailed description. It is intended that all such additional systems, methods, features, and advantages be included within this description, and be within the scope of the present disclosure. Nothing in this section should be taken as a limitation on the claims. Further aspects and advantages are discussed below in conjunction with aspects of the disclosure.

It is to be understood that both the foregoing description and the following description of the present disclosure are by way of example and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate aspects and embodiments of the disclosure and together with the description serve to explain principles of the disclosure.

Figure 1:
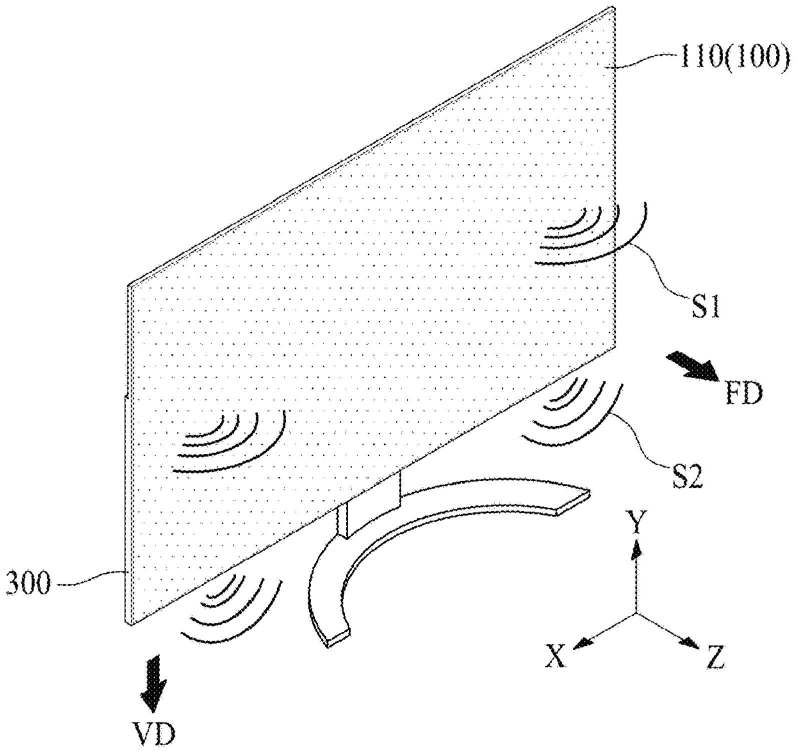
FIG. 1 illustrates an apparatus according to an example embodiment of the present disclosure.

Throughout the drawings and the detailed description, unless otherwise described, the same drawing reference numerals should be understood to refer to the same elements, features, or structures. The sizes, lengths, and thicknesses of layers, regions, and elements, and depiction thereof may be exaggerated for clarity, illustration, or convenience.

DETAILED DESCRIPTION

Reference is now made in detail to embodiments of the present disclosure, examples of which may be illustrated in the accompanying drawings. In the following description, where a detailed description of relevant known functions or configurations may unnecessarily obscure aspects of the present disclosure, a detailed description of such known functions or configurations may be omitted for brevity. The progression of processing steps and/or operations described is an example, and the sequence of steps and/or operations is not limited to that set forth herein and may be changed, with the exception of steps and/or operations necessarily occurring in a particular order.

Advantages and features of the present disclosure, and implementation methods thereof, are clarified through the following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to understand the inventive concepts fully without limiting the protected scope of the present disclosure.

The shapes, dimensions, areas, ratios, angles, numbers, and the like, which are illustrated in the drawings to describe various example embodiments of the present disclosure, are merely given by way of example. Therefore, the present disclosure is not limited to the illustrations in the drawings. Like reference numerals generally denote like elements throughout the specification, unless otherwise specified.

Where a term like "comprise," "have," "include," "contain," "constitute," "made up of" or "formed of" is used, one or more other elements may be added unless a more limiting term, such as "only" or the like, is used. The terms and names used in the present disclosure are merely used to describe particular embodiments and are not intended to limit the scope of the present disclosure. An element described in the singular form is intended to include a plurality of elements, and vice versa, unless the context clearly indicates otherwise.

The word "exemplary" is used to mean serving as an example or illustration, unless otherwise specified. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term "may" encompasses all the meanings of the term "can."

In describing a positional relationship where the positional relationship between two parts is described, for example, using "on," "over," "under," "above," "below," "beneath," "near," "close to," "adjacent to," "beside," "next to," "on a side of" or the like, one or more other parts may be located between the two parts unless a more limiting term, such as "immediate(ly)," "direct(ly)," or "close(ly)," is used. For example, where a structure is described as being positioned "on," "over," "under," "above," "below," "beneath," "near," "close to," "adjacent to," "beside," "next to" or "on a side of" another structure, this description should be construed as including a case in which the structures contact each other as well as a case in which one or more additional structures are disposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference, unless otherwise specified.

In describing a temporal relationship, where the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It will be understood that, although the term "first," "second," or the like may be used herein to describe various elements, these elements should not be limited by these terms, for example, to any particular order, precedence, or number of elements. These terms are only used to distinguish one element from another. For example, a first element could be termed a second element, and, similarly, a second element could be termed a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms “first,” “second,” “A,” “B,” “(a),” “(b),” or the like may be used. These terms are intended to identify the corresponding element(s) from the other element(s), and are not used to define the essence, basis, order, or number of the elements.

Where an element is described as “connected,” “coupled,” “attached,” or “adhered” to another element or layer, the element or layer can not only be directly connected, coupled, attached, or adhered to another element or layer, but also be indirectly connected, coupled, attached, or adhered to another element or layer with one or more intervening elements or layers disposed or interposed between the elements or layers, unless otherwise specified.

For the expression that an element or layer “contacts,” “overlaps,” or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

Such terms as a “line” or “direction” should not be interpreted only based on a geometrical relationship in which the respective lines or directions are parallel or perpendicular to each other. Such terms may mean a wider range of lines or directions within which the components of the present disclosure can operate functionally.

The term “at least one” should be understood as including any and all combinations of one or more of the associated listed items. For example, the meaning of “at least one of a first item, a second item, and a third item” encompasses the combination of all three listed items, combinations of any two the first item, the second item, and the third item, as well as any individual item, the first item, the second item, or the third item.

The expression of a first element, a second elements, “and/or” a third element should be understood to encompass one of the first, second, and third elements, as well as any and all combinations of the first, second and third elements. By way of example, A, B and/or C encompass only A; only B; only C; any combination of two of A, B, and C; and all of A, B, and C. Furthermore, an expression “element A/element B” may be understood as element A and/or element B.

In one or more aspects, the terms “between” and “among” may be used interchangeably simply for convenience unless stated otherwise. For example, an expression “between a plurality of elements” may be understood as among a plurality of elements. In another example, an expression “among a plurality of elements” may be understood as between a plurality of elements. In one or more examples, the number of elements may be two. In one or more examples, the number of elements may be more than two.

In one or more aspects, the phrases “each other” and “one another” may be used interchangeably simply for convenience unless stated otherwise. For example, an expression “different from each other” may be understood as different from one another. In another example, an expression “different from one another” may be understood as different from each other. In one or more examples, the number of elements involved in the foregoing expression may be two. In one or more examples, the number of elements involved in the foregoing expression may be more than two.

In one or more aspects, the phrases “one or more among” and “one or more of” may be used interchangeably simply for convenience unless stated otherwise.

In the present disclosure, a display apparatus may encompass a display module (or a display member) including a display panel and a driver for driving the display panel. The display module may also encompass a set device (or a set apparatus) or a set electronic device, such as a notebook computer, a television, a computer monitor, an equipment apparatus including an apparatus for vehicles, an automotive apparatus, or another type of apparatus for vehicles, or a mobile electronic device like a smartphone or an electronic pad, or the like, which is a complete product (or a final product) including a display module, such as a liquid crystal display module and a light emitting display module (for example, an organic light emitting display module), or the like.

Therefore, in the present disclosure, the display apparatus may encompass a display apparatus itself, such as a liquid crystal display module or an organic light emitting display module, or the like, and a set device which is a final consumer device or an application product including a liquid crystal display module, an organic light emitting display module, or the like.

A display panel used in one or more embodiments of the present disclosure may use all types of display panels, such as a liquid crystal display panel, an organic light emitting display panel, and a micro light emitting diode display panel, or the like, but embodiments of the present disclosure are not limited to any specific types of display panels. For example, the display panel may be a display panel capable of generating a sound by being vibrated by a vibration generating apparatus according to an embodiment of the present disclosure. A display panel applied to an apparatus or a display apparatus according to an embodiment of the present disclosure is not limited to a shape or a size of the display panel.

According to one or more embodiments of the present disclosure, where the display panel is a liquid crystal display panel, the display panel may include a plurality of gate lines and a plurality of data lines, and a plurality of pixels respectively provided at an intersection area of the plurality of gate lines and the plurality of data lines. Also, the display panel may include a first substrate including a thin film transistor (TFT) which is a switching element for adjusting a light transmittance of each of the plurality of pixels, a second substrate including a color filter and/or a black matrix, among other things, and a liquid crystal layer provided between the first substrate and the second substrate.

According to another embodiment of the present disclosure, where the display panel is an organic light emitting display panel, the display panel may include a plurality of gate lines and a plurality of data lines, and a plurality of pixels respectively provided at an intersection area of the plurality of gate lines and the plurality of data lines. And, the display panel may include, among other things, a substrate including a TFT which is an element for selectively applying a voltage to each of the plurality of pixels, an organic light emitting device layer on the substrate, and an encapsulation layer (or an encapsulation substrate) disposed on the substrate to cover the organic light emitting device layer. The encapsulation layer or substrate may protect the TFT and the organic light emitting device layer, among other things, from an external impact and may prevent water or oxygen from penetrating into the organic light emitting device layer. The organic light emitting device layer may include an inorganic light emitting layer (for example, a nano-sized material layer) and/or a quantum dot light emitting layer, or the like. In another embodiment of the present disclosure, instead of the organic light emitting device layer, an inorganic light emitting layer (for example, a nano-sized material layer) and/or a quantum dot light emitting layer, or the like may be used. In another embodiment of the present disclosure, instead of the organic light emitting device layer, a micro light emitting diode may be employed.

In the present disclosure, an apparatus including a vibration apparatus (or a vibration generating apparatus) may be applied to vehicles as a user interface apparatus, such as a central control panel or the like for automobiles. For example, the user interface apparatus for vehicles may be configured between two front seats so that a sound generated according to a vibration of the display module may be transmitted to the interior of a vehicle more broadly. Therefore, an audio experience in a vehicle may be improved in comparison with a case where speakers are disposed on interior sides of the vehicle.

Features of various embodiments of the present disclosure may be partially or wholly coupled to or combined with each other, and may be operated, linked, or driven together in various ways. Embodiments of the present disclosure may be carried out independently from each other, or may be carried out together in a co-dependent or related relationship. In one or more aspects, the components of each apparatus according to various embodiments of the present disclosure may be operatively coupled and configured.

Unless otherwise defined, the terms (including technical and scientific terms) used herein have the same meaning as commonly understood by one of ordinary skill in the art to which example embodiments belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. In addition, for convenience of description, a scale, dimension, size, and thickness of each of the elements illustrated in the accompanying drawings may be different from an actual scale, dimension, size, and thickness. Thus, embodiments of the present disclosure are not limited to a scale, dimension, size, or thickness illustrated in the drawings.

Figure 2:
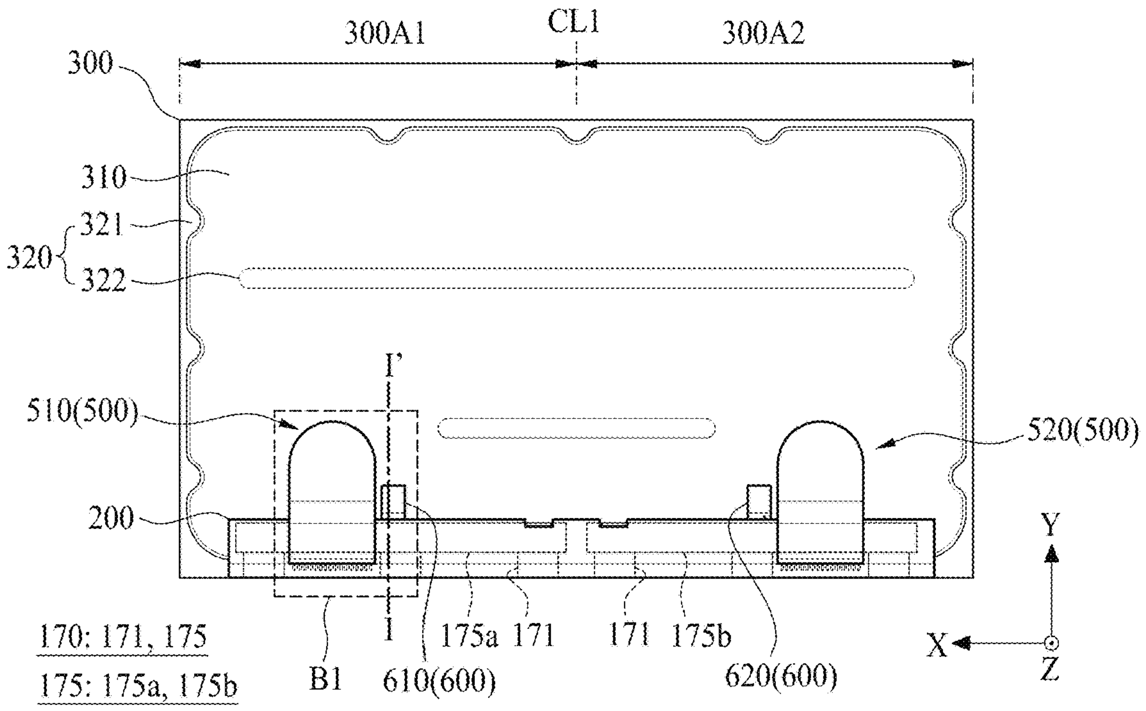
FIG. 2 is a rear view illustrating an apparatus according to an example embodiment of the present disclosure.
Figure 3:
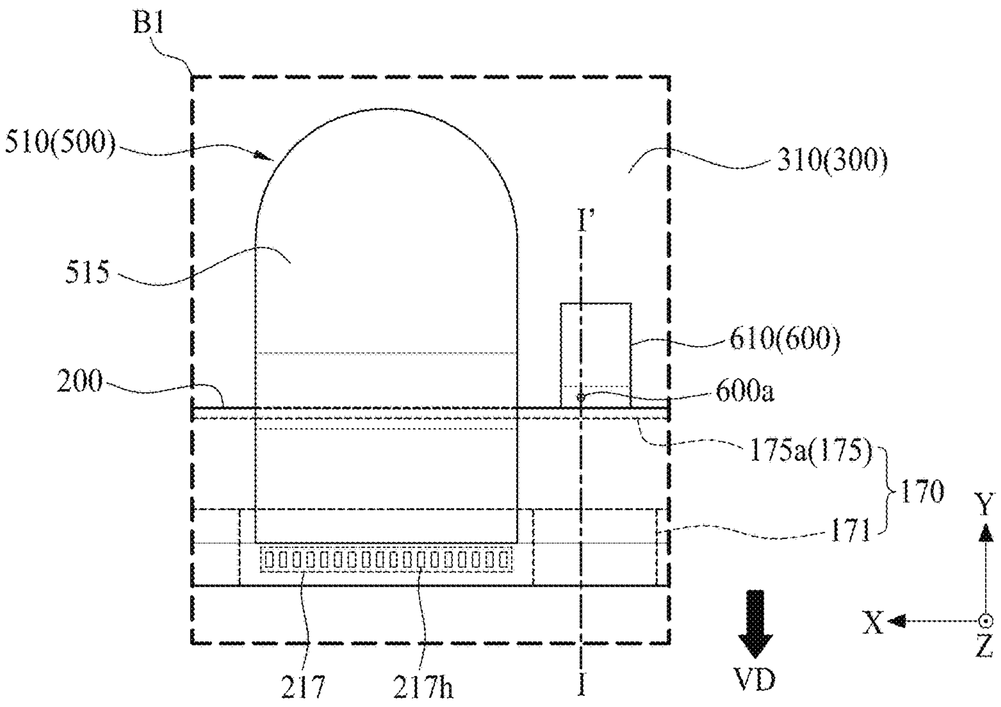
FIG. 3 is an enlarged view of a region 'B1' illustrated in FIG. 2 according to an example embodiment of the present disclosure.
Figure 4:
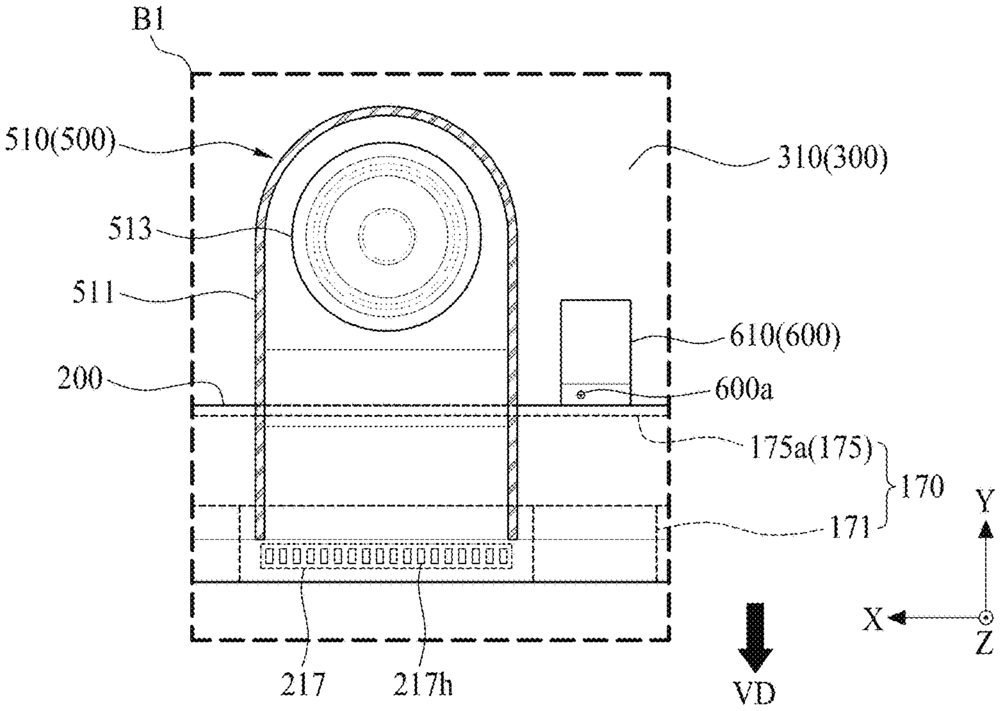
FIG. 4 illustrates a sound generator of a sound output apparatus illustrated in FIG. 3 according to an example embodiment of the present disclosure.

FIG. 1 illustrates an apparatus according to an example embodiment of the present disclosure. FIG. 2 is a rear view illustrating an apparatus according to an example embodiment of the present disclosure. FIG. 3 is an enlarged view of a region B1 illustrated in FIG. 2 according to an example embodiment of the present disclosure. FIG. 4 illustrates a sound generator of a sound output apparatus illustrated in FIG. 3 according to an example embodiment of the present disclosure. All the components of each apparatus according to all embodiments of the present disclosure are operatively coupled and configured.

With reference to FIGS. 1 and 2, an apparatus according to an example embodiment of the present disclosure may be a sound output apparatus or a display apparatus, but embodiments of the present disclosure are not limited thereto.

The display apparatus may include a display panel, which includes a plurality of pixels for displaying a black/white or color image, and a driver for driving the display panel. Each of the pixels may be a subpixel which implements one of a plurality of colors configuring a color image.

The apparatus according to an example embodiment of the present disclosure may include a vibration member 100, a supporting member 300, and a sound generating apparatus 500. For example, the apparatus according to an example embodiment of the present disclosure may include a vibration member 100, a supporting member 300 at a rear surface of the vibration member 100, and a sound generating apparatus 500 at a rear surface of the supporting member 300.

The vibration member 100 may be used as a vibration plate which generates or outputs one or more of a sound and a vibration. Accordingly, the vibration member 100 may be a display member, a display module, a display means, a vibration plate, a passive vibration plate, or a passive vibration member, but embodiments of the present disclosure are not limited thereto.

The vibration member 100 according to an example embodiment of the present disclosure may include a display panel 110 which displays an image. For example, the image may include an electronic image, a digital image, a still image, or a video image, or the like. For example, the display panel 110 may include a liquid crystal display panel having a plurality of pixels which implement a black/white or color image, but the kind of the display panel is not limited thereto. For example, the display panel 110 may be an organic light emitting display panel, an electrophoretic display panel, a micro light emitting diode display panel, an electrowetting display panel, an inorganic light emitting display panel, or a quantum dot light emitting display panel, or the like, but embodiments of the present disclosure are not limited thereto.

The supporting member 300 may be disposed at the rear surface of the vibration member 100. For example, the supporting member 300 may be configured to cover the rear surface of the vibration member 100. The supporting member 300 may include a rear part 310 which covers the rear surface of the vibration member 100. For example, the supporting member 300 may include a glass material, a plastic material, a metal material, or a stacked structure thereof, but embodiments of the present disclosure are not limited thereto. For example, the supporting member 300 may be a cover bottom, a rear structure, a back cover, a first structure, a housing, a rear cover, or a set cover, or the like, but embodiments of the present disclosure are not limited thereto.

The supporting member 300 (or the vibration member 100) may include a first region 300A1 and a second region 300A2. For example, the rear part 310 of the supporting member 300 may include the first region 300A1 and the second region 300A2. For example, the rear part 310 of the supporting member 300 may be divided into the first region 300A1 and the second region 300A2, with respect to a center line (or a first center line) CL1, may have a first length (or a horizontal length) parallel to a first direction X. For example, the first region 300A1 and the second region 300A2 may have the same size or different sizes at a rear part 310. For example, the first region 300A1 may be a first rear region, a left region, or a rear left region, and the second region 300A2 may be a second rear region, a right region, or a rear right region. For example, the first direction X may be a long-side lengthwise direction, a widthwise direction, or a horizontal direction of the apparatus or the supporting member 300, or an X-axis direction in an XYZ-coordinate system.

The supporting member 300 according to an example embodiment of the present disclosure may further include a reinforcement part 320. The reinforcement part 320 may be implemented to reinforce a stiffness of the supporting member 300. The reinforcement part 320 may be configured at the rear part 310 of the supporting member 300. For example, the reinforcement part 320 may be configured at one or more of a center portion and a periphery portion of the rear part 310. For example, the reinforcement part 320 may be a reinforcement pattern, a stiffness part, a stiffness reinforcement pattern, or a stiffness reinforcement part, but embodiments of the present disclosure are not limited thereto.

The reinforcement part 320 according to an example embodiment of the present disclosure may include a first reinforcement member 321. The first reinforcement member 321 may be disposed along a rear periphery portion of the supporting member 300. For example, the first reinforcement member 321 may be disposed along the periphery portion of the rear part 310 of the supporting member 300. For example, the first reinforcement member 321 may protrude in a direction from the periphery portion of the rear part 310 of the supporting member 300 to a rear surface of the supporting member 300 so as to have a predetermined height. The first reinforcement member 321 may reinforce the stiffness of the supporting member 300 or the stiffness of the rear part 310 of the supporting member 300, thereby preventing or reducing a bending phenomenon of the apparatus or the vibration member 100. For example, the first reinforcement member 321 may be a first reinforcement pattern, a first stiffness reinforcement pattern, a first stiffness reinforcement part, an edge reinforcement pattern, or a border reinforcement pattern, but embodiments of the present disclosure are not limited thereto.

The reinforcement part 320 according to an example embodiment of the present disclosure may further include one or more second reinforcement members 322. The one or more second reinforcement members 322 may be configured at a middle portion of the rear part 310 of the supporting member 300. For example, the one or more second reinforcement members 322 may be configured at the rear part 310 of the supporting member 300 in parallel with a first direction X. For example, the one or more second reinforcement members 322 may be configured in a line shape having a width parallel to a second direction Y intersecting with the first direction X and a length parallel to the first direction X, but embodiments of the present disclosure are not limited thereto. For example, the second direction Y may be a short-side lengthwise direction, a lengthwise direction, or a vertical direction of the apparatus or the supporting member 300, or a Y-axis direction in an XYZ-coordinate system. For example, the one or more second reinforcement members 322 may be a second reinforcement pattern, a second stiffness reinforcement pattern, a second stiffness reinforcement part, an auxiliary reinforcement pattern, or a secondary reinforcement pattern, but embodiments of the present disclosure are not limited thereto. For example, the one or more second reinforcement members 322 may be omitted.

According to an example embodiment of the present disclosure, the sound generating apparatus 500 may be configured at a rear surface of the supporting member 300. For example, the sound generating apparatus 500 may be configured at the rear surface of the rear part 310 of the supporting member 300. The sound generating apparatus 500 may be configured so that a first sound S1 and a second sound S2 generated based on a vibration (or driving) are output in different directions (for example, forward direction or first direction FD and vertical direction or second direction VD) with respect to the vibration member 100. For example, the sound generating apparatus 500 may be configured so that a sound (or a sound wave) generated by a vibration (or driving) based on a driving signal is output in a forward direction FD and a vertical direction VD of the vibration member 100. For example, the sound generating apparatus 500 may be referred to as a vibration generating apparatus, a sound wave generating apparatus, an active vibration apparatus, or an active vibration generating apparatus, or the like, but embodiments of the present disclosure are not limited thereto.

The sound generating apparatus 500 according to an example embodiment of the present disclosure may be configured to output the first sound S1, generated based on a vibration (or driving), in the forward direction FD of the vibration member 100 and to output the second sound S2, which is generated based on a vibration (or driving) and differs from the first sound S1, in the vertical direction VD of the vibration member 100. For example, the sound generating apparatus 500 may be configured to output the first sound S1, generated based on a vibration (or driving), in the forward direction FD of the vibration member 100 and to output the second sound S2, which is generated based on a vibration (or driving) and differs from the first sound S1, in a downward direction of the vibration member 100, but embodiments of the present disclosure are not limited thereto. For example, the sound generating apparatus 500 may be configured to output the second sound S2 in an upward direction or the downward direction of the vibration member 100. For example, the sound generating apparatus 500 may be configured to output the first sound S1, generated based on a vibration (or driving), in the forward direction FD of the vibration member 100 and to output the second sound S2 in a direction which differs from the forward direction FD of the vibration member 100, but embodiments of the present disclosure are not limited thereto. For example, the direction which differs from the forward direction FD may be a direction toward a front region and a vertical direction of the vibration member 100. For example, the first sound S1 may differ from the second sound S2. For example, the first sound S1 may have a phase which differs from that of the second sound S2. For example, the first sound S1 may have a first phase, and the second sound S2 may have a second phase which differs from the first phase. For example, the first sound S1 and the second sound S2 may have reverse phases. For example, the first sound S1 may have a reverse phase with respect to the second sound S2. For example, the first sound S1 may include a pitched sound band of about 100 Hz to about 3 kHz, but embodiments of the present disclosure are not limited thereto. For example, the second sound S2 may include a pitched sound band of about 100 Hz to about 20 kHz, but embodiments of the present disclosure are not limited thereto.

According to an example embodiment of the present disclosure, the first sound (or a sound wave) S1 generated based on a vibration (or driving) of the sound generating apparatus 500 may vibrate the supporting member 300. Thus, the first sound S1 generated by a vibration of the vibration member 100 based on a vibration of the sound generating apparatus 500 may be output in the forward direction FD of the vibration member 100. For example, the vibration member 100 may vibrate based on the first sound (or the sound wave) S1 generated by the vibration (or driving) of the sound generating apparatus 500 to output the first sound (or the sound wave) in the forward direction FD.

According to an example embodiment of the present disclosure, the second sound (or a sound wave) S2 generated based on the vibration (or driving) of the sound generating apparatus 500 may be output in the vertical direction VD of the vibration member 100 via an inner portion (or an inner sound path or a sound path) of the sound generating apparatus 500. For example, the vertical direction VD of the vibration member 100 may be a direction vertical to the forward direction FD of the vibration member 100. For example, the vertical direction VD of the vibration member 100 may be a direction which is parallel to the second direction Y and/or is vertical to the ground. For example, the sound generating apparatus 500 may be configured to output the second sound (or the sound wave) S2 in a vertical direction with respect to the ground. For example, the vertical direction VD of the vibration member 100 according to an example embodiment of the present disclosure may be a direction toward the ground from the vibration member 100 or may be a downward direction of the vibration member 100.

The sound generating apparatus 500 according to an example embodiment of the present disclosure may include a tetragonal shape, or a polygonal shape including a curved portion, but embodiments of the present disclosure are not limited thereto.

The sound generating apparatus 500 according to an example embodiment of the present disclosure may include a plurality of sound generating apparatuses 510 and 520. For example, the sound generating apparatus 500 may include first and second sound generating apparatuses (or first and second sound apparatuses) 510 and 520 which are respectively provided at the first region 300A1 and the second region 300A2 of the vibration member 100 (or supporting member 300), but embodiments of the present disclosure are not limited thereto. For example, the first region 300A1 and the second region 300A2 may each be a rear region of the vibration member 100 (or supporting member 300). For example, the first region 300A1 may be a left rear region of the vibration member 100 (or supporting member 300), but embodiments of the present disclosure are not limited thereto. For example, the second region 300A2 may be a right rear region of the vibration member 100 (or supporting member 300), but embodiments of the present disclosure are not limited thereto.

As shown in FIG. 2, only one first sound generating apparatus 510 and one second sound generating apparatus 520 are illustrated. However, a number of the first sound generating apparatus 510 and a number of the second sound generating apparatus 520 are not limited thereto. For example, the number of the first sound generating apparatus 510 is m, and the number of the second sound generating apparatus 520 is n, where m and n are integers greater than or equal to 1, respectively and m and n may be same or different. Meanwhile, each first sound generating apparatus 510 and each second sound generating apparatus 520 may have the same or basically the same structures, or may have different structures.

With reference to FIGS. 2 to 4, each of the first and second sound generating apparatuses 510 and 520 according to an example embodiment of the present disclosure may include a case member 511, a sound generator 513, and a sound guide member 515.

The case member 511 may be disposed at the rear surface of the supporting member 300. For example, the case member 511 may be disposed at the rear part 310 of the supporting member 300.

The sound generator 513 may be configured to output a sound (or a sound wave) generated by a vibration (or driving) based on the driving signal. For example, the sound generator 513 may be configured to output a sound (or a sound wave) in both directions (or an upward-downward direction or a forward-rearward direction) in (or along) a third direction Z. For example, the sound generator 513 may output a sound (or a sound wave) in the forward direction FD of the vibration member 100 and may simultaneously output a sound (or a sound wave) in a rearward direction opposite to the forward direction FD of the vibration member 100. For example, the third direction Z may be a thickness direction or a height direction of the vibration member 100, or may be a Z-axis direction in an XYZ coordinate system.

In this disclosure, directional indications, such as “front”, “rear” etc., are to be understood with respect to the display member (or the vibration member), e.g. “front” or “forward” may refer to a position or direction facing or towards a user watching content displayed on the display member (or the vibration member), while “rear” or “rearward” may be opposite thereto. Generally, the directional indications may be defined with respect to an orientation of the apparatus during intended use. A rear surface of the display member (or the vibration member) may denote a surface facing away from a surface of the display member (or the vibration member) on which content is displayed.

The sound generator 513 may include a front surface and a rear surface (or a backside surface). The front surface of the sound generator 513 may face a rearward direction of the apparatus. The rear surface of the sound generator 513 may face the supporting member 300. For example, the rear surface of the sound generator 513 may directly face the supporting member 300. For example, the sound generator 513 may have a reverse-direction arrangement structure with respect to the rear surface of the supporting member 300 or the rear surface of the apparatus. Therefore, sounds output respectively in a forward direction and a rearward direction of the sound generator 513 may have different phases, for example, reverse phases from each other. For example, the sound (or a forward sound) output in the forward direction of the sound generator 513 may have a normal-phase (or a positive-phase), and the sound (or a rearward sound) output in the rearward direction of the sound generator 513 may have a negative-phase or may have a reverse-phase with respect to the forward sound of the sound generator 513.

According to an example embodiment of the present disclosure, a sound (or a rearward sound of the sound generator 513) output in the forward direction FD of the vibration member 100 from the sound generator 513 may vibrate the supporting member 300. Thus, a sound generated by a vibration of the vibration member 100 based on a vibration of the supporting member 300 may be output as the first sound S1 in the forward direction FD of the vibration member 100.

The sound generator 513 may be disposed at the case member 511. The sound generator 513 may be configured to be supported by the case member 511 or accommodated into the case member 511. For example, the case member 511 may be configured to receive or accommodate the sound generator 513. The sound generator 513 may be disposed at the case member 511 so as to be spaced apart from the rear surface of the supporting member 300. For example, the case member 511 may be configured to space the sound generator 513 apart from the rear surface of the supporting member 300. For example, the sound generator 513 may be supported by the case member 511 or be accommodated into the case member 511 to have a reverse-direction arrangement structure with respect to the rear surface of the supporting member 300 or the rear surface of the apparatus.

The sound guide member (or a sound guide frame) 515 may be disposed at the case member 511 and may be configured to cover the sound generator 513. The sound guide member 515 may cover the sound generator 513 and may be configured to be spaced apart from the sound generator 513. A periphery portion of the sound guide member 515 may be connected or coupled to the case member 511. The sound guide member 515 may be configured to cover a portion of the reinforcement part 320 at the rear surface of the supporting member 300.

The sound guide member 515 may be configured to guide an output direction of the second sound S2 output from the sound generator 513. For example, the sound guide member 515 may be configured to guide a sound (or a forward sound), output from the sound generator 513, in the vertical direction VD of the vibration member 100.

The sound guide member 515 may be configured to include a sound adjustment surface for guiding the sound (or the forward sound of the sound generator 513), output from the sound generator 513, in the vertical direction VD of the vibration member 100. For example, the sound (or the forward sound) output to the guide member 515 from the sound generator 513 may be the second sound S2, and may moreover be diffracted by the sound adjustment surface and be output (or radiated) in the vertical direction VD of the vibration member 100. Thus, a sound characteristic and/or a sound pressure level characteristic of the low-pitched sound band of the second sound S2 may be enhanced.

The apparatus according to an example embodiment of the present disclosure may further include a circuit cover 200.

The circuit cover 200 may be connected to the vibration member 100 and may be configured to cover a driving circuit part 170 disposed at the rear surface of the supporting member 300. For example, the driving circuit part 170 may be at the rear surface of the supporting member 300 and may be connected to the vibration member 100. For example, the driving circuit part 170 may include a printed circuit board (PCB) 175 which is at the rear surface of the supporting member 300 and is connected to the vibration member 100. For example, the circuit cover 200 may be configured at the rear surface of the supporting member 300 to cover the driving circuit part 170 disposed at the rear surface of the supporting member 300. For example, the circuit cover 200 may be at the rear surface of the supporting member 300 and may cover the PCB 175. The driving circuit part 170 may be disposed at one periphery portion (or a lower periphery portion) of the supporting member 300. The circuit cover 200 may be disposed at one periphery portion (or the lower periphery portion) of the supporting member 300 and may be configured to cover the driving circuit part 170. For example, the driving circuit part 170 may be disposed at one periphery portion (or a lower periphery portion) of the rear part 310 of the supporting member 300. The circuit cover 200 may be disposed at one periphery portion (or a lower periphery portion) of the rear part 310 of the supporting member 300 and may be configured to cover the driving circuit part 170. For example, the circuit cover 200 may be a cover shield, a metal cover, a protection cover, or a circuit protection member, but embodiments of the present disclosure are not limited thereto.

The circuit cover 200 according to an example embodiment of the present disclosure may be disposed to overlap the sound generating apparatus 500. For example, the sound generating apparatus 500 may be configured at the rear surface of the supporting member 300 to overlap the circuit cover 200. For example, the sound generating apparatus 500 may be configured to output the second sound S2 by or via or through the circuit cover 200. For example, the sound generating apparatus 500 may be configured to overlap the rear surface of the supporting member 300 and the circuit cover 200. For example, a portion of the sound generating apparatus 500 may be configured at the rear part 310 of the supporting member 300 to overlap a portion of the circuit cover 200. For example, a portion of the sound generating apparatus 500 may be configured at the rear part 310 of the supporting member 300 to cover a portion of the circuit cover 200. Accordingly, a portion of a sound generated by the sound generating apparatus 500 may be output (or radiated) in the vertical direction VD of the vibration member 100 via a space (or a sound guide space) between the sound guide member 155 and the circuit cover 200. For example, a sound (or a forward sound) output from the sound generator 513 to the sound guide member 515 may be the second sound S2, and may moreover be diffracted in the space (or the sound guide space) between the sound guide member 155 and the circuit cover 200 and be output (or radiated) in the vertical direction VD of the vibration member 100.

According to an example embodiment of the present disclosure, a portion of the sound generated by the sound generating apparatus 500 may be output in the vertical direction VD of the vibration member 100 via or through or by an inner portion of the circuit cover 200. For example, a portion of the sound generated by the sound generating apparatus 500 may be output in the vertical direction VD of the vibration member 100 via a space (or a cover inner space) between the circuit cover 200 and the supporting member 300. For example, a portion of a sound (or a rearward sound of the sound generator 513) output from the sound generator 513 to the supporting member 300 may be output in the vertical direction VD of the vibration member 100 via the inner portion of the circuit cover 200. A portion of the sound (or the rearward sound of the sound generator 513) output from the sound generator 513 to the supporting member 300 may be output in the vertical direction VD of the vibration member 100 via a space (or an inner space) between the circuit cover 200 and the supporting member 300.

With reference to FIG. 3, the circuit cover 200 according to an example embodiment of the present disclosure may further include a hole part 217. The hole part 217 may be configured at the circuit cover 200 in a periphery of (or around) an end of the sound generating apparatus 500. The hole part 217 may be configured at the circuit cover 200 in a periphery of (or around) an end of the sound guide member 515 of the sound generating apparatus 500. The hole part 217 may include one or more holes 217*h* which pass through the circuit cover 200 along a thickness direction of the circuit cover 200. For example, the circuit cover 200 may include one or more holes 217*h* through which the second sound is output. For example, the hole part 217 may include a plurality of holes 217*h* which are disposed at a predetermined interval along the first direction X. For example, the hole part 217 may be a first hole, a vent hole, a through hole, a duct hole, a first sound hole, a first sound output port, or a first sound discharge portion, or the like, but embodiments of the present disclosure are not limited thereto.

According to an example embodiment of the present disclosure, a portion of the rearward sound generated by the sound generating apparatus 500 may be output in the vertical direction VD of the vibration member 100 through the hole part 217 of the circuit cover 200 and a space (or a cover inner space) between the circuit cover 200 and the supporting member 300. For example, a portion of the sound (or the rearward sound of the sound generator 513) output from the sound generator 513 to the supporting member 300 may be output in the vertical direction VD of the vibration member 100 through the hole part 217 of the circuit cover 200 and the space (or the cover inner space) between the circuit cover 200 and the supporting member 300. For example, the second sound S2 may be output in the vertical direction VD vertical to the forward direction FD of the vibration member 100 through the space (or the cover inner space) between the circuit cover 200 and the supporting member 300. For example, the second sound S2 may be output in the vertical direction VD vertical to the forward direction FD of the vibration member 100 through a space between the circuit cover 200 and the PCB 175. According to an example embodiment of the present disclosure, a sound (or a forward sound of the sound generator 513) output from the sound generator 513 to the sound guide member 515 may be the second sound S2 and may be output in the vertical direction VD of the vibration member 100 through a sound guide space (or a first sound path) between the sound guide member 515 and the circuit cover 200. A portion of a sound (or a rearward sound of the sound generator 513) output from the sound generator 513 to the supporting member 300 may be a portion of the second sound S2 and may be output in the vertical direction VD of the vibration member 100 through the hole part 217 and a cover inner space (or a second sound path) between the circuit cover 200 and the supporting member 300. For example, the second sound S2 output through the first sound path and a portion of a rearward sound output through the second sound path may be combined with each other or be amplified in a periphery of (or around) the hole part 217 and may be output in the vertical direction VD of the vibration member 100.

According to an example embodiment of the present disclosure, the second sound S2 output through the first sound path may have a frequency characteristic of a full pitched sound band. A portion of the rearward sound output through the second sound path may have a frequency characteristic of about 3 kHz or less. Accordingly, a portion (or sound energy) of a sound (or a rearward sound) which is generated based on a vibration of the sound generator 513 and is discharged (or emitted) to the supporting member 300 may be reused as a portion of the second sound S2 output in the vertical direction VD of the vibration member 100 through or by or via the second sound path. Thus, a sound characteristic and/or a sound pressure level characteristic of the apparatus may be enhanced or a sound characteristic and/or a sound pressure level characteristic of the second sound S2 may be enhanced.

With reference to FIGS. 2 to 4, the apparatus according to an example embodiment of the present disclosure may further include a damping member 600.

The damping member 600 may be configured at a periphery of (or around) the sound generating apparatus 500. For example, the damping member 600 may be connected to the circuit cover 200 at a periphery of (or around) the sound generating apparatus 500. The damping member 600 may be configured to decrease or absorb sound noise occurring when the sound generating apparatus 500 vibrates (or driven). For example, the damping member 600 may be configured to decrease or absorb sound noise occurring due to a vibration of the circuit cover 200 by a vibration (or driving) of the sound generating apparatus 500. For example, the damping member 600 may be a noise reduction part, a noise reduction member, a noise absorption member, a vibration absorption member, or a dynamic damping part, but embodiments of the present disclosure are not limited thereto.

The damping member 600 according to an example embodiment of the present disclosure may include a plurality of damping members 610 and 620. For example, the damping member 600 may include a first damping member 610 and a second damping member 620.

The first damping member 610 may be configured at a periphery of (or around) the first sound generating apparatus 510. For example, the first damping member 610 may be connected to one side of the circuit cover 200 at a periphery of (or around) the first sound generating apparatus 510. The second damping member 620 may be configured at a periphery of (or around) the second sound generating apparatus 520. For example, the second damping member 620 may be connected to one side of the circuit cover 200 at a periphery of (or around) the second sound generating apparatus 520. Each of the first damping member 610 and the second damping member 620 may be configured to decrease or absorb sound noise occurring due to a vibration of the circuit cover 200 based on a vibration (or driving) of the sound generating apparatus 500.

The damping member 600 according to an example embodiment of the present disclosure may further include a fastening member 600*a*. The damping member 600 may be disposed or secured at a periphery of the sound generating apparatus 500 by the fastening member 600*a*. For example, the rear part 310 of the supporting member 300 at a periphery of one lateral surface (or one side surface) of the sound generating apparatus 500 may be fixed to the fastening member 600*a*. For example, the damping member 600 may be fixed to the rear surface of the supporting member 300 by the fastening member (or a fixing member) 600*a*. For example, the damping member 600 may be connected to the circuit cover 200 by the fastening member 600*a* at the periphery of the sound generating apparatus 500.

As shown in FIG. 2, only one first damping member 610 and one second damping member 620 are illustrated. However, a number of the first damping member 610 and a number of the second damping member 620 are not limited thereto. For example, the number of the first damping member 610 may correspond to the number of the first sound generating apparatus 510 and the number of the second damping member 620 may correspond to the number of the second sound generating apparatus 520. Alternatively, the number of the damping member 600 may also be more than the number of the sound generating apparatus 500, for example, at the periphery of at least one the sound generating apparatus 500, two or more damping member 600 may disposed. For example, at the periphery of each first sound generating apparatus 510, one or more first damping member 610 may be disposed, and at the periphery of each second sound generating apparatus 520, one or more second damping member 620 may be disposed. Meanwhile, the number of the damping member 600 disposed at the periphery of each sound generating apparatus 500 may be same or different, the structure of the damping member 600 disposed at the periphery of each sound generating apparatus 500 may be same or different.

Figure 5:
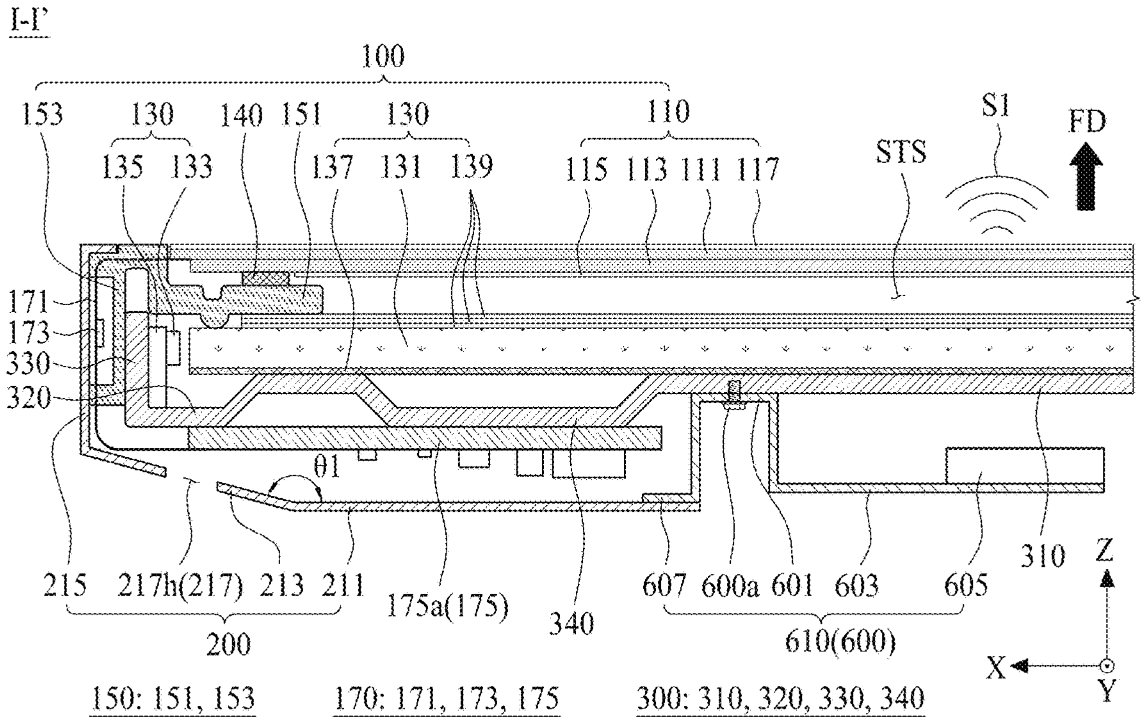
FIG. 5 is an example cross-sectional view taken along line I-I' illustrated in FIGS. 2 and 3 according to an example embodiment of the present disclosure.
Figure 6:
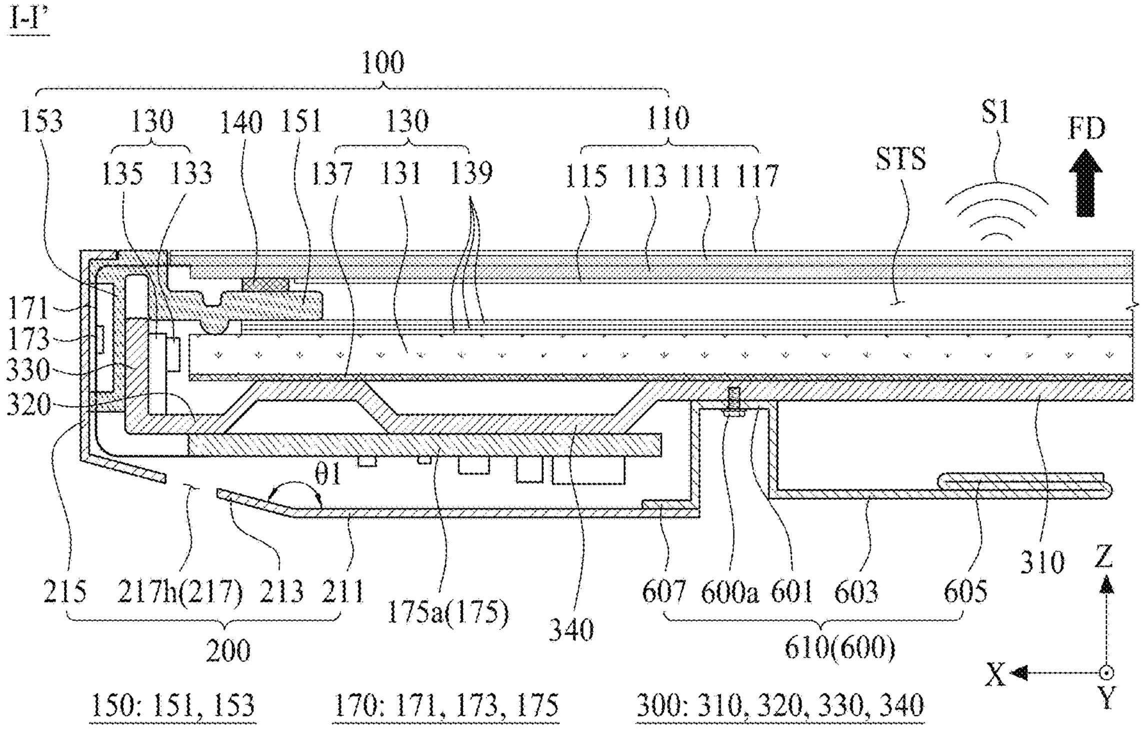
FIG. 6 is another example cross-sectional view taken along line I-I' illustrated in FIGS. 2 and 3 according to an example embodiment of the present disclosure.

FIG. 5 is an example cross-sectional view taken along line I-I' illustrated in FIGS. 2 and 3 according to an example embodiment of the present disclosure. FIG. 6 is another example cross-sectional view taken along line I-I' illustrated in FIGS. 2 and 3 according to an example embodiment of the present disclosure. FIGS. 5 and 6 illustrate an example structure of each of the vibration member, the supporting member, the driving circuit part, the circuit cover, and the damping part illustrated in FIGS. 1 and 2.

With reference to FIGS. 1-3 and 5, in the apparatus according to an example embodiment of the present disclosure, the vibration member 100 may include a display panel 110 and a guide panel 150.

The display panel 110 may be a liquid crystal display panel, but embodiments of the present disclosure are not limited thereto. For example, the display panel 110 may be an organic light emitting display panel, an electrophoretic display panel, a micro light emitting diode display panel, an electrowetting display panel, an inorganic light emitting display panel, a quantum dot light emitting display panel, or the like, but embodiments of the present disclosure are not limited thereto.

Where the display panel 110 is the liquid crystal display panel, the vibration member 100 may further include a backlight 130 disposed between the display panel 110 and the supporting member 300.

The display panel 110 according to an example embodiment of the present disclosure may include a first substrate 111, a second substrate 113, a first polarization member 115, and a second polarization member 117.

The first substrate 111 may be an upper substrate or a thin film transistor (TFT) array substrate and may include a pixel array (or a display portion or a display area) including a plurality of pixels which are respectively configured in a plurality of pixel areas provided by intersections of a plurality of gate lines and/or a plurality of data lines. Each of the plurality of pixels may include a TFT connected to a corresponding gate line and/or a corresponding data line, a pixel electrode connected to the TFT, and a common electrode which is provided adjacent to the pixel electrode and is supplied with a common voltage.

The first substrate 111 may further include a pad part which is provided at a first periphery (or a first non-display portion) and is connected to a panel driving circuit, and a gate driving circuit which is provided at a second periphery (or a second non-display portion) and is connected to the plurality gate lines.

The second substrate 113 may be a lower substrate or a color filter array substrate. The second substrate 113 may include a pixel opening pattern, including an opening region corresponding to each of the plurality of pixels provided at the first substrate 111, and a color filter layer provided at the opening region. The second substrate 113 may be bonded to a portion, other than a first periphery, of the first substrate 111 with a liquid crystal layer therebetween by a sealant.

The liquid crystal layer may be disposed or interposed between the first substrate 111 and the second substrate 113 and may include a liquid crystal layer including liquid crystal molecules, where an alignment direction thereof may be changed based on an electric field generated by the common voltage applied to a common electrode and a data voltage applied to a pixel electrode for each pixel.

The first polarization member 115 may be attached at a lower surface of the second substrate 113 and may polarize light which is incident from the backlight 130 and travels to the liquid crystal layer. The second polarization member 117 may be attached at an upper surface of the first substrate 111 and may polarize light which passes through the first substrate 111 and is output externally.

In the display panel 110 according to an example embodiment of the present disclosure, the liquid crystal layer may be driven based on an electric field which is generated in each pixel by the data voltage and the common voltage applied to each pixel. Thus, an image may be displayed based on light passing through the liquid crystal layer.

In the display panel 110 according to an example embodiment of the present disclosure, the first substrate 111 as the TFT array substrate may configure an image display surface. Thus, an entire front surface of the display panel 110 may be exposed externally without being covered by a separate mechanism.

In the display panel 110 according to another example embodiment of the present disclosure, the first substrate 111 may be configured as the color filter array substrate, and the second substrate 113 may be configured as the TFT array substrate. For example, the display panel 110 according to another example embodiment of the present disclosure may be a type where an upper portion and a lower portion of the display panel 110 illustrated in FIG. 5 are reversed. In this case, a pad part of the display panel 110 may be covered by a separate mechanism or a separate structure.

The substrate as the TFT array substrate may include glass, plastic, or a flexible polymer film. For example, the flexible polymer film may be made of any one of polyimide (PI), polyethylene terephthalate (PET), acrylonitrile-butadiene-styrene copolymer (ABS), polymethyl methacrylate (PMMA), polyethylene naphthalate (PEN), polycarbonate (PC), polyethersulfone (PES), polyarylate (PAR), polysulfone (PSF), or cyclic-olefin copolymer (COC), triacetylcellulose (TAC) film, polyvinyl alcohol (PVA) film, and polystyrene (PS), but embodiments of the present disclosure are not limited thereto.

The TFT may be manufactured using a polycrystalline semiconductor or an oxide semiconductor, but embodiments of the present disclosure are not limited thereto.

The oxide semiconductor may be made of a metal oxide such as zinc (Zn), indium (In), gallium (Ga), tin (Sn), or titanium (Ti) or a combination of a metal such as zinc (Zn), indium (In), gallium (Ga), tin (Sn), or titanium (Ti) and its oxide. Specifically, the oxide semiconductor may include zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO), but embodiments of the present disclosure are not limited thereto.

The backlight (or an illumination part or a backlight part or optical device) 130 may be disposed at a rear surface of the display panel 110 and may be configured to irradiate light onto the rear surface of the display panel 110.

The backlight 130 according to an example embodiment of the present disclosure may include a light guide plate 131, a light source part (or a light source member) 133, a reflective sheet (or a reflective member) 137, and an optical sheet part (or an optical member) 139, but embodiments of the present disclosure are not limited thereto.

The light guide plate (or a light guide frame or a light guide member) 131 may include a light input surface which is disposed (or accommodated) at the supporting member 300 to overlap the display panel 110 and is provided at one or more sides thereof. The light guide plate 131 may include a light-transmitting plastic or glass material, but embodiments of the present disclosure are not limited thereto. The light guide plate 131 may transfer (output) light, which is incident through the light input surface from the light source part 133, to the display panel 110.

The light source part 133 may irradiate light onto the light input surface provided at the light guide plate 131. The light source part 133 may be disposed (or accommodated) at the supporting member 300 to overlap a periphery portion of the display panel 110. The light source part 133 may include a plurality of light emitting diode devices which are mounted at a light-source printed circuit board 135 and each irradiate light onto the light input surface of the light guide plate 131.

The reflective sheet 137 may be disposed (or accommodated) at the supporting member 300 to cover a rear surface of the light guide plate 131. The reflective sheet 137 may reflect light, which is incident from the light guide plate 131, back to the light guide plate 131 to reduce or minimize the loss of the light.

The optical sheet part 139 may be disposed on a front surface of the light guide plate 131 and may enhance a luminance characteristic of light output from the light guide plate 131. The optical sheet part 139 according to an example embodiment of the present disclosure may be configured by a stacked combination of one or more of a diffusive sheet, a prism sheet, a double brightness enhancement film, and a lenticular sheet, or may be configured with one composite sheet having a light diffusing function and a light collecting function, but embodiments of the present disclosure are not limited thereto.

The guide panel 150 may be disposed at a rear periphery portion of the display panel 110 and may support the rear periphery portion of the display panel 110. The guide panel 150 may be supported by supporting member 300 or accommodated into the supporting member 300 to overlap the rear periphery portion of the display panel 110. The guide panel 150 may be configured to surround each lateral surfaces (or side surfaces) of the display panel 110, but embodiments of the present disclosure are not limited thereto. For example, the guide panel 150 may be disposed under the rear periphery portion of the display panel 110 not to protrude externally beyond each lateral surface of the display panel 110. For example, the guide panel 150 may be a panel guide, a supporting frame, or a supporting panel, or the like, but embodiments of the present disclosure are not limited thereto.

The guide panel 150 according to an example embodiment of the present disclosure may include a guide frame 151 and a guide side part 153.

The guide frame 151 may be connected to the rear periphery region of the display panel 110 and may be supported by the supporting member 300. For example, the guide frame 151 may have a tetragonal band (or belt) shape including an opening portion overlapping a center portion, other than the rear periphery region, of the display panel 110, but embodiments of the present disclosure are not limited thereto. For example, the guide frame 151 may directly contact an uppermost surface of the backlight 130 (for example, an uppermost surface of the optical sheet part 139), or may be spaced apart from the uppermost surface of the optical sheet part 139 by a certain distance.

The guide side part 153 may be connected to the guide frame 151 and may surround one side or lateral surfaces (or side surfaces) of the supporting member 300. For example, the guide side part 153 may be bent from the guide frame 151 to the lateral surfaces of the supporting member 300 and may surround the lateral surfaces of the supporting member 300 or may be surrounded by the lateral surfaces of the supporting member 300.

The guide panel 150 according to an example embodiment of the present disclosure may include a plastic material, a metal material, or a mixed material of a plastic material and a metal material, but embodiments of the present disclosure are not limited thereto. For example, the guide panel 150 may function as a vibration transfer member to transfer a sound vibration, generated by the sound generating apparatus 500, to the periphery portion of the display panel 110. Therefore, the guide panel 150 may transfer the sound vibration, generated by the sound generating apparatus 500, to the display panel 110 without losing the sound vibration while maintaining stiffness of the display panel 110. For example, the guide panel 150 may include a metal material for transferring the sound vibration, generated by the sound generating apparatus 500, to the display panel 110 while maintaining stiffness of the display panel 110, but embodiments of the present disclosure are not limited thereto.

The guide panel 150 according to an example embodiment of the present disclosure may be connected or coupled to the rear periphery portion of the display panel 110 by a coupling member (or a panel coupling member or a connection member) 140. The coupling member 140 may be disposed between the rear periphery portion of the display panel 110 and the guide panel 150 and may dispose or couple the display panel 110 to the guide panel 150. For example, the coupling member 140 may include an acrylic-based adhesive member or a urethane-based adhesive member, but embodiments of the present disclosure are not limited thereto. For example, the coupling member 140 may include the acrylic-based adhesive member which is relatively better in adhesive force and hardness so that the vibration of the guide panel 150 may be well transferred to the display panel 110. For example, the coupling member 140 may include a double-sided foam adhesive tape or a double-sided foam adhesive pad, which have an acrylic-based adhesive layer or an acrylic-based adhesive resin curing layer.

A front surface of the coupling member 140 according to an example embodiment of the present disclosure may be disposed at the second substrate 113 or the first polarization member 115 of the display panel 110. The coupling member 140 may be directly connected or coupled to a rear periphery portion of the second substrate 113 to enhance an adhesive force to the display panel 110. For example, the coupling member 140 may surround lateral surfaces (or side surfaces) of the first polarization member 115, thereby preventing or reducing light leakage of lateral surfaces from occurring in the first polarization member 115.

The coupling member 140 may have a certain thickness (or height). Thus, the coupling member 140 may provide a sound transfer space STS between the display panel 110 and the backlight 130 together with the guide frame 151 of the guide panel 150. The coupling member 140 may be disposed at the guide frame 151 of the guide panel 150 to have a four-side-closed shape or a closed loop shape, but embodiments of the present disclosure are not limited thereto. For example, the coupling member 140 may close (or seal) the sound transfer space STS between a rearmost surface of the display panel 110 and an uppermost surface of the backlight 130 which face each other with an opening portion of the guide panel 150 therebetween, thereby preventing or minimizing the leakage (or loss) of a sound pressure transferred to the sound transfer space STS. The sound transfer space STS may also function as a sound pressure level generating space where a sound pressure is generated based on a vibration of the backlight 130 or a panel vibration space which enables a vibration of the display panel 110 to be smoothly performed. For example, the sound transfer space STS may be an air gap, a gap space, a sound wave transmission portion, or a sound transmission portion, or the like, but embodiments of the present disclosure are not limited thereto.

In the apparatus according to an example embodiment of the present disclosure, the supporting member 300 may include the rear part 310 and a lateral part 330.

The rear part 310 may be disposed at the rear surface of the vibration member 100. The rear part 310 may be configured to support the vibration member 100. For example, the rear part 310 may support the backlight 130. For example, the rear part 310 may support or directly support the reflective sheet 137 of the backlight 130. The rear part 310 may be substantially the same as the rear part 310 described above with reference to FIGS. 1 and 2. Thus, repetitive description thereof may be omitted. The rear part 310 may include the reinforcement part 320 described above with reference to FIGS. 1 and 2.

The lateral part 330 may be configured to support the vibration member 100. The lateral part 330 may be configured to support the guide panel 150 of the vibration member 100. The lateral part 300 may be configured to have a predetermined height along the periphery portion of the rear part 310. Thus, an accommodating space may be provided on a floor surface (or a bottom surface) of the rear part 310. For example, the lateral part 330 may be bent from the periphery portion of the rear part 310.

In the apparatus according to an example embodiment of the present disclosure, the driving circuit part 170 may be disposed at the rear surface of the supporting member 300 and may be configured to be electrically connected to the display panel 110 of the vibration member 100. For example, the driving circuit part 170 may be electrically connected to a plurality of pad parts which are in the display panel 110.

The driving circuit part (or a display driving circuit part) 170 according to an example embodiment of the present disclosure may include a plurality of circuit films 171, a plurality of data driving integrated circuits (ICs) 173, and a printed circuit board (PCB) 175.

The plurality of circuit films 171 may be respectively connected to the plurality of pad parts which are in the display panel 110. Each of the plurality of circuit films 171 may be bent (or folded) toward the rear surface of the supporting member 300 from the plurality of pad parts. For example, the other side of each of the plurality of circuit films 171 may be bent (or folded) to surround one lateral surface of the guide panel 150.

The plurality of data driving ICs 173 may be respectively mounted at the plurality of circuit films 171. The plurality of data driving ICs 173 may be mounted at the corresponding circuit film 171 by a chip bonding process or a surface mounting process. Each of the plurality of data driving ICs 173 may convert digital pixel data into an analog data signal and may supply the analog data signal to a corresponding pixel, based on the digital pixel data and a data control signal supplied from an external source.

The PCB 175 may be disposed at the rear surface of the supporting member 300 and may be connected to the plurality of circuit films 171. The PCB 175 according to an example embodiment may be electrically connected to each of the plurality of circuit films 171 by a film attachment process by an anisotropic conductive film. The PCB 175 may include one or more circuits configured to provide power and signals for displaying an image on the display panel 110.

The PCB 175 may include a first PCB **175*a* connected to some of the plurality of circuit films 171 and a second PCB 175*b* (see FIG. 2) connected to the other of the plurality of circuit films 171. As illustrated in FIG. 2, the first PCB 175*a* may be disposed at the first region 300A1 of the supporting member 300, and the second PCB 175*b* may be disposed at the second region 300A2 of the supporting member 300**.

The supporting member 300 according to an example embodiment of the present disclosure may further include a forming part 340.

The forming part 340 may protrude in the rearward direction of the supporting member 300 from the rear part 310 of the supporting member 300. For example, the forming part 340 may protrude in the rearward direction of the supporting member 300 from the rear part 310 of the supporting member 300 to support the PCB 175. For example, the PCB 175 may be supported by the forming part 340 or be fixed to the forming part 340.

In the apparatus according to an example embodiment of the present disclosure, the circuit cover 200 may be configured to protect the driving circuit part 170. The circuit cover 200 may be configured to cover the driving circuit part 170.

The circuit cover 200 according to an example embodiment of the present disclosure may include a first cover part 211, a second cover part 213, and a third cover part 215.

The first cover part 211 may be configured to cover the PCB 175 of the driving circuit part 170. For example, the first cover part 211 may be disposed at the rear surface of the supporting member 300 and cover the PCB 175, and thus may protect the PCB 175.

The second cover part 213 may extend from the first cover part 211 to a lateral surface of the supporting member 300. For example, the second cover part 213 may extend to be inclined from one side of the first cover part 211 to the lateral part 330 of the supporting member 300. The second cover part 213 may be inclined with respect to the rear surface of the supporting member 300. For example, the second cover part 213 may be inclined toward the rear part 310 of the supporting member 300 from one side of the first cover part 211. The second cover part 213 may include a hole part 217. The hole part 217 may include one or more holes **217*h* passing through the second cover part 213 of the circuit cover 200. For example, the one or more holes 217*h* may be formed at the second cover part 213. For example, a portion of the second sound S2 may be output through or via or by the one or more holes 217*h***.

The third cover part 215 may extend from the second cover part 213 to cover a lateral surface of the vibration member 100. The third cover part 215 may extend from the second cover part 213 to cover the plurality of circuit films 171, and the plurality of data driving ICs 173 of the driving circuit part 170, and a lateral surface of the guide panel 150.

The second cover part 213 may be inclined between the first cover part 211 and the third cover part 215. For example, a distance between the second cover part 213 and the rear surface of the supporting member 300 may decrease progressively toward the third cover part 215 from one side of the first cover part 211. For example, an angle between an inner surface of the first cover part 211 and an inner surface of the second cover part 213 may be an obtuse angle. For example, an angle (or a first angle) (θ1) between the inner surface of the first cover part 211 and the inner surface of the second cover part 213 may be about 160 degrees to about 180 degrees, or about 165 degrees to about 175 degrees, but embodiments of the present disclosure are not limited thereto, so that the portion of the second sound is smoothly output (or radiated) through the hole part 217 and a space (or a sound path) between the circuit cover 200 and the PCB 175.

In the apparatus according to an example embodiment of the present disclosure, the damping member 600 may be disposed at the rear surface of the supporting member 300 at a periphery of the sound generating apparatus 500. The damping member 600 may be disposed at the rear part 310 of the supporting member 300 at the periphery of the sound generating apparatus 500. The damping member 600 may be connected to the circuit cover 200.

The damping member 600 according to an example embodiment of the present disclosure may include a fixing part 601, a damping part 603, and a mass part 605, but embodiments of the present disclosure are not limited thereto, for example, the damping member 600 may include at least a damping part 603.

The fixing part 601 may be fixed to the supporting member 300 at the periphery of the sound generating apparatus 500. For example, the fixing part 601 may be fixed to the rear part 310 of the supporting member 300 at a periphery of a lateral surface of the sound generating apparatus 500. For example, the fixing part 601 may be fixed to the rear part 310 of the supporting member 300 by a fastening member 600*a*, such as a screw, a bolt, or the like, but embodiments of the present disclosure are not limited thereto. For example, the damping member 600 may be fixed to the rear surface of the supporting member 300 by the fastening member (or a fixing member) 600*a*.

The damping part 603 may be connected to the fixing part 601 and may be spaced apart from the rear surface of the supporting member 300. For example, the damping part 603 may extend from one side (or a first side or a first portion) of the fixing part 601. For example, the damping part 603 may include a vertical portion which extends vertically from the one side (or the first side or the first portion) of the fixing part 601 and a horizontal portion which extends from the vertical portion in parallel with the rear surface of the supporting member 300. For example, the damping part 603 may extend from the one side (or the first side or the first portion) of the fixing part 601 to have a '⌊'-shape or an 'L'-shape, but embodiments of the present disclosure are not limited thereto. Therefore, the damping part 603 may be spaced apart from the rear surface of the supporting member 300. For example, the damping part 603 may be a vibration lever, a vibration piece, a damping plate, a vibrator, or a cantilever, or the like, but embodiments of the present disclosure are not limited thereto. The damping part 603 may vibrate by a vibration generated based on a vibration (or driving) of the sound generating apparatus 500, thereby decreasing or absorbing sound noise. For example, the damping part 603 may dynamically vibrate by a vibration generated based on a vibration (or driving) of the sound generating apparatus 500, thereby decreasing or absorbing sound noise.

The mass part 605 according to an example embodiment of the present disclosure may be configured at the damping part 603. The mass part 605 may be configured to increase a weight of the damping part 603. The mass part 605 may be configured as a material for increasing a weight of the damping part 603. For example, the mass part 605 may include a mass structure including a metal material or a nonmetal material. The mass part 605 may be attached on or connected to an end of the damping part 603 by an adhesive member, such as an adhesive, a double-sided tape, or the like.

The mass part 605 according to another example embodiment of the present disclosure, as illustrated in FIG. 6, may include a hemming part which extends from the damping part 603 and is bent once or more. The hemming part may include a plurality of extension parts which extend from the damping part 603. The extension parts may overlap one another as an end portion bent in a curved shape or may be configured in parallel with one another. Accordingly, the mass part 605 including the hemming part may be configured by a bending process which is performed once or more on the extension part of the damping part 603. Thus, the mass part 605 may be integrated into the damping part 603.

The mass part 605 according to an example embodiment of the present disclosure may increase a weight of the damping part 603 to decrease a natural frequency of the damping part 603. Thus, a vibration frequency of the sound generating apparatus 500 causing sound noise may be reduced or absorbed based on a vibration of the damping part 603, thereby decreasing or absorbing sound noise caused by a vibration (or driving) of the sound generating apparatus 500.

With reference to FIGS. 5 and 6, the damping member 600 according to an example embodiment of the present disclosure may further include a connection part 607.

The connection part 607 may be connected to the circuit cover 200. The connection part 607 may be connected between the fixing part 601 and the circuit cover 200. For example, the connection part 607 may extend from the other side (or a second side or a second portion) of the fixing part 601 and may be connected to the circuit cover 200. For example, the connection part 607 may include a vertical portion which extends vertically from the other side (or a second side or a second portion) of the fixing part 601 and a horizontal portion which extends from the vertical portion to overlap a portion of the circuit cover 200. For example, the connection part 607 may extend from the other side (or a second side or a second portion) of the fixing part 601 to have a '⌋'-shape or a reverse 'L'-shape.

The connection part 607 may be connected to a portion of the circuit cover 200 by an adhesive member, such as an adhesive or a double-sided tape, or the like. For example, the connection part 607 may be connected to the inner surface of the first cover part 211 of the circuit cover 200 by the adhesive member. The connection part 607 may minimize or prevent a vibration of the circuit cover 200, thereby decreasing or absorbing sound noise caused by a vibration (or driving) of the sound generating apparatus 500.

A sound or a vibration generated based on a vibration (or driving) of the sound generating apparatus 500 may be transferred to the circuit cover 200, and sound noise may occur due to a vibration of the circuit cover 200. Accordingly, the damping member 600 may prevent or decrease a vibration of the circuit cover 200 generated based on a vibration (or driving) of the sound generating apparatus 500, thereby decreasing or preventing sound noise caused by a vibration of the circuit cover 200.

Figure 7:
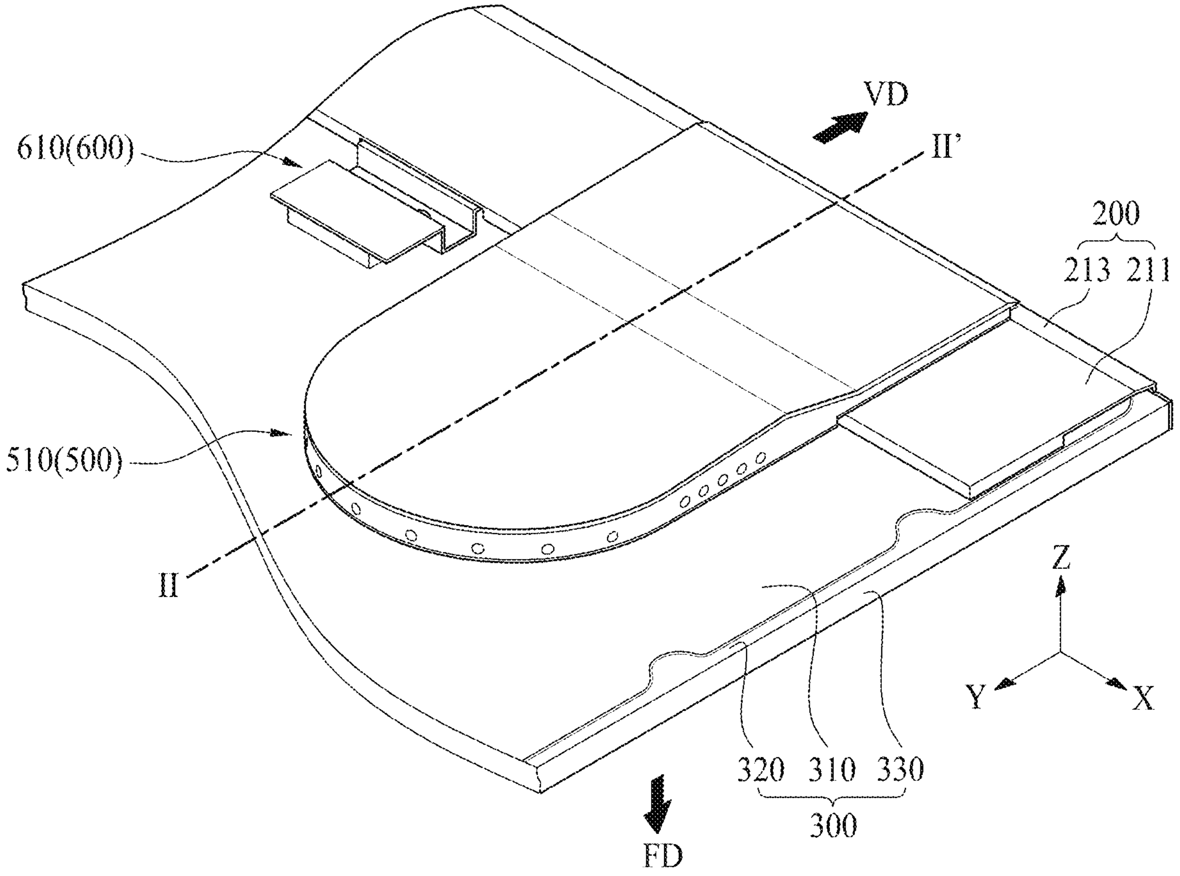
FIG. 7 illustrates an arrangement structure of a sound generating apparatus according to an example embodiment of the present disclosure.
Figure 8:
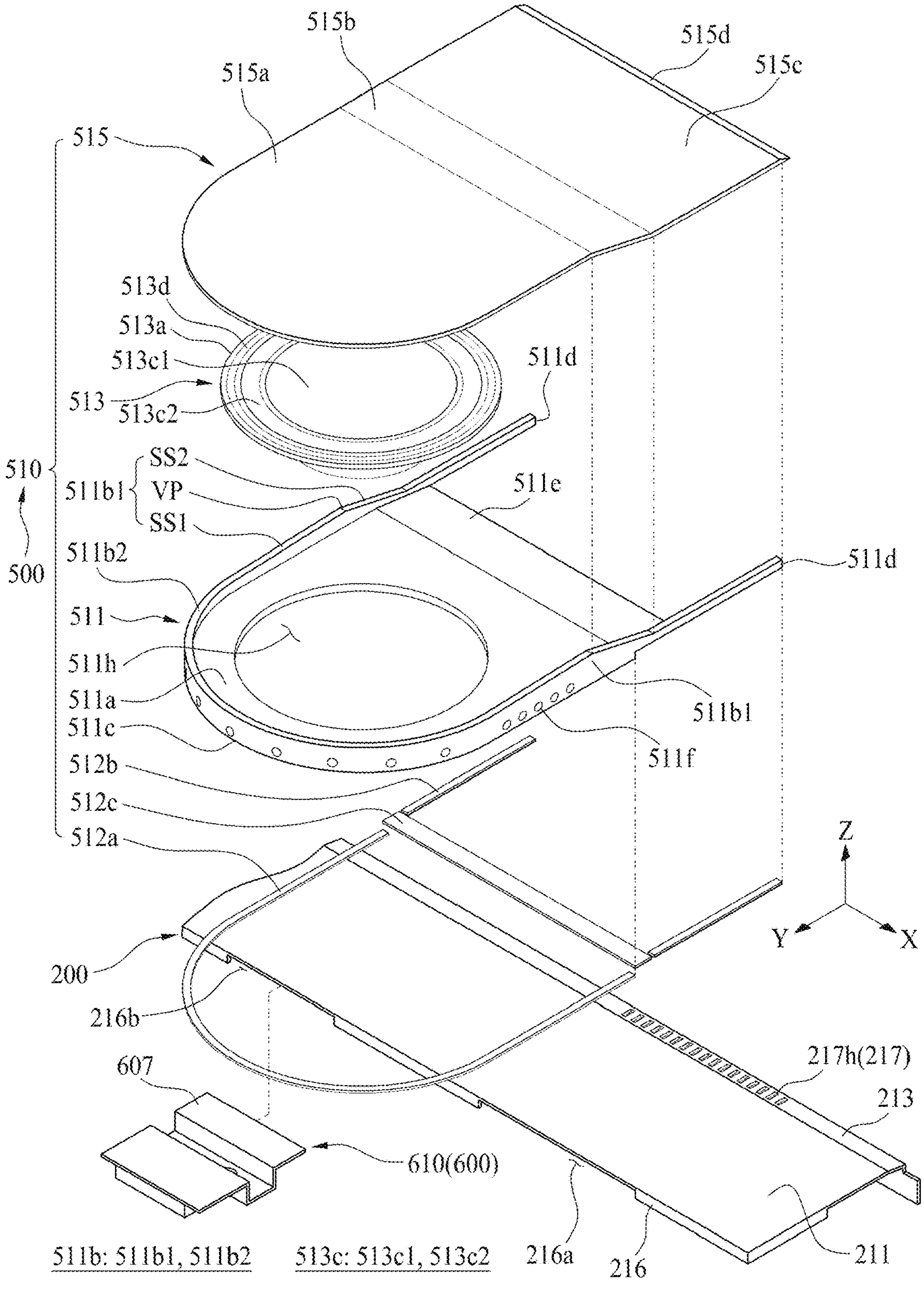
FIG. 8 is an exploded perspective view of a sound generating apparatus and a circuit cover illustrated in FIG. 7 according to an example embodiment of the present disclosure.
Figure 9:
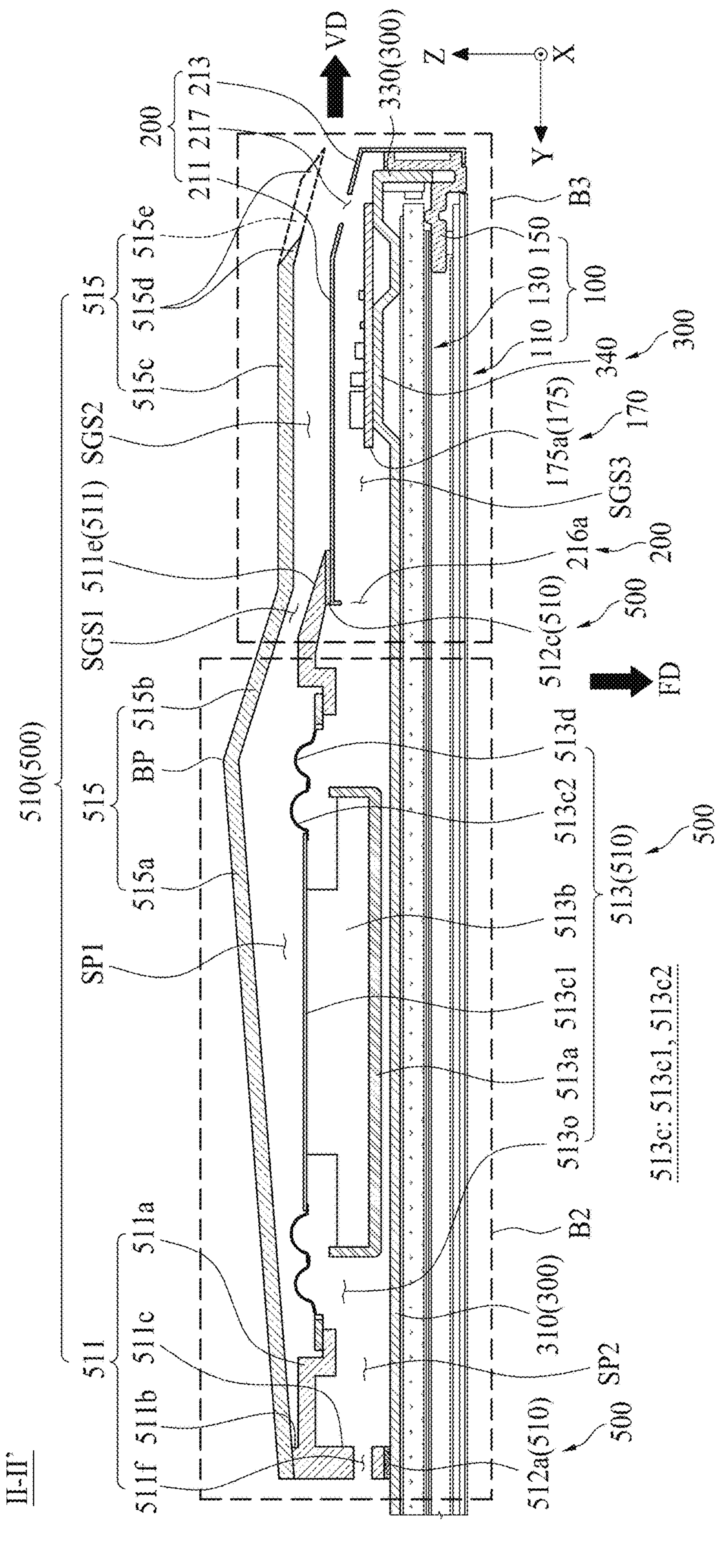
FIG. 9 is an example cross-sectional view taken along line II-II' illustrated in FIG. 7 according to an example embodiment of the present disclosure.
Figure 10:
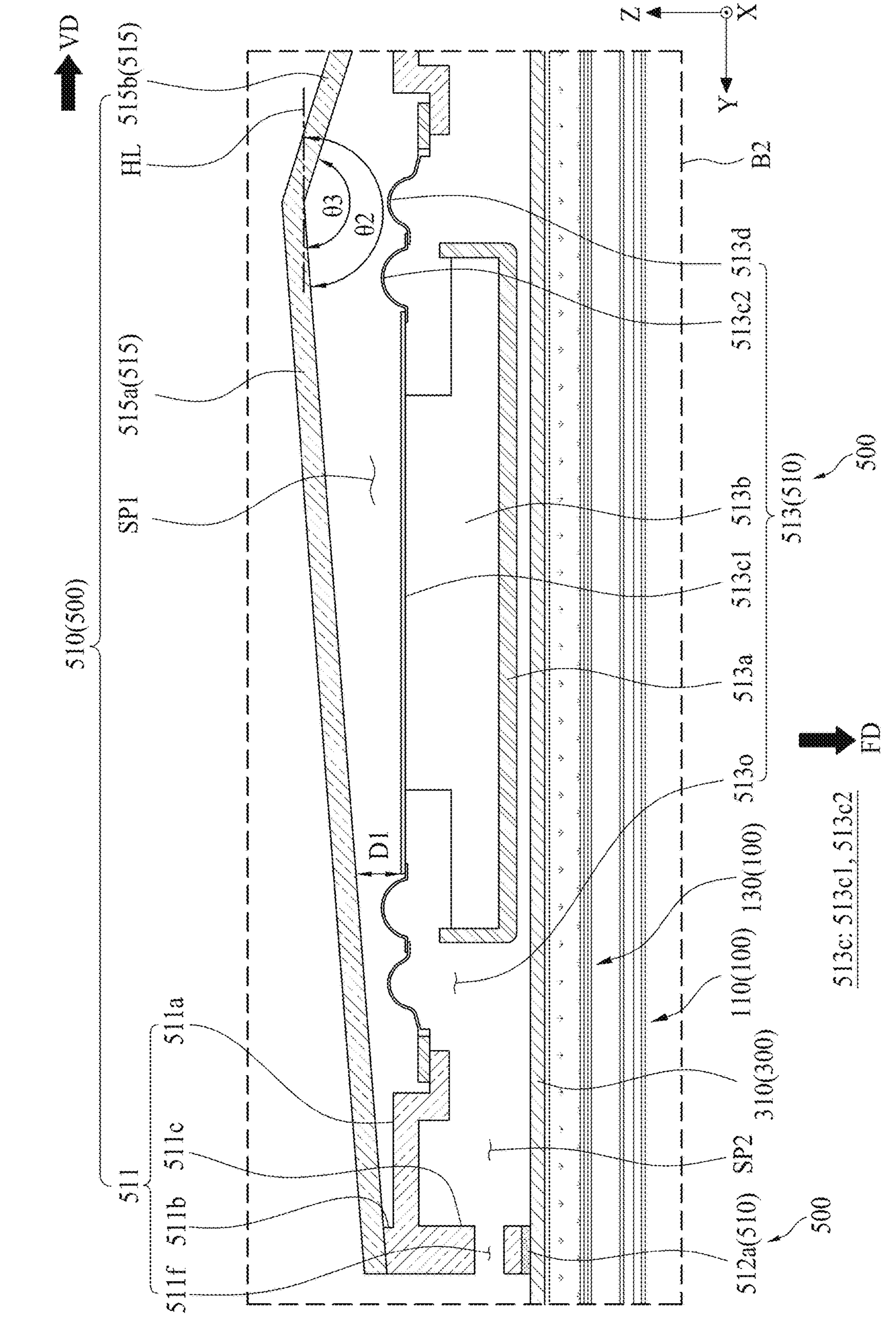
FIG. 10 is an enlarged view of a region 'B2' illustrated in FIG. 9 according to an example embodiment of the present disclosure.
Figure 11:
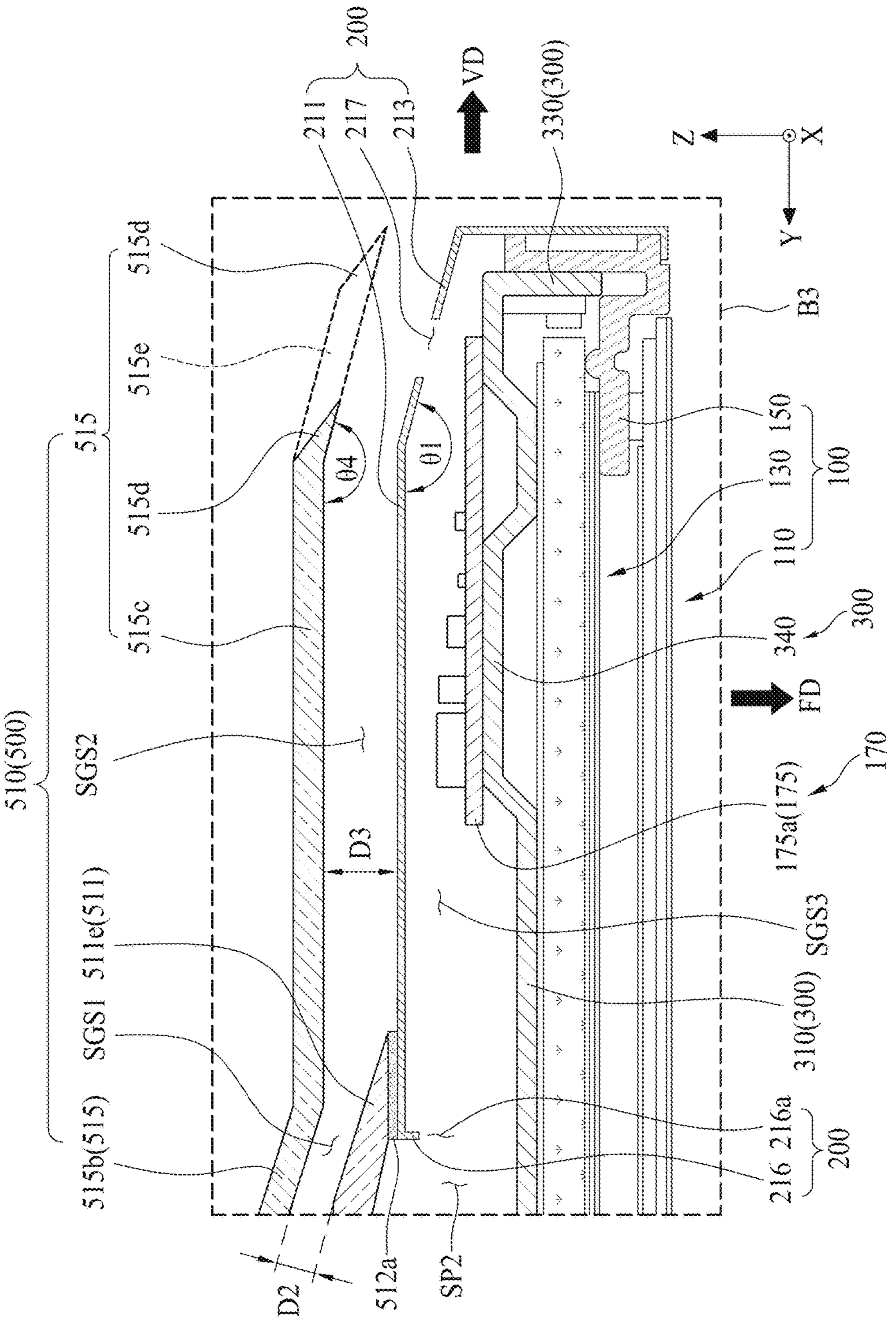
FIG. 11 is an enlarged view of a region 'B3' illustrated in FIG. 9 according to an example embodiment of the present disclosure.

FIG. 7 illustrates an arrangement structure of a sound generating apparatus according to an example embodiment of the present disclosure. FIG. 8 is an exploded perspective view of a sound generating apparatus and a circuit cover illustrated in FIG. 7 according to an example embodiment of the present disclosure. FIG. 9 is an example cross-sectional view taken along line II-II' illustrated in FIG. 7 according to an example embodiment of the present disclosure. FIG. 10 is an enlarged view of a region 'B2' illustrated in FIG. 9 according to an example embodiment of the present disclosure. FIG. 11 is an enlarged view of a region 'B3' illustrated in FIG. 9 according to an example embodiment of the present disclosure.

With reference to FIGS. 7 to 9, a sound generating apparatus 500 or a first sound generating apparatus 510 and a second sound generating apparatus 520 (see FIG. 2) according to an example embodiment of the present disclosure may include a case member 511, a sound generator 513, and a sound guide member 515.

The case member 511 may be disposed at a rear surface of a supporting member 300. For example, the case member 511 may be disposed at a rear part 310 of the supporting member 300. The case member 511 may be disposed at a rear part 310 of the supporting member 300 to overlap a portion of a circuit cover 200. The case member 511 may be configured to support a sound generator 513. The case member 511 may be configured to include an accommodating hole 511*h* which accommodates the sound generator 513. For example, the case member 511 may be a housing or a housing member, or the like, but embodiments of the present disclosure are not limited thereto.

The case member 511 may have a generally rectangular shape with one side having a semicircular shape, but embodiments of the present disclosure are not limited thereto. For example, the case member 511 may include a tetragonal shape or a polygonal shape including a curved portion.

The case member 511 according to an example embodiment of the present disclosure may include a first supporting part 511*a*, a second supporting part 511*b*, and a third supporting part 511*c*.

The first supporting part 511*a* may be configured to support the sound generator 513 or accommodate the sound generator 513. The first supporting part 511*a* may have a generally rectangular shape with one side having a semicircular shape. The first supporting part 511*a* may include an accommodating hole 511*h* which accommodates the sound generator 513. For example, the first supporting part 511*a* may be a plate including the accommodating hole 511*h*. For example, the first supporting part 511*a* may be a plate which accommodates the sound generator 513. For example, the accommodating hole 511*h* may be a supporting hole or an inserting hole, or the like, but embodiments of the present disclosure are not limited thereto.

The second supporting part 511*b* may be configured along a periphery portion of a first surface of the first supporting part 511*a*. The second supporting part 511*b* may protrude from the periphery portion of the first surface of the first supporting part 511*a*. The second supporting part 511*b* may be a first sidewall part, an upper sidewall part, an upper border part, or an upper skirt part, or the like, but embodiments of the present disclosure are not limited thereto.

The second supporting part 511*b* according to an example embodiment of the present disclosure may include a pair of rectilinear portions 511*b*1 parallel with each other and a circumference portion 511*b*2 connected between the pair of rectilinear portions 511*b*1. For example, the second supporting part 511*b* may have a '⊂'-shape or U-shape one-dimensionally, based on the pair of rectilinear portions 511*b*1 and the circumference portion 511*b*2. For example, as shown in FIG. 8, in a top view that views along Z-axis direction in an XYZ-axis direction, the second supporting part 511*b* including the pair of rectilinear portions 511*b*1 and the circumference portion 511*b*2 is '⊂' shaped. However, embodiments of the present disclosure are not limited thereto.

The pair of rectilinear portions 511*b*1 may have a rectilinear shape and may be configured at the periphery portion of the first surface of the first supporting part 511*a*. For example, the pair of rectilinear portions 511*b*1 may be configured in parallel with each other with the first supporting part 511*a* therebetween along a third direction Z direction, and lower surfaces of the pair of rectilinear portions 511*b*1 may be in parallel with an upper surface of the first supporting part 511*a* therebetween along a first direction X direction.

The pair of rectilinear portions 511*b*1 may have a cross-sectional structure having a triangular shape. As shown in FIG. 8, in a side view that views along X-axis direction in an XYZ-axis direction, the pair of rectilinear portions 511*b*1 may have a cross-sectional structure having a triangular shape. Each rectilinear portion of the pair of rectilinear portions 511*b*1 may include a first slope surface SS1 and a second slope surface SS2. The first slope surface SS1 may be configured adjacent to the circumference portion 511*b*2. A length of the first slope surface SS1 may be greater than that of a length of the second slope surface SS2. For example, with respect to a second direction Y, the length of the first slope surface SS1 may be greater than that of the length of the second slope surface SS2.

The first slope surface SS1 and the second slope surface SS2 may be configured to have different slopes with respect to a vertex point VP. For example, an angle of the first slope surface SS1 with respect to the Z-axis at the vertex point VP may be greater than an angle of the second slope surface SS2 with respect to the Z-axis at the vertex point VP. For example, with respect to a first surface (or a front surface) of the first supporting part 511*a*, a slope of the second slope surface SS2 may be greater than that of a slope of the first slope surface SS1. For example, an angle between the first surface (or the front surface) of the first supporting part 511*a* and the second slope surface SS2 may be greater than an angle between the first surface (or the front surface) of the first supporting part 511*a* and the first slope surface SS1.

A height of a portion of the second supporting part 511*b* corresponding to the first slope surface SS1 may decrease progressively in a direction away from the second slope surface SS2 (and the vertex point VP) based on the slope of the first slope surface SS1. For example, a height of a portion of the second supporting part 511*b* corresponding to the first slope surface SS1 may decrease progressively toward the circumference portion 511*b*2, based on the slope of the first slope surface SS1. A height of a portion of the second supporting part 511*b* corresponding to the second slope surface SS2 may decrease progressively in a direction away from the first slope surface SS1 (and the vertex point VP) based on the slope of the second slope surface SS2.

The circumference portion 511*b*2 may be configured to have a predetermined curvature radius between the pair of rectilinear portions 511*b*1. The circumference portion 511*b*2 may be connected between the pair of rectilinear portions 511*b*1 to have a semicircular shape. The circumference portion 511*b*2 may have a height which decreases progressively in a direction away from the first slope surface SS1 of the pair of rectilinear portions 511*b*1. For example, the circumference portion 511*b*2 may have a height which decreases progressively in a direction away from the first slope surface SS1 of the pair of rectilinear portions 511*b*1, so as to have the same slope (or gradient) as that of the first slope surface SS1 of the pair of rectilinear portions 511*b*1.

For example, a first surface (or a front surface) of the circumference portion 511*b*2 may be configured as a first slope surface SS1 which may be the same as the first slope surface SS1 of the pair of rectilinear portions 511*b*1.

The second supporting part 511*b* may provide a first space SP1 on the first surface (or the front surface) of the first supporting part 511*a*. The first space SP1 may be an upper space, a front space, a first path, or a first gap space, or the like, but embodiments of the present disclosure are not limited thereto. For example, the first space SP1 may be an upper space, a front space, a vibration space, or a front sound space, or the like, corresponding to the sound generator 513, but embodiments of the present disclosure are not limited thereto.

The third supporting part 511*c* may be configured along a periphery portion of a second surface of the first supporting part 511*a*, which is opposite to the first surface of the first supporting part 511*a*. The third supporting part 511*c* may protrude from the periphery portion of a second surface of the first supporting part 511*a*. The third supporting part 511*c* may overlap the second supporting part 511*b*. For example, the third supporting part 511*c* may be a second sidewall part, a lower sidewall part, a lower border part, or a lower skirt part, or the like, but embodiments of the present disclosure are not limited thereto.

The third supporting part 511*c* according to an example embodiment of the present disclosure may include a pair of rectilinear portions parallel with each other and a circumference portion connected between the pair of rectilinear portions. For example, the third supporting part 511*c* may have a '⊂'-shape or a U-shape one-dimensionally, based on the pair of rectilinear portions and the circumference portion. For example, as shown in FIG. 8, in a top view that views along Z-axis direction in an XYZ-axis direction, third supporting part 511*c* including the pair of rectilinear portions and the circumference portion is '⊂' shaped. For example, the third supporting part 511*c* may have the same planar shape as that of the second supporting part 511*b*. However, embodiments of the present disclosure are not limited thereto.

The entire third supporting part 511*c* may be configured to have the same height (or thickness) from the second surface of the first supporting part 511*a*. For example, each of a pair of rectilinear portions and a circumference portion configuring the third supporting part 511*c* may be configured to have a same height (or thickness) from the second surface of the first supporting part 511*a*. Accordingly, a lower surface (or a rear surface) of the third supporting part 511*c* may have a planar structure.

The third supporting part 511*c* may be connected or coupled to the rear surface of the supporting member 300 by a first coupling member 512*a*. The third supporting part 511*c* may be connected or coupled to the rear part 310 of the supporting member 300 by the first coupling member 512*a*. For example, the first coupling member 512*a* may be a first connection member, but embodiments of the present disclosure are not limited thereto.

The third supporting part 511*c* may provide a second space SP2 on a second surface (or a rear surface) of the first supporting part 511*a*. The second space SP2 may be a lower space, a rear space, a second path, or a second gap space, but embodiments of the present disclosure are not limited thereto. The second space SP2 may be a lower space, a rear space, or a rear sound space corresponding to the sound generator 513, but embodiments of the present disclosure are not limited thereto.

The case member 511 according to an embodiment of the present disclosure may further include a pair of extension parts 511*d* and a tilt part 511*e*.

The pair of extension parts 511*d* may be connected to the second supporting part 511*b* and may be configured to overlap the circuit cover 200. The pair of extension parts 511*d* may extend from the second supporting part 511*b* to overlap the circuit cover 200. The pair of extension parts 511*d* may extend respectively from the pair of rectilinear portions 511*b*1 of the second supporting part 511*b* onto the circuit cover 200 along the second direction Y. The pair of extension parts 511*d* may be disposed on the first cover 211 of the circuit cover 200. The pair of extension parts 511*d* may be connected or coupled to the circuit cover 200 by a second coupling member 512*b*. The pair of extension parts 511*d* may be connected or coupled to the first cover 211 of the circuit cover 200 by the second coupling member 512*b*. For example, the second coupling member 512*b* may be a second connection member, but embodiments of the present disclosure are not limited thereto.

The tilt part 511*e* may have an inclined surface extending from one lateral surface of the first supporting part 511*a* toward a rear surface of the supporting member 300. The tilt part 511*e* may be inclined toward the rear surface of the supporting member 300 at a predetermined angle from the one lateral surface of the first supporting part 511*a*. The tilt part 511*e* may be inclined toward the rear surface of the supporting member 300 at a predetermined angle from the one lateral surface of the first supporting part 511*a* between the pair of rectilinear portions 511*b*1 of the second supporting part 511*b*.

One portion (or an end portion) of the tilt part 511*e* may overlap the circuit cover 200. The one portion (or an end portion) of the tilt part 511*e* may overlap the first cover part 211 of the circuit cover 200. The one portion of the tilt part 511*e* may be connected or coupled to the circuit cover 200 by a third coupling member 512*c*. A portion of a lower surface of the tilt part 511*e* may be connected or coupled to the first cover part 211 of the circuit cover 200 by the third coupling member 512*c*. Accordingly, the second space SP2 may be configured by the second supporting part 511*b* and the tilt part 511*e*. For example, the second space SP2 may be provided by the first supporting part 511*a*, the second supporting part 511*b*, the first coupling member 512*a*, the rear part 310 of the supporting member 300, the third coupling member 512*c*, and the tilt part 511*e*. For example, the third coupling member 512*c* may be a third connection member, but embodiments of the present disclosure are not limited thereto.

The case member 511 according to an example embodiment of the present disclosure may further include one or more lateral holes 511*f*. The case member 511 may further include a plurality of lateral holes 511*f*.

The one or more lateral holes 511*f* may be configured at the third supporting part 511*c*. The one or more lateral holes 511*f* may be formed to pass through the third supporting part 511*c*. The one or more lateral holes 511*f* may be formed to pass through the third supporting part 511*c* along the first direction X or the second direction Y. The one or more lateral holes 511*f* may be formed at one or more of the circumference portion and the pair of rectilinear portions configuring the third supporting part 511*c*. The one or more lateral holes 511*f* may have a diameter of about 2 mm to about 5 mm, or may have a diameter of about 3 mm to about 4 mm, but embodiments of the present disclosure are not limited thereto.

The one or more lateral holes 511*f* may be configured to balance an air pressure of the second space SP2 formed by the third supporting part 511*c*. For example, the one or more lateral holes 511*f* may be configured to adjust an air impedance of the second space SP2. The one or more lateral holes 511*f* may be configured to output a portion of a sound of the second space SP2 in the vertical direction VD of the vibration member 100. For example, the one or more lateral holes 511*f* may be configured to output the portion of the sound of the second space SP2 in the vertical direction VD of the vibration member 100 and adjust the air impedance of the second space SP2. For example, the one or more lateral holes 511*f* may be a third hole, a balancing hole, an air impedance adjustment hole, a third sound hole, a third sound output port, or a third sound discharge portion, but embodiments of the present disclosure are not limited thereto.

The sound generator 513 may be supported by the case member 511 or coupled to the case member 511. The sound generator 513 may be disposed at the case member 511 to have a reverse-direction arrangement structure with respect to the rear surface of the supporting member 300. For example, a portion of a rear surface of the sound generator 513 may be inserted or accommodated into the accommodating hole 511*h* in the first supporting part 511*a* of the case member 511.

The sound generator 513 according to an example embodiment of the present disclosure may be configured to vibrate with a current (or a voice current) applied based on Fleming's left hand rule. For example, the sound generator 513 may include a sound generating device, a vibration generating device, a sound wave generating device, a vibration generator, a vibration source, or a sound wave generator, or the like, but embodiments of the present disclosure are not limited thereto. For example, the sound generator 513 may be configured as a sound actuator or a sound exciter including a coil (or a voice coil) and a magnet.

The sound generator 513 according to an example embodiment of the present disclosure may include a base frame 513*a*, a magnetic circuit part 513*b*, a vibration plate 513*c*, and a suspension 513*d*.

The base frame (or a base member) 513*a* may be connected to the case member 511. For example, the base frame (or the base member) 513*a* may be configured to be accommodated into the accommodating hole 511*h* in the first supporting part 511*a* of the case member 511. The base frame 513*a* may be configured to accommodate the magnetic circuit part 513*b*. For example, the base frame 513*a* may include an accommodating part (or a concave portion) for accommodating the magnetic circuit part 513*b*. The base frame 513*a* may be configured to include one or more opening portions 513*o* overlapping a portion of the vibration plate 513*c*. A periphery portion of the base frame 513*a* may be connected or coupled to the first supporting part 511*a* of the case member 511 by a coupling member.

The magnetic circuit part 513*b* may be disposed at the base frame 513*a*. For example, the magnetic circuit part 513*b* may be configured at the base frame 513*a* to vibrate the vibration plate 513*c*. The magnetic circuit part 513*b* may include a magnet, a bobbin, a coil, and a center pole. As the bobbin vibrates (or is vertically driven) based on a signal applied to the coil, the magnetic circuit part 513*b* may vibrate the vibration plate 513*c*.

The vibration plate (or a sound vibration plate) 513*c* may be connected to the bobbin of the magnetic circuit part 513*b*. The vibration plate 513*c* may vibrate (or vertically move) based on a vibration of the bobbin to output a sound. For example, a sound generated by a vibration of the vibration plate 513*c* may be output in an upward (or forward) direction of the vibration plate 513*c*, and simultaneously, may be output in a downward (or rearward) direction of the vibration plate 513*c* through the one or more opening portions 513*o* in the base frame 513*a*.

The vibration plate 513*c* according to an example embodiment of the present disclosure may include a first vibration plate 513*c*1 and a second vibration plate 513*c*2. The first vibration plate 513*c*1 may be configured to be connected to the bobbin of the magnetic circuit part 513*b*. The second vibration plate 513*c*2 may be connected to the first vibration plate 513*c*1 and may be configured to surround the first vibration plate 513*c*1.

The suspension 513*d* may be configured to adjust a vibration of the bobbin while contracting and expanding based on a vibration (or a vertical motion) of the bobbin. The suspension 513*d* may be configured to limit a vibration distance of the bobbin based on a restoring force. The suspension 513*d* may be connected between the base frame 513*a* and the vibration plate 513*c*. The suspension 513*d* may be configured to be connected between the base frame 513*a* and the second vibration plate 513*c*2 of the vibration plate 513*c*, but embodiments of the present disclosure are not limited thereto. For example, the suspension 513*d* may be connected between the base frame 513*a* and the bobbin of the magnetic circuit part 513*b*.

The sound guide member 515 may be configured to cover the case member 511 and the sound generator 513. The sound guide member 515 may be connected or coupled to the case member 511 to cover the sound generator 513. The sound guide member 515 may be configured to guide a sound (or a forward sound), output from the sound generator 513, in a vertical direction VD of the vibration member 100. For example, the sound guide member 515 may include a first surface which covers the sound generator 513 and a second surface which covers the circuit cover 200. For example, the sound guide member 515 may be a sound guider, a housing cover, a housing cover member, or a housing lid, or the like, but embodiments of the present disclosure are not limited thereto.

The sound guide member 515 according to an example embodiment of the present disclosure may include a guide part which is at the rear surface of the supporting member 300. For example, the guide part may be disposed or configured at the rear surface of the circuit cover 200. For example, the sound guide member 515 or the guide part may include a first guide part 515*a*, a second guide part 515*b*, and a third guide part 515*c*.

The first guide part 515*a* may overlap the vibration plate 513*c* and may include a sloped surface. For example, the first guide part 515*a* may be disposed at the case member 511 and may be configured to cover the vibration plate 513*c* of the sound generator 513. For example, the first supporting part 511*a* may be connected to the first guide part 515*a*. The first guide part 515*a* may be configured to cover the first supporting part 511*a* and the second supporting part 511*b* of the case member 511 and the vibration plate 513*c* of the sound generator 513. The first guide part 515*a* may be disposed at or coupled to the second supporting part 511*b* of the case member 511. The first guide part 515*a* may be disposed at or coupled to the second supporting part 511*b* so as to be inclined. For example, the second supporting part 511*b* may be connected to the first guide part 515*a*.

The first guide part 515*a* may have a generally rectangular shape with one side having a semicircular shape. The first guide part 515*a* may be configured to have the same or substantially the same shape as that of the first supporting part 511*a*. A periphery portion of a rear surface of the first guide part 515*a* may be connected or coupled to the second supporting part 511*b* of the case member 511. The periphery portion of the rear surface of the first guide part 515*a* may be disposed at or coupled to the first slope surface SS1 of the pair of rectilinear portions 511*b*1 and the first surface of the circumference portion 511*b*2, which configure the second supporting part 511*b*.

The first guide part 515*a* may be spaced apart from the sound generator 513 by the second supporting part 511*b*. The first space SP1 may be formed between the first guide part 515*a* and the first supporting part 511*a*. A height of the first space SP1 may increase progressively toward the other side of the sound generator 513 adjacent to the circuit cover 200 from one side of the sound generator 513 adjacent to a center of the supporting member 300, based on a slope (or a gradient) of the first guide part 515*a*. Accordingly, a sound output from the sound generator 513 may smoothly travel toward the other side of the sound generator 513, based on a slope (or a gradient) of the first guide part 515*a*. For example, the first guide part 515*a* may be a first sound guide part, a first sound guide surface, a first sound adjustment surface, a first sound control surface, or a first surface, or the like, but embodiments of the present disclosure are not limited thereto.

The second guide part 515*b* may be configured to guide a sound, generated in the first space SP1, in the vertical direction VD of the vibration member. The second guide part 515*b* may be configured to overlap the first supporting part 511*a* and the tilt part 511*e* of the case member 511. The second guide part 515*b* may have a rectangular shape. The second guide part 515*b* may be disposed at or coupled to the second slope surface SS2 of the pair of rectilinear portions 511*b*1 configuring the second supporting part 511*b*. Accordingly, the second guide part 515*b* may be configured to cover a portion of the first supporting part 511*a* and the tilt part 511*e*.

The second guide part 515*b* may be configured to be inclined from one end of the first guide part 515*a*. For example, the second guide part 515*b* may be configured to be inclined from one lateral surface of the first guide part 515*a* toward the tilt part 511*e*. The second guide part 515*b* may be inclined from the one lateral surface of the first guide part 515*a* toward the tilt part 511*e* at a predetermined angle. For example, the second guide part 515*b* may be configured in parallel with the tilt part 511*e*. For example, the second guide part 515*b* and the tilt part 511*e* may be configured to have a same slope (or gradient).

A first sound guide space SGS1 may be formed between the second guide part 515*b* and the tilt part 511*e*. The first sound guide space SGS1 may be formed between respective inclined surfaces of the tilt part 511*e* and the second guide part 515*b* parallel with each other. Therefore, a sound generated in the first space SP1 may be output in the vertical direction VD of the vibration member through the first sound guide space SGS1. The sound generated in the first space SP1 may be reflected (or diffracted) by a sloped surface of the second guide part 515*b* configuring the first sound guide space SGS1 and may be output in the vertical direction VD of the vibration member. For example, the sound generated in the first space SP1 may be reflected (or diffracted) by a sloped surface of each of the second guide part 515*b* and the tilt part 511*e* in the first sound guide space SGS1 and may travel in the vertical direction VD of the vibration member. For example, the second guide part 515*b* may be a second sound guide part, a second sound guide surface, a second sound adjustment surface, a second sound control surface, a third surface, a slope surface, an inclined surface, or a tilt surface, or the like, but embodiments of the present disclosure are not limited thereto.

The second guide part 515*b* may overlap the suspension 513*d*. A boundary portion BP between the first guide part 515*a* and the second guide part 515*b* may overlap the suspension 513*d* of the sound generator 513, or may be disposed between the suspension 513*d* and the circuit cover 200. The boundary portion BP between the first guide part 515*a* and the second guide part 515*b* may be one end (or one side or one portion) of the second guide part 515*b*. For example, when the boundary portion BP between the first guide part 515*a* and the second guide part 515*b* overlaps the vibration plate 513*c* of the sound generator 513, a sound generated based on a vibration of the vibration plate 513*c* may be reflected toward the vibration plate 513*c* by the second guide part 515*b*. Thus, a portion of that sound may be lost or the amount of sound output in the vertical direction VD of the vibration member may decrease. Accordingly, the boundary portion BP between the first guide part 515*a* and the second guide part 515*b* may not overlap the vibration plate 513*c*, or may be disposed not to overlap the vibration plate 513*c* of the sound generator 513.

The third guide part 515*c* may extend from the second guide part 515*b* to cover the circuit cover 200. The third guide part 515*c* may overlap the rear surface of the supporting member 300 and may extend from the second guide part 515*b*. The third guide part 515*c* may be configured to cover a portion of the tilt part 511*e* of the case member 511 and a portion of the circuit cover 200. The third guide part 515*c* may be configured to cover a portion of the tilt part 511*e*, the pair of extension parts 511*d*, and a portion of the circuit cover 200. For example, the third guide part 515*c* may be a third sound guide part, a third sound guide surface, a second surface, or a sound output portion, or the like, but embodiments of the present disclosure are not limited thereto.

The third guide part 515*c* may have a rectangular shape. The third guide part 515*c* may extend from the second guide part 515*b* to overlap the circuit cover 200 and may be connected or coupled to the pair of extension parts 511*d* of the case member 511. The third guide part 515*c* may be spaced apart from the first cover part 211 of the circuit cover 200 by the pair of extension parts 511*d*. A second sound guide space SGS2 may be formed between the third guide part 515*c* and the circuit cover 200. The second sound guide space SGS2 may be formed between the third guide part 515*c* and the first cover part 211 of the circuit cover 200 and may be connected (or may communicate) with the first sound guide space SGS1. The second sound guide space SGS2 may be connected (or may communicate) with an external space of the apparatus. Accordingly, a sound generated in the first space SP1 based on a vibration (or driving) of the sound generator 513 may be output (or radiated) in the vertical direction VD of the vibration member 100 via the first sound guide space SGS1 and the second sound guide space SGS2. For example, the first cover part 211 may be a flat part, a plane part, or a sound guide surface, but embodiments of the present disclosure are not limited thereto. For example, the second sound guide space SGS2 may be a second path, a second space, an upper space, or a front space, but embodiments of the present disclosure are not limited thereto. For example, the second sound guide space SGS2 may be an upper space, a front space, a vibration space, or a front sound space corresponding to the sound generator 513, but embodiments of the present disclosure are not limited thereto. For example, the second sound guide space SGS2 may be a sound waveguide space (or a section) of the circuit cover 200, but embodiments of the present disclosure are not limited thereto.

The sound guide member 515 according to an example embodiment of the present disclosure may further include a guide tip 515*d*. The guide tip (or a sound guide tip) 515*d* may protrude toward the circuit cover 200 from a second surface of the sound guide member 515. The guide tip 515*d* may be configured at an end of the sound guide member 515 to protrude toward the circuit cover 200. The guide tip 515*d* may be sharply configured at the end of the sound guide member 515. For example, the guide tip 515*d* may protrude from the third guide part 515*c* toward the rear surface of the supporting member 300. For example, the guide tip 515*d* may protrude from an end of the third guide part 515*c* toward the rear surface of the supporting member 300.

The guide tip 515*d* according to an example embodiment of the present disclosure may be sharply configured at an end of the third guide part 515*c*. The guide tip 515*d* may overlap the circuit cover 200. The guide tip 515*d* may overlap the second cover part 213 of the circuit cover 200. Accordingly, the guide tip 515*d* may provide a sound discharge space (or a sound emitting space) on the second cover part 213 of the circuit cover 200. The sound discharge space may be formed between the guide tip 515*d* and the second cover part 213 of the circuit cover 200. Thus, a sound passing through the first sound guide space SGS1 and the second sound guide space SGS2 may be output (or radiated) in the vertical direction VD of the vibration member through the sound discharge space.

The guide tip 515*d* may be inclined in parallel with the second cover part 213 of the circuit cover 200. The guide tip 515*d* may be tilted or inclined at a same slope (or a same gradient) as the second cover 213 to optimize an output angle (or a radiation angle) of a sound passing through the first sound guide space SGS1 and the second sound guide space SGS2.

The sound guide member 515 according to an example embodiment of the present disclosure may further include a fourth guide part 515*e*.

The fourth guide part 515*e* may extend from the third guide part 515*c* in parallel with the second cover part 213 of the circuit cover 200. The fourth guide part 515*e* may extend from the third guide part 515*c* to cover the hole part 217 which is in the circuit cover 200.

The fourth guide part 515*e* and the second cover part 213 of the circuit cover 200 may provide a sound mixing space. The sound mixing space may be a space where a sound output through the second sound guide space SGS2 and a sound output through the hole part 217 of the circuit cover 200 may be mixed (or amplified). Accordingly, where a sound mixing space based on the fourth guide part 515*e* is additionally provided, the mixing (or amplification) efficiency of sounds may increase. Thus, a sound characteristic and/or a sound pressure level characteristic of a sound output (or radiated) in the vertical direction VD of the vibration member may be further enhanced.

The guide tip 515*d* according to another example embodiment of the present disclosure may be sharply configured at an end of the fourth guide part 515*e*. The guide tip 515*d* may be inclined in parallel with the second cover part 213 of the circuit cover 200. The guide tip 515*d* may be tilted or inclined at a same slope (or a same gradient) as the second cover 213 to optimize an output angle (or a radiation angle) of a sound passing through the sound mixing space.

With reference to FIGS. 8, 10, and 11, the first guide part 515*a* may be disposed at a first surface (or a front surface) of the second supporting part 511*b*. Thus, the first guide part 515*a* may have a same slope as a slope (or a gradient) of the first surface (or the front surface) of the second supporting part 511*b*. For example, the first guide part 515*a* may have a same slope (or gradient) as that of the first slope surface SS1 of the second supporting part 511*b*. For example, an angle (or a second angle) (θ2) between an inner surface of the first guide part 515*a* and a horizontal line HL parallel to the second direction Y may be about 170 degrees to about 180 degrees or about 0 degrees to about 10 degrees, or may be about 175 degrees to about 180 degrees or about 0 degrees to about 5 degrees, but embodiments of the present disclosure are not limited thereto.

The second guide part 515*b* may be disposed at a first surface (or a front surface) of the second supporting part 511*b*, and thus, may have a same slope as a slope (or a gradient) of the first surface (or the front surface) of the second supporting part 511*b*. For example, the second guide part 515*b* may have a same slope (or gradient) as that of the second slope surface SS2 of the second supporting part 511*b*. For example, an angle (or a third angle) (θ3) between an inner surface of the second guide part 515*b* and a horizontal line HL parallel to the second direction Y may be about 160 degrees to about 180 degrees or about 0 degrees to about 20 degrees, or may be about 170 degrees to about 180 degrees or about 0 degrees to about 10 degrees, but embodiments of the present disclosure are not limited thereto.

An angle (or a fourth angle) (θ4) between the third guide part 515*c* and the guide tip 515*d* may be the same or substantially the same as the angle (or the first angle) (θ1) between the first cover part 211 and the second cover part 213 of the circuit cover 200, to optimize an output angle (or a radiation angle or a sound radiation angle) of a sound. For example, the first angle (θ1) may secure a sound discharge space (or a sound discharge port or a discharge port or a sound emitting part or an emitting port).

A minimum distance (or a first distance) D1 between the first guide part 515*a* and the first vibration plate 513*c*1 of the sound generator 513 for the first space SP1 may be about 2 mm to about 5 mm (2 mm≤D1≤5 mm), or may be about 3 mm to about 4 mm (3 mm≤D1≤4 mm), but embodiments of the present disclosure are not limited thereto.

A distance (or a second distance) D2 between the second guide part 515*b* and the tilt part 511*e* for the first sound guide space SGS1 may be about 1 mm to about 5 mm (1 mm≤D2≤5 mm), or may be about 2 mm to about 5 mm (2 mm≤D2≤5 mm), but embodiments of the present disclosure are not limited thereto.

A distance (or a third distance) D3 between the second guide part 515*b* and the second cover part 213 of the circuit cover 200 for the second sound guide space SGS2 may be about 1 mm to about 5 mm (1 mm≤D3≤5 mm), or may be about 2 mm to about 4 mm (2 mm≤D3≤4 mm), but embodiments of the present disclosure are not limited thereto.

A distance (or a fourth distance) D4 between the fourth guide part 515*e* and the third cover part 215 of the circuit cover 200 for the sound mixing space may be about 1 mm to about 5 mm (1 mm≤D4≤5 mm), or may be about 2 mm to about 4 mm (2 mm≤D4≤4 mm), but embodiments of the present disclosure are not limited thereto.

With reference to FIGS. 7 to 10, in the apparatus according to an example embodiment of the present disclosure, the circuit cover 200 may be configured to include an inner space which is connected (or communicate) with the second space SP2.

The circuit cover 200 may further include a fourth cover part 216 and a first connection hole 216*a*.

The fourth cover part 216 may be connected to one end (or one side or one portion) of the first cover part 211 adjacent to the second space SP2. The fourth cover part 216 may be vertically connected to the one end (or the one side or the portion) of the first cover part 211 adjacent to the second space SP2. The fourth cover part 216 may be supported by the rear part 310 of the supporting member 300.

The first connection hole 216*a* may be formed to pass through a portion of the fourth cover part 216 adjacent to the second space SP2. The first connection hole 216*a* may be formed to pass through the portion of the fourth cover part 216 adjacent to the second space SP2 along the second direction Y. Accordingly, the second space SP2 may be connected (or may communicate) with an inner space of the circuit cover 200 through the first connection hole 216*a*. For example, the second space SP2 may be connected (or may communicate) with an inner space (or a third sound guide space) SGS3 between the circuit cover 200 and a rear surface of the supporting member 300 through the first connection hole 216*a*. For example, the first connection hole 216*a* may be a first hole or a first cover hole, but embodiments of the present disclosure are not limited thereto.

The second space SP2 may be connected (or may communicate) with the hole part 217 through the inner space of the circuit cover 200 and the first connection hole 216*a*. The first connection hole 216*a*, the inner space SGS3 of the circuit cover 200, and the hole part 217 may configure an air duct of the circuit cover 200. For example, the hole part 217 may be a hole or a cover hole, but embodiments of the present disclosure are not limited thereto. Therefore, a sound generated in the second space SP2 based on a vibration (or driving) of the sound generator 513 may be output (or radiated) through the hole part 217 via the first connection hole 216*a* and the inner space SGS3 of the circuit cover 200 and may be mixed with a sound output through the first and second sound guide spaces SGS1 and SGS2 from the first space SP1, thereby enhancing a sound (for example, a sound characteristic and/or a sound pressure level characteristic of the low-pitched sound band) output (or radiated) in the vertical direction VD of the vibration member.

With reference to FIGS. 7 and 8, in the apparatus according to an example embodiment of the present disclosure, the circuit cover 200 may further include a second connection hole 216*b*.

The second connection hole 216*b* may be formed to pass through a portion of the fourth cover part 216 adjacent to the sound generating apparatus 500 or the first connection hole 216*a*. The second connection hole 216*b* may be formed to pass through the portion of the fourth cover part 216 along the second direction Y. The second connection hole 216*b* may be formed at the fourth cover part 216 to accommodate the connection part 607 of the damping member 600.

The connection part 607 of the damping member 600 may be inserted (or accommodated) into the second connection hole 216*b* and may be connected or coupled to an inner surface of the circuit cover 200. The connection part 607 may be inserted (or accommodated) into the second connection hole 216*b* and may be connected or coupled to an inner surface of the first cover part 211 of the circuit cover 200.

Figure 12:
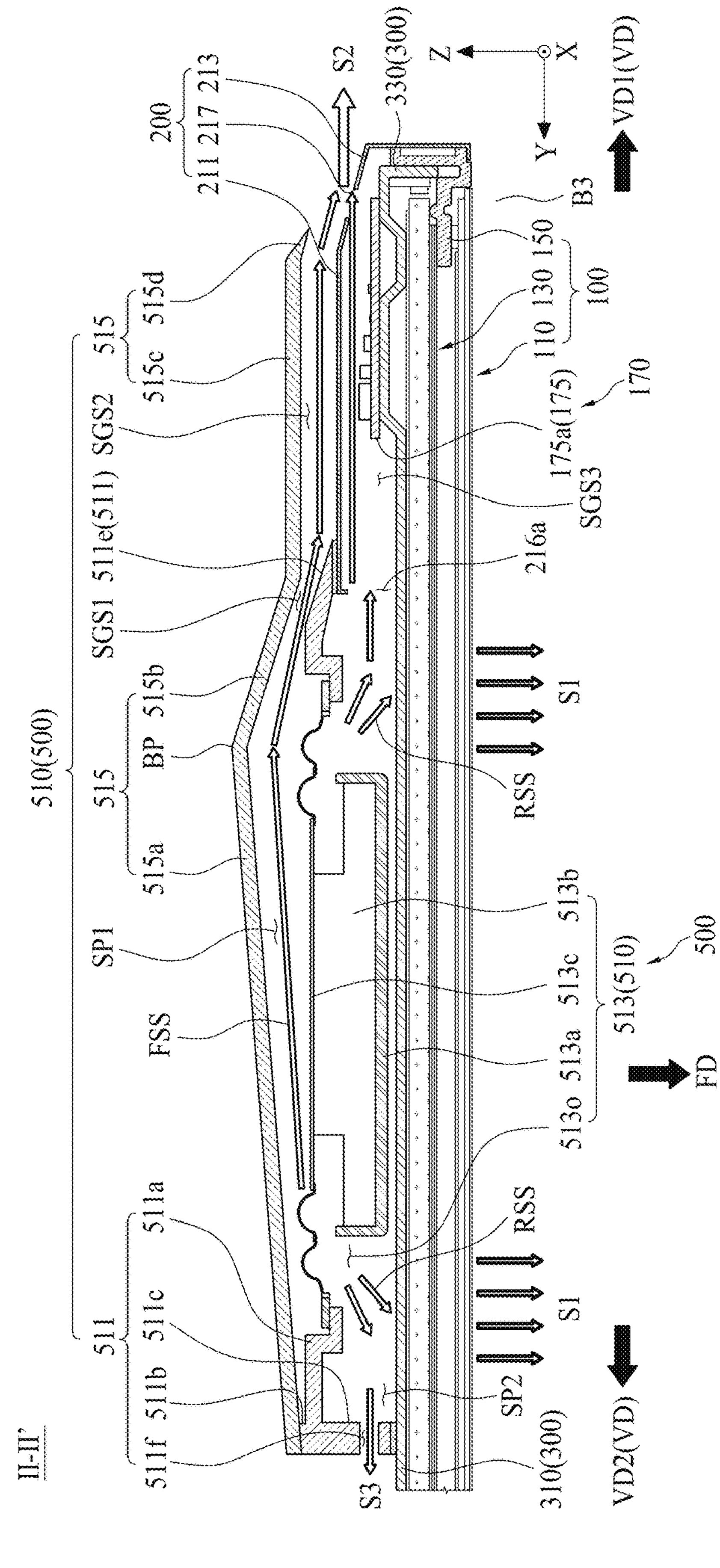
FIG. 12 illustrates a sound output of an apparatus according to an example embodiment of the present disclosure.

FIG. 12 illustrates a sound output of an apparatus according to an example embodiment of the present disclosure.

With reference to FIG. 12, the apparatus according to an example embodiment of the present disclosure may output a first sound S1 in a forward direction FD of a vibration member 100, based on a vibration (or driving) of a sound generating apparatus 500, and may simultaneously output a second sound S2 in a vertical direction VD of the vibration member 100.

The first sound S1 may be generated by a vibration of the vibration member 100 based on a rearward sound RSS of a sound generator 513 generated in the second space SP2 by a vibration of a vibration plate 513*c* based on a vibration (or driving) of the sound generator 513 of the sound generating apparatus 500 and may be output in the forward direction FD of the vibration member 100. For example, the rearward sound RSS of the sound generator 513 may be a sound which is output to a rear surface of a supporting member 300 or a rear surface of the vibration member 100 at a rear surface of the sound generator 513 which is adjacent to or faces the supporting member 300. For example, the rearward sound RSS of the sound generator 513 may be a sound which is output from a front surface of the vibration member 100 with respect to the vibration member 100, or may be a sound which is output in the forward direction FD of the vibration member 100. For example, the rearward sound RSS of the sound generator 513 may be a sound output toward the forward direction FD of the apparatus from the sound generator 513. For example, the rearward sound RSS of the sound generator 513 may be transferred to the vibration member 100 through the hole 350 and/or one or more opening portions 513*o* which are in the sound generator 513, and the vibration member 100 may vibrate based on the rearward sound RSS of the sound generator 513 to output a first sound S1 in the forward direction FD. For example, the first sound S1 may have a low-pitched sound band, but embodiments of the present disclosure are not limited thereto. The first sound S1 may have a low-pitched sound band of about 3 kHz or less, but embodiments of the present disclosure are not limited thereto.

The second sound S2 may be generated based on a forward sound FSS of the sound generator 513 generated in the first space SP1 by a vibration of the vibration plate 513*c* based on a vibration (or driving) of the sound generator 513 of the sound generating apparatus 500 and may be output in the vertical direction VD of the vibration member 100, based on the guide of a sound guide member 515 configured at the sound generating apparatus 500. For example, the forward sound FSS of the sound generator 513 may be a sound which is output by a vibration of the vibration plate 513*c* of the sound generator 513. For example, the forward sound FSS of the sound generator 513 may be a sound which is output in a rearward direction of the vibration member 100 with respect to the vibration member 100. For example, the forward sound FSS of the sound generator 513 may be a sound which is output in a rearward direction, which is opposite to the forward direction FD, of the apparatus from the sound generator 513. For example, the forward sound FSS of the sound generator 513 may be a second sound S2 passing through a first sound guide space SGS1 provided in the sound generating apparatus 500 and a second sound guide space SGS2 between the sound generating apparatus 500 and a circuit cover 200 and may be output in the vertical direction VD of the vibration member 100. For example, the second sound S2 may be output in the vertical direction VD (or a first vertical direction VD1) of the vibration member 100. For example, the first vertical direction VD1 of the vibration member 100 may be a downward or upward direction of the vibration member 100 or a direction toward the ground from the vibration member 100. For example, the second sound S2 corresponding to the forward sound FSS of the sound generator 513 may include a full pitched sound band. For example, the second sound S2 may have a pitched sound band of about 100 Hz to about 20 kHz, but embodiments of the present disclosure are not limited thereto.

The second sound S2 according to an example embodiment of the present disclosure may include a portion of a rearward sound RSS of the sound generator 513. For example, the portion of the rearward sound RSS of the sound generator 513 generated in a second space SP2 may be a portion of the second sound S2 output through the hole part 217 and an inner space SGS3 of the circuit cover 200 and may be output in the vertical direction VD of the vibration member 100. The second sound S2 may include the portion of the rearward sound RSS of the sound generator 513, and thus, a sound characteristic and/or a sound pressure level characteristic may be enhanced. For example, the second sound S2 passing through the first sound guide space SGS1 and the second sound guide space SGS2, and a portion of the rearward sound RSS output (or radiated) through the hole part 217 and the inner space SGS3 of the circuit cover 200 may be mixed with each other or amplified at a periphery of (or around) the hole part 217 and may be output in the vertical direction VD (or a first vertical direction VD1) of the vibration member 100.

According to an example embodiment of the present disclosure, the portion of the rearward sound RSS of the sound generator 513 generated in the second space SP2 may be a third sound S3 and may be output in the vertical direction VD (or a second vertical direction VD2) of the vibration member 100 through a plurality of lateral holes 511*f* which are in the sound generating apparatus 500. For example, the third sound S3 may be output in the second vertical direction VD2 of the vibration member 100 through the plurality of lateral holes 511*f* which are in the case member 511 of the sound generating apparatus 500. For example, the second vertical direction VD2 of the vibration member 100 may be one or more of an upward direction and a sideward direction of the vibration member 100 except a direction toward the ground from the vibration member 100, but embodiments of the present disclosure are not limited thereto.

Figure 13:
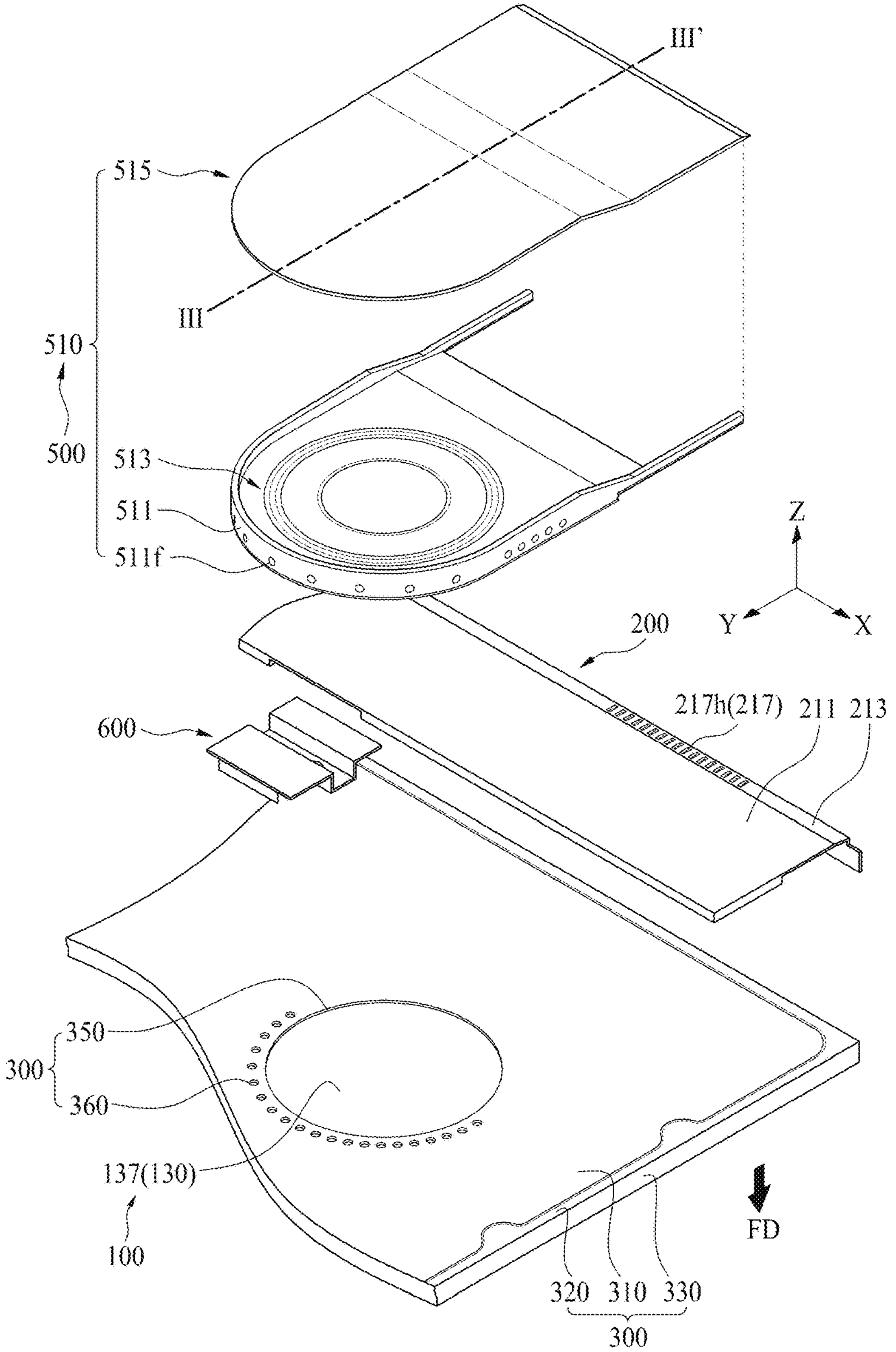
FIG. 13 illustrates an apparatus according to another example embodiment of the present disclosure.
Figure 14:
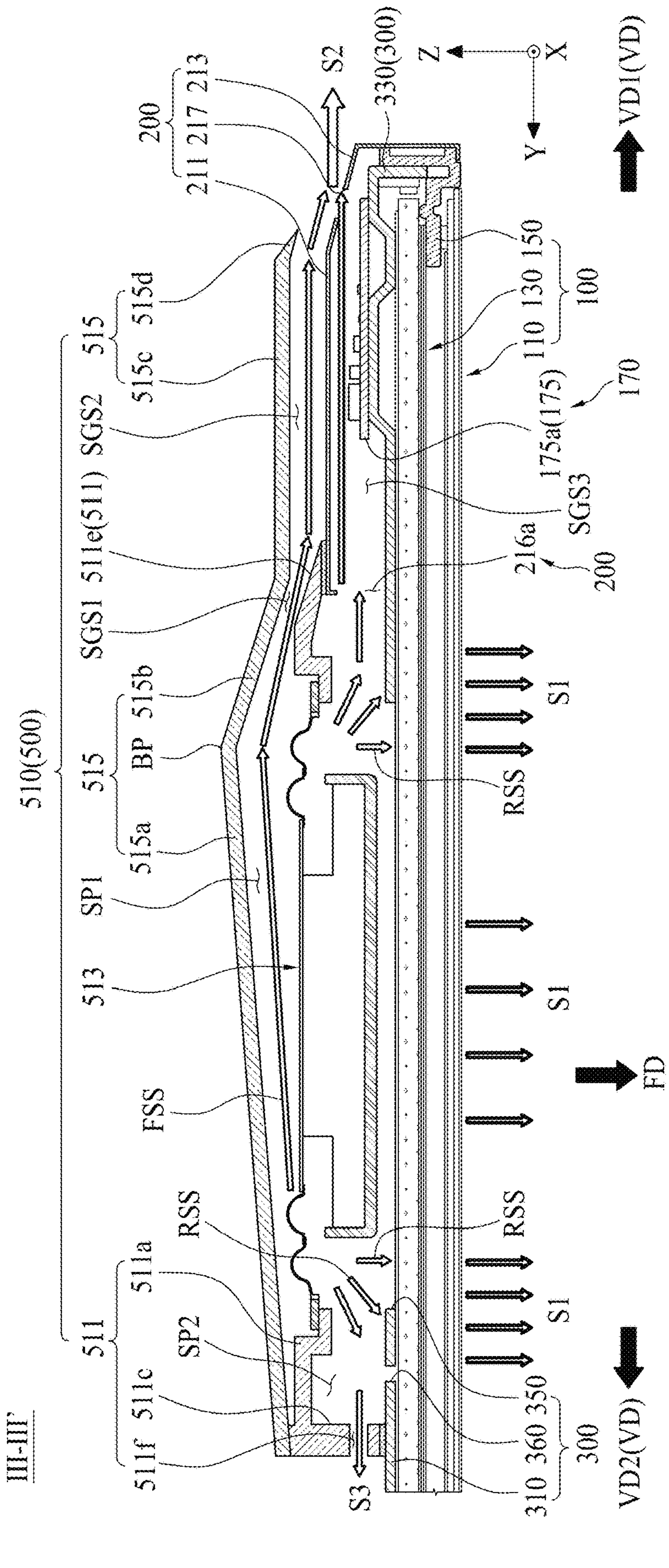
FIG. 14 is an example cross-sectional view taken along line III-III' illustrated in FIG. 13 according to an example embodiment of the present disclosure.

FIG. 13 illustrates an apparatus according to another example embodiment of the present disclosure. FIG. 13 is an exploded perspective view of a sound generating apparatus and a circuit cover illustrated in FIG. 7 according to an example embodiment of the present disclosure. FIG. 14 is an example cross-sectional view taken along line III-III' illustrated in FIG. 13 according to an example embodiment of the present disclosure. FIGS. 13 and 14 illustrate an example embodiment implemented by modifying a configuration of the supporting member in the apparatus according to an example embodiment of the present disclosure illustrated in FIGS. 1 to 12. In the following description, therefore, only a supporting member and elements relevant thereto may be described. The other elements may be referred to by the same reference numerals as in FIGS. 1 to 12, and their repetitive descriptions may be omitted.

With reference to FIGS. 13 and 14, in an apparatus according to another example embodiment of the present disclosure, a supporting member 300 may include a rear part 310, a lateral part 330, and a hole 350. The rear part 310 and the lateral part 330 may respectively be the same or substantially the same as the rear part 310 and the lateral part 330 described above with reference to FIGS. 5, 6, and 9 to 12, respectively. Thus, repetitive descriptions thereof may be omitted.

The hole 350 may be formed in the rear part 310 of the supporting member 300 to overlap the sound generating apparatus 500. The hole 350 may be formed to pass through the rear part 310 of the supporting member 300 overlapping the sound generating apparatus 500. The hole 350 may be formed in the rear part 310 of the supporting member 300 to overlap a sound generator 513 of the sound generating apparatus 500. The hole 350 may be formed to pass through the rear part 310 of the supporting member 300 along a third direction Z. For example, the hole 350 may be a fourth hole, a communication hole, a connection hole, a through hole, a sound transfer hole, a sound wave transfer hole, a main hole, an air gap, a sound energy input portion, or a sound path, or the like, but embodiments of the present disclosure are not limited thereto. For example, the hole 350 may be a first hole of the supporting member 300.

The hole 350 may be covered by the sound generating apparatus 500 and may overlap the sound generator 513 of the sound generating apparatus 500. The hole 350 may have a same or substantially the same shape as that of the sound generator 513 of the sound generating apparatus 500. The hole 350 may have a same or substantially the same size as that of the sound generator 513 of the sound generating apparatus 500. For example, where the sound generator 513 has a circular shape, the hole 350 may have a circular shape, but embodiments of the present disclosure are not limited thereto.

The hole 350 may be disposed between a rear surface of the vibration member 100 and the sound generating apparatus 500. The hole 350 may be disposed between the rear surface of the vibration member 100 and the sound generator 513. The hole 350 may be disposed between a backlight 130 of the vibration member 100 and the sound generator 513. For example, the hole 350 may be formed between a reflective sheet 137 of the backlight 130 and a base frame 513*a* of the sound generator 513. Accordingly, the sound generator 513 may face a rear surface of a vibration member 100 through the hole 350, or may directly face the rear surface of the vibration member 100. For example, the rear surface of the sound generator 513 may face or directly face the backlight 130 of the vibration member 100 through the hole 350. For example, the base frame 513*a* of the sound generator 513 may face or directly face the reflective sheet 137 of the backlight 130 through the hole 350. However, embodiments of the present disclosure are not limited thereto.

A sound (or a rearward sound) generated based on a vibration (or driving) of the sound generator 513 may be directly transferred to the vibration member 100 through the hole 350. For example, the sound (or the rearward sound) generated based on the vibration (or driving) of the sound generator 513 may be directly transferred to the backlight 130 of the vibration member 100 through the hole 350. Accordingly, a sound (or a rearward sound) of the sound generator 513 may be efficiently transferred to the vibration member 100. Thus, a sound characteristic and/or a sound pressure level characteristic of a first sound S1 generated in the forward direction FD based on a vibration of the vibration member 100 may be further enhanced.

The first sound S1 may be generated by a vibration of the vibration member 100 based on a rearward sound RSS of a sound generator 513 generated in the second space SP2 by a vibration of a vibration plate 513*c* based on a vibration (or driving) of the sound generator 513 and may be output in the forward direction FD of the vibration member 100. For example, the rearward sound RSS of the sound generator 513 may be transferred to the vibration member 100 through a hole 350 and one or more opening portions 513_o_ which are in the sound generator 513, and the vibration member 100 may vibrate based on the rearward sound RSS of the sound generator 513 to output the first sound S1 in a forward direction FD. For example, the rearward sound RSS of the sound generator 513 may be a sound which is output to a rear surface of a supporting member 300 or a rear surface of the vibration member 100 at a rear surface of the sound generator 513 which is adjacent to or faces the supporting member 300. For example, the rearward sound RSS of the sound generator 513 may be a sound which is output from a front surface of the vibration member 100 with respect to the vibration member 100, or may be a sound which is output in the forward direction FD of the vibration member 100. For example, the rearward sound RSS of the sound generator 513 may be a sound which is output in the forward direction FD of the apparatus from the sound generator 513. However, embodiments of the present disclosure are not limited thereto.

The apparatus according to another example embodiment of the present disclosure may further include one or more auxiliary (or secondary) holes 360. The one or more auxiliary holes 360 may be formed at the supporting member 300 at a periphery of (or around) the hole 350. The one or more auxiliary holes 360 may overlap the sound generating apparatus 500 and may be in a rear part 310 at the periphery of (or around) the hole 350. The one or more auxiliary holes 360 may be formed in the rear part 310 of the supporting member 300 adjacent to the hole 350 to overlap a second space SP2. For example, the one or more auxiliary holes 360 may be formed at the rear part 310 of the supporting member 300 so as to be adjacent to one side of the hole 350. For example, the one or more auxiliary holes 360 may be formed to pass through the rear part 310 of the supporting member 300 corresponding to a region between the hole 350 and a circumference portion configuring a third supporting part 511_c_ of a case member 511. The one or more auxiliary holes 360 may have a diameter of about 2 mm to about 5 mm, or may have a diameter of about 3 mm to about 4 mm, but embodiments of the present disclosure are not limited thereto.

The one or more auxiliary holes 360 may be configured to adjust an air impedance of the second space SP2. The one or more auxiliary holes 360 may be configured to adjust the air impedance of the second space SP2 together with the plurality of lateral holes 511_f_ formed at the third supporting part 511_c_ of the case member 511. For example, the one or more auxiliary holes 360 may be a peripheral hole, a second hole, a second balancing hole, or a second air impedance adjustment hole, or the like, but embodiments of the present disclosure are not limited thereto. For example, one or more auxiliary holes 360 may be a second hole or holes of the supporting member 300.

Figure 15:
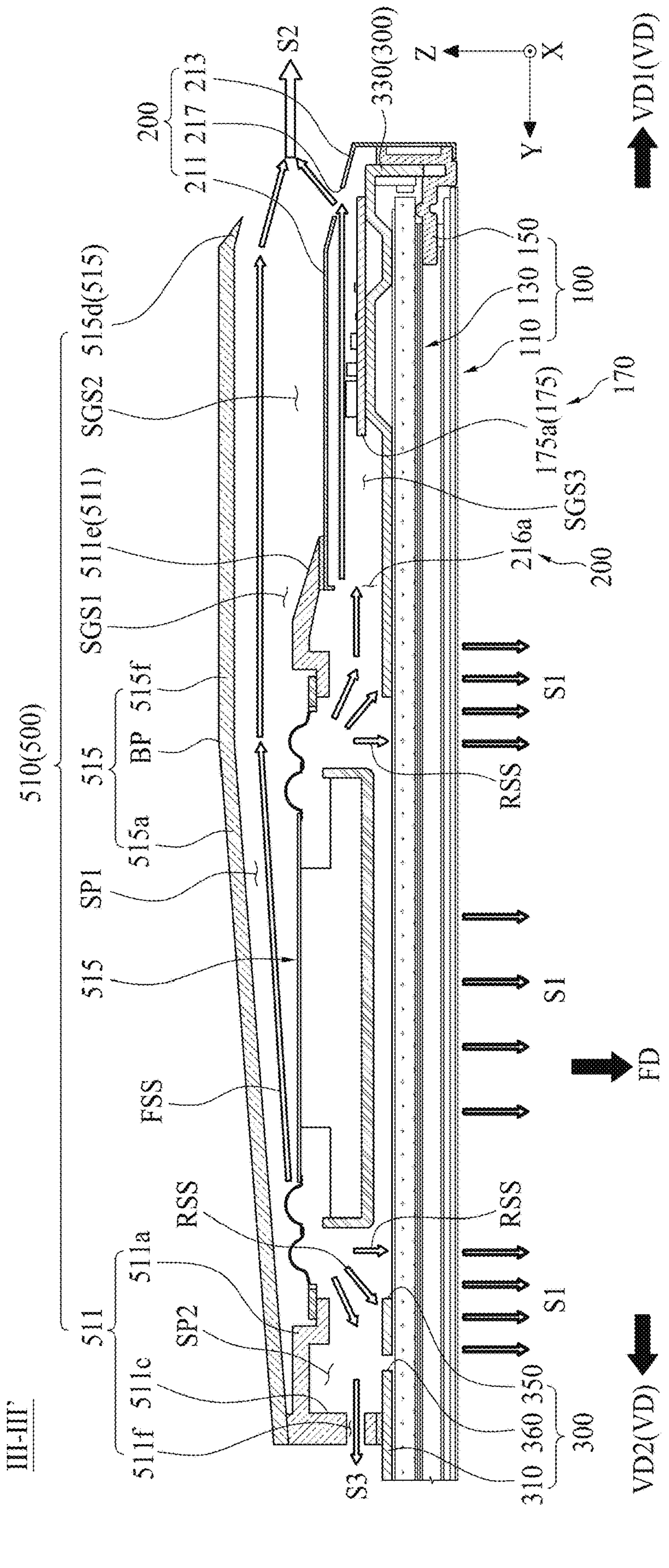
FIG. 15 is another example cross-sectional view taken along line III-III' illustrated in FIG. 13 according to another example embodiment of the present disclosure.

FIG. 15 is another example cross-sectional view taken along line III-III' illustrated in FIG. 13 according to another example embodiment of the present disclosure. FIG. 15 illustrates an example embodiment implemented by modifying a configuration of the sound guide member 515 of the sound generating apparatus 500 in the apparatus according to an example embodiment of the present disclosure illustrated in FIGS. 13 and 14. In the following description, therefore, only the sound guide member 515 and relevant elements may be described. The other elements may be referred to by the same reference numerals as FIGS. 13 and 14, and their repetitive descriptions may be omitted.

With reference to FIG. 15, a sound guide member 515 according to another example embodiment of the present disclosure may include a first guide part 515_a_ and a second guide part 515_f_.

The first guide part 515_a_ may be disposed at a case member 511 and may be configured to cover a vibration plate 513_c_ of a sound generator 513. The first guide part 515_a_ may be disposed at or coupled to the case member 511 so as to be inclined. A first space SP1 may be formed between the first guide part 515_a_ and the sound generator 513. The first guide part 515_a_ may be substantially the same as the first guide part 515_a_ of the sound guide member 515 described above with reference to FIGS. 7 to 14. Thus, repetitive descriptions thereof may be omitted. For example, the first guide part 515_a_ may be a first sound guide part, a slope guide part, an inclined guide part, a sound adjustment part, or a sound adjustment surface, or the like, but embodiments of the present disclosure are not limited thereto.

The second guide part 515_f_ may extend from the first guide part 515_a_ to cover or overlap a circuit cover 200. The second guide part 515_f_ may extend in a flat shape from an end of the first guide part 515_a_. The second guide part 515_f_ may extend from the end of the first guide part 515_a_ in parallel with a first cover part 211 of the circuit cover 200. The second guide part 515_f_ may be configured to cover a suspension 513_d_ of the sound generator 513, a tilt part 511_e_ of the case member 511, and a portion of a circuit cover 200. For example, the second guide part 515_f_ may be a second sound guide part, a rectilinear guide part, or a linear guide part, or the like, but embodiments of the present disclosure are not limited thereto.

A first sound guide space SGS1 may be formed between the second guide part 515_f_ and the tilt part 511_e_ of the case member 511, and a second sound guide space SGS2 may be formed between the second guide part 515_f_ and the circuit cover 200. The first sound guide space SGS1 may be formed between a portion of the second guide part 515_f_ and the tilt part 511_e_ of the case member 511 and may be connected (or may communicate) with the first space SP1. The second sound guide space SGS2 may be formed between the second guide part 515_f_ and a first cover part 211 of the circuit cover 200 and may be connected (or may communicate) with the first sound guide space SGS1. The second sound guide space SGS2 may be connected (or may communicate) with an external space of the apparatus. Accordingly, a sound (or a forward sound FSS) generated in the first space SP1 based on a vibration (or driving) of the sound generator 513 may be output (or radiated) in a vertical direction VD (or a first vertical direction VD1) of a vibration member 100 via the first sound guide space SGS1 and the second sound guide space SGS2. For example, the forward sound FSS of the sound generator 513 may be a sound which is output by a vibration of the vibration plate 513_c_ of the sound generator 513. For example, the forward sound FSS of the sound generator 513 may be a sound which is output in a rearward direction of the vibration member 100 with respect to the vibration member 100. For example, the forward sound FSS of the sound generator 513 may be a sound which is output in a rearward direction, which is opposite to the forward direction FD, of the apparatus from the sound generator 513.

The sound guide member 515 according to another example embodiment of the present disclosure may further include a guide tip (or a sound guide tip) 515_d_ which is sharply configured at an end of the second guide part 515_f_. The guide tip 515_d_ may overlap the circuit cover 200. The guide tip 515_d_ may overlap the second cover part 213 of the circuit cover 200. Accordingly, the guide tip 515_d_ may provide a sound discharge space (or a sound emitting space) on the second cover part 213 of the circuit cover 200. The sound discharge space may be formed between the guide tip 515*d* and the second cover part 213 of the circuit cover 200. Thus, a sound passing through the first sound guide space SGS1 and the second sound guide space SGS2 may be output (or radiated) in the vertical direction VD (or the first vertical direction VD1) of the vibration member through the sound discharge space.

The sound generating apparatus 500 according to another example embodiment of the present disclosure may output a first sound S1 in a forward direction FD of the vibration member 100, based on a vibration (or driving) of the sound generator 513, and may simultaneously output a second sound S2 in the vertical direction VD of the vibration member 100.

The first sound S1 may be generated by a vibration of the vibration member 100 based on a rearward sound RSS of a sound generator 513 generated in the second space SP2 by a vibration of a vibration plate 513*c* based on a vibration (or driving) of the sound generator 513 and may be output in the forward direction FD of the vibration member 100. For example, the rearward sound RSS of the sound generator 513 may be transferred to the vibration member 100 through a hole 350 of a supporting member 300 and one or more opening portions 513*o* which are in the sound generator 513, and the vibration member 100 may vibrate based on the rearward sound RSS of the sound generator 513 to output the first sound S1 in a forward direction FD. For example, the rearward sound RSS of the sound generator 513 may be directly transferred to the backlight 130 of the vibration member 100 through the hole 350 of the supporting member 300. Accordingly, the sound (or the rearward sound) of the sound generator 513 may be efficiently transferred to the vibration member 100. Thus, a sound characteristic and/or a sound pressure level characteristic of a first sound S1 generated based on a vibration of the vibration member 100 may be further enhanced.

The second sound S2 may be generated based on a forward sound FSS of the sound generator 513 generated in the first space SP1 by a vibration of the vibration plate 513*c* based on a vibration (or driving) of the sound generator 513 of the sound generating apparatus 500 and may be output in the vertical direction VD (or the first vertical direction VD1) of the vibration member 100, based on the guide of a sound guide member 515 configured at the sound generating apparatus 500. For example, the forward sound FSS of the sound generator 513 may be a second sound S2 passing through the first sound guide space SGS1 and the second sound guide space SGS2 which are configured by the sound guide member 515 and may be output in the vertical direction VD of the vibration member 100. For example, the second sound S2 may be output in the vertical direction VD (or the first vertical direction VD1) of the vibration member 100.

The second sound S2 according to an example embodiment of the present disclosure may include a portion of a rearward sound RSS of the sound generator 513. For example, the portion of the rearward sound RSS of the sound generator 513 generated in a second space SP2 may be a portion of the second sound S2 output through the hole part 217 and an inner space SGS3 of the circuit cover 200 and may be output in the vertical direction VD of the vibration member 100. The second sound S2 may include the portion of the rearward sound RSS of the sound generator 513. Thus, a sound characteristic and/or a sound pressure level characteristic may be enhanced. For example, the second sound S2 passing through the first sound guide space SGS1 and the second sound guide space SGS2 and a portion of the rearward sound RSS output (or radiated) through the hole part 217 and the inner space SGS3 of the circuit cover 200 may be mixed with each other or amplified at a periphery of (or around) the hole part 217 and may be output in the vertical direction VD (or a first vertical direction VD1) of the vibration member 100.

According to an example embodiment of the present disclosure, the portion of the rearward sound RSS of the sound generator 513 generated in the second space SP2 may be a third sound S3 and may be output in the vertical direction VD (or a second vertical direction VD2) of the vibration member 100 through a plurality of lateral holes 511*f* which are in the sound generating apparatus 500.

The sound guide member 515 described above with reference to FIG. 15 may be applied to the sound guide member 515 described above with reference to FIGS. 7 to 12. For example, the sound guide member 515 described above with reference to FIGS. 7 to 12 may be replaced with the sound guide member 515 described above with reference to FIG. 15.

Figure 16:
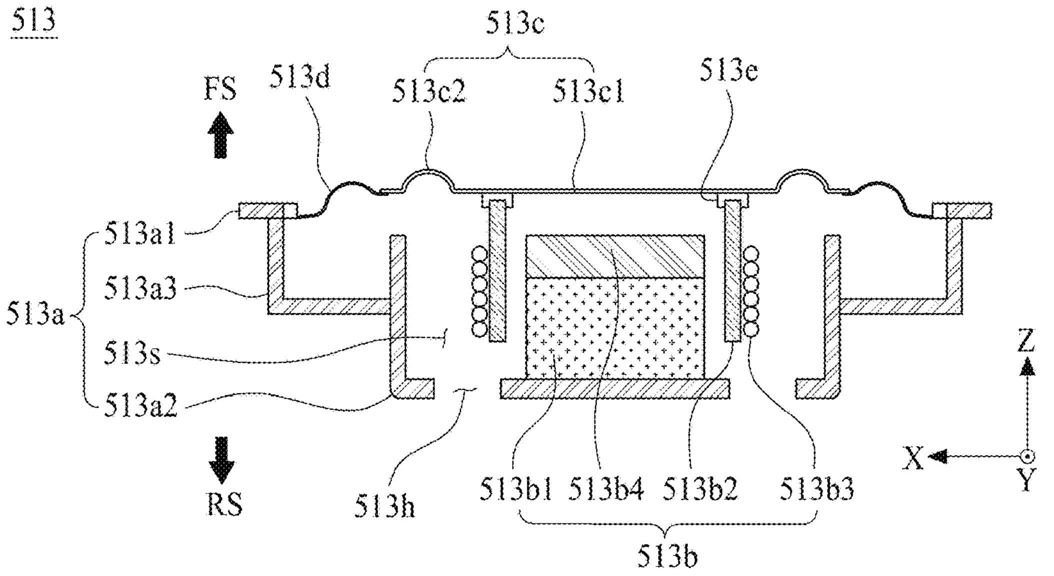
FIG. 16 illustrates a sound generator according to an example embodiment of the present disclosure.
Figure 17:
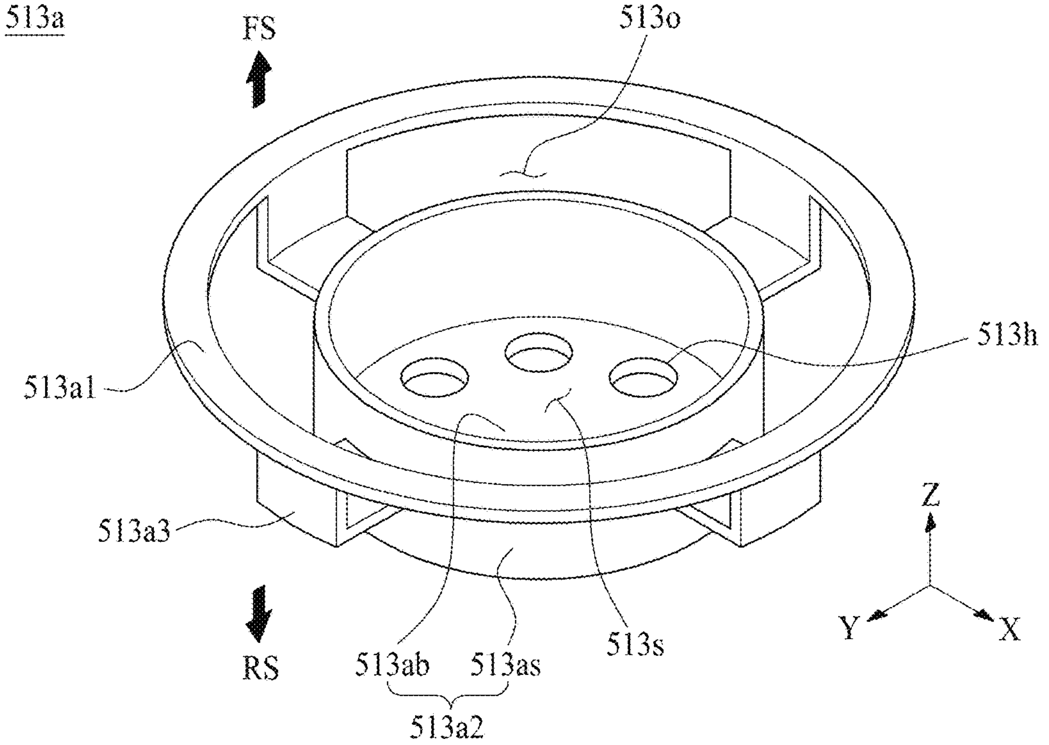
FIG. 17 illustrates a base frame illustrated in FIG. 16 according to an example embodiment of the present disclosure.

FIG. 16 illustrates a sound generator according to an example embodiment of the present disclosure. FIG. 17 illustrates a base frame illustrated in FIG. 16 according to an example embodiment of the present disclosure. FIGS. 16 and 17 are cross-sectional and perspective views, respectively, illustrating the example sound generator illustrated in FIGS. 4, 8 to 10, and 12 to 15.

With reference to FIGS. 16 and 17, a sound generator 513 according to an example embodiment of the present disclosure may include a base frame 513*a*, a magnetic circuit part 513*b*, a vibration plate 513*c*, and a suspension 513*d*.

The base frame (or a base member) 513*a* may be configured to be connected to the case member 511. The base frame 513*a* may be supported by or connected to a first supporting part 511*a* of a case member 511 and may be accommodated (or inserted) into an accommodating hole 511*h* which is in the first supporting part 511*a*. For example, the base frame 513*a* may be a module frame, but embodiments of the present disclosure are not limited thereto.

The base frame 513*a* according to an example embodiment of the present disclosure may include a first frame part 513*a*1, a second frame part 513*a*2, a plurality of frame connection parts 513*a*3, and a plurality of opening portions 513*o*.

The first frame part 513*a*1 may be configured to be connected to the case member 511. The first frame part 513*a*1 may include an opening portion (or a hollow portion). For example, the first frame part 513*a*1 may have a circular ring shape or a circular band shape. The first frame part 513*a*1 may be supported by the first supporting part 511*a* of the case member 511. For example, the first frame part 513*a*1 may be connected or coupled to the first supporting part 511*a* of the case member 511 by a coupling member. The coupling member may be an adhesive, a double-sided tape, a double-sided foam tape, a double-sided cushion tape, or a screw, or the like, but embodiments of the present disclosure are not limited thereto.

The second frame part 513*a*2 may be accommodated into or overlap the opening portion of the first frame part 513*a*1. The second frame part 513*a*2 may include an accommodating part (or a concave portion) 513*s* for accommodating the magnetic circuit part 513*b*. The second frame part 513*a*2 may include a box shape where one side (or an upper portion) is opened. For example, the second frame part 513*a*2 may include a floor portion (or a bottom portion)

513*ab* and a sidewall portion 513 as connected to the floor portion 513*ab* so that one side (or an upper portion) is open. For example, the second frame part 513*a*2 may be disposed under the first frame part 513*a*1.

The plurality of frame connection parts 513*a*3 may be connected between the first frame part 513*a*1 and the second frame part 513*a*2. The plurality of frame connection parts 513*a*3 may be configured at a predetermined interval between the first frame part 513*a*1 and the second frame part 513*a*2.

One side (or one end) of each of the plurality of frame connection parts 513*a*3 may be connected or coupled to a rear surface (or a backside surface) of the first frame part 513*a*1, and the other side (or the other end) of each of the plurality of frame connection parts 513*a*3 may be connected or coupled to a lateral surface of the second frame part 513*a*2. For example, each of the plurality of frame connection parts 513*a*3 may be configured to have an 'L'-shape between the first frame part 513*a*1 and the second frame part 513*a*2, but embodiments of the present disclosure are not limited thereto.

The plurality of opening portions 513*o* may be provided between the plurality of frame connection parts 513*a*3. Each of the plurality of opening portions 513*o* may be provided between two adjacent frame connection parts 513*a*3 of the plurality of frame connection parts 513*a*3. The plurality of opening portions 513*o* may connect or communicate an upper space (or a front space) and a lower space (or a rear space) of the base frame 513*a* with each other.

The magnetic circuit part 513*b* may be configured at the base frame 513*a* to vibrate the vibration plate 513*c*. The magnetic circuit part 513*b* may be configured to be accommodated into the accommodating part 513*s* of the base frame 513*a*. The magnetic circuit part 513*b* may be configured to be accommodated into the accommodating part 513*s* of the second frame part 513*a*2.

The magnetic circuit part 513*b* may include a magnet 513*b*1, a bobbin 513*b*2, a coil 513*b*3, and a center pole 513*b*4.

The magnetic circuit part 513*b* according to an example embodiment of the present disclosure may have a structure of an external magnetic type (or a dynamic type) where the magnet 513*b*1 is disposed at an outer side (or outside) of the coil 513*b*3 (or the bobbin 513*b*2), or may have a structure of an internal magnetic type where the magnet 513*b*1 is disposed at an inner side (or inside) of the coil 513*b*3 (or the bobbin 513*b*2) as illustrated in FIG. 16. A sound generator 513 of the internal magnetic type may be low in leakage magnetic flux and may have a smaller overall size. The sound generating apparatus 500 may include a sound generator 513 of the external magnetic type or the internal magnetic type, but in the following description, an example will be described where the sound generator 513 of the internal magnetic type is provided.

The magnet 513*b*1 may be disposed (or accommodated) in the accommodating part 513*s* of the base frame 513*a*. The magnet 513*b*1 may be disposed at the floor portion 513*ab* of the second frame part 513*a*2 configured in the base frame 513*a*. The magnet 513*b*1 may be a permanent magnet. For example, the magnet 513*b*1 may have a circular shape or a circular plate shape. For example, the magnet 513*b*1 may be a magnet member, but embodiments of the present disclosure are not limited thereto.

The bobbin 513*b*2 may be disposed (or configured) to surround the magnet 513*b*1. For example, the bobbin 513*b*2 may be disposed (or accommodated) in the accommodating part 513*s* of the base frame 513*a* to surround a periphery of (or around) the magnet 513*b*1. For example, the bobbin 513*b*2 may be disposed not to overlap the magnet 513*b*1 in a plan view. For example, the bobbin 513*b*2 may be disposed to move (or vibrate) in a vertical direction along a thickness or third direction Z of the sound generator 513 at the accommodating part 513*s* near the magnet 513*b*1.

The bobbin 513*b*2 may include a material obtained by processing pulp or paper, aluminum or magnesium or an alloy thereof, synthetic resin such as polypropylene or a polyamide-based fiber, or the like, but embodiments of the present disclosure are not limited thereto. The bobbin 513*b*2 may have a circular shape or an oval shape having a hollow portion, but embodiments of the present disclosure are not limited thereto. The bobbin 513*b*2 having an oval shape may improve a sound of a high-pitched sound band compared to the bobbin 513*b*2 having a circular shape and may decrease the occurrence of heat caused by a vibration. Thus, the bobbin 513*b*2 having an oval shape may have an excellent heat dissipation characteristic.

The coil 513*b*3 may be wound around an outer circumferential surface of the bobbin 513*b*2. The coil 513*b*3 may be raised or lowered together with the bobbin 513*b*2. The coil 513*b*3 may be supplied with a signal (or a current) from an external source for generating a vibration (or generating a sound). The coil 513*b*3 may be referred to as a voice coil, or the like, but embodiments of the present disclosure are not limited thereto. For example, the bobbin 513*b*2 and the coil 513*b*3 may collectively be referred to as a voice coil, but embodiments of the present disclosure are not limited thereto.

According to an example embodiment of the present disclosure, when a signal is applied to the coil 513*b*3, the bobbin 513*b*2 may vibrate in a vertical direction along the thickness direction Z of the sound generator 513 according to Fleming's left hand rule based on an application magnetic field formed around the coil 513*b*3 and a magnetic field formed around the magnet 513*b*1. For example, a magnetic flux generated by the magnetic field may flow along a closed loop configured with the base frame 513*a*, the magnet 513*b*1, and the coil 513*b*3. Accordingly, the bobbin 513*b*2 may vibrate in a vertical direction Z.

The center pole 513*b*4 may be disposed (or configured) over the magnet 513*b*1. The center pole 513*b*4 may be inserted (or accommodated) into a hollow portion of the bobbin 513*b*2, or may be surrounded by the bobbin 513*b*2. The center pole 513*b*4 may be configured in the same or substantially the same shape as that of the magnet 513*b*1. The center pole 513*b*4 may guide a vertical reciprocating motion of the bobbin 513*b*2. For example, the center pole 513*b*4 may be provided as one body with the magnet 513*b*1. For example, the center pole 513*b*4 may be an elevation guider or pole pieces, or the like, but embodiments of the present disclosure are not limited thereto.

The vibration plate 513*c* may be configured to be connected to the bobbin 513*b*2 of the magnetic circuit part 513*b*. For example, the vibration plate 513*c* may include a circular plate shape, but embodiments of the present disclosure are not limited thereto. For example, the vibration plate 513*c* may have an oval plate shape. The vibration plate 513*c* may vibrate based on a vibration (or a vertical motion) of the bobbin 513*b* to output a sound. For example, a sound generated based on a vibration of the vibration plate 513*c* may be output in an upward (or forward) direction FS of the vibration plate 513*c* and may simultaneously be output in a downward (or rearward) direction RS of the vibration plate 513*c* through the one or more opening portions 513*o* which are in the base frame 513*a*.

According to an example embodiment of the present disclosure, the vibration plate 513*c* may be disposed toward a supporting member, or may be disposed in a direction opposite to a direction toward the supporting member. For example, the vibration plate 513*c*, as illustrated in FIGS. 8 to 10, may be disposed in a direction opposite to a direction toward the supporting member and may face or directly face the sound guide member 515.

The vibration plate 513*c* according to an example embodiment of the present disclosure may include a first vibration plate 513*c*1 and a second vibration plate 513*c*2. For example, the vibration plate 513*c* may be a sound generating plate or a sound wave generating plate, but embodiments of the present disclosure are not limited thereto.

The first vibration plate 513*c*1 may be configured to be connected to the bobbin 513*b*2 of the magnetic circuit part 513*b*. For example, the first vibration plate 513*c*1 may be configured at a center portion of the vibration plate 513*c*. The first vibration plate 513*c*1 may vibrate based on a vibration (or a vertical motion) of the bobbin 513*b*2 to output a sound. For example, the first vibration plate 513*c*1 may have a plate shape. For example, the first vibration plate 513*c*1 may be a main vibration plate, but embodiments of the present disclosure are not limited thereto.

The second vibration plate 513*c*2 may be connected to the first vibration plate 513*c*1 and may be configured to surround the first vibration plate 513*c*1. For example, the second vibration plate 513*c*2 may be a periphery portion of the vibration plate 513*c*. The second vibration plate 513*c*2 may vibrate based on a vibration (or a vertical motion) of the bobbin 513*b*2 or may vibrate based on a vibration of the first vibration plate 513*c*1, and thus may output a sound. For example, the second vibration plate 513*c*2 may have a plate shape or a creased structure. For example, the second vibration plate 513*c*2 may be a sub vibration plate, a secondary vibration plate, or an auxiliary vibration plate, but embodiments of the present disclosure are not limited thereto.

Each of the first vibration plate 513*c*1 and the second vibration plate 513*c*2 may include a material which is suitable for generating or outputting a sound based on a vibration. For example, the first vibration plate 513*c*1 and the second vibration plate 513*c*2 may be configured with the same material or different materials. For example, each of the first vibration plate 513*c*1 and the second vibration plate 513*c*2 may include one or more of metal, plastic, paper, fiber, cloth, leather, wood, rubber, glass, and a mirror, but embodiments of the present disclosure are not limited thereto. For example, the paper may be a cone paper for speakers. For example, the cone paper may be pulp or foamed plastic, or the like, but embodiments of the present disclosure are not limited thereto.

The suspension 513*d* may be connected between the base frame 513*a* and the vibration plate 513*c*. The suspension 513*d* may be connected between the first frame part 513*a*1 of the base frame 513*a* and the vibration plate 513*c*. The suspension 513*d* may be connected between the first frame part 513*a*1 of the base frame 513*a* and the second vibration plate 513*c*2 of the vibration plate 513*c*. The suspension 513*d* may be configured to adjust a vibration of the bobbin 513*b*2 while contracting and expanding based on a vibration (or a vertical motion) of the bobbin 513*b*2. The suspension 513*d* may be configured to limit a vibration distance of the bobbin 513*b*2 based on a restoring force. For example, when the bobbin 513*b*2 vibrates by a certain distance or more or vibrates by a certain distance or less, the bobbin 513*b*2 may be restored to an original position with a restoring force of the suspension 513*d*. For example, the suspension 513*d* may include a creased structure between the base frame 513*a* and the vibration plate 513*c*. For example, the suspension 513*d* may be a damper, a spider, or an edge, or the like, but embodiments of the present disclosure are not limited thereto.

The sound generator 513 may further include a protection member 513*e*.

The protection member 513*e* may be configured to protect the bobbin 513*b*2 from an impact or prevent the deformation of the bobbin 513*b*2 caused by an impact. The protection member 513*e* may be configured to protect the bobbin 513*b*2 and transfer a vibration of the bobbin 513*b*2 to the vibration plate 513*c*. The protection member 513*e* may vibrate together with the bobbin 513*b*2. The protection member 513*e* may be disposed between the vibration plate 513*c* and the bobbin 513*b*2. For example, the protection member 513*e* may be configured to increase a coupling force between a rear surface of the vibration plate 513*c* and the bobbin 513*b*2. For example, the protection member 513*e* may be implemented to prevent potential detachment or stripping of the bobbin 513*b*2 from the rear surface of the vibration plate 513*c*. For example, the protection member 513*e* may be a ring-shaped plate member attached on a front surface of the bobbin 513*b*2, a circular plate member covering the front surface of the bobbin 513*b*2, or a cap member surrounding a front end portion of the bobbin 513*b*2. For example, the protection member 513*e* may be a bobbin protection member, an intermediate member, or a bobbin ring, but embodiments of the present disclosure are not limited thereto.

The sound generator 513 may further include one or more holes 513*h*.

The one or more holes 513*h* may be configured at the base frame 513*a*. The one or more holes 513*h* may be formed at the second frame part 513*a*2 of the base frame 513*a*. The one or more holes 513*h* may be formed to pass through the floor portion 513*ab* of the second frame part 513*a*2. The one or more holes 513*h* may be configured to connect or communicate the accommodating part 513*s* of the second frame part 513*a*2 with a lower space (or a rear space) of the base frame 513*a*. For example, the one or more holes 513*h* may perform a function of providing a heat dissipation path for dissipating heat which occurs due to driving (or vibration) of the sound generator 513, a function of increasing a sound pressure level based on driving (or vibration) of the sound generator 513, and a function of decreasing a weight of the sound generator 513.

The one or more holes 513*h* may overlap the coil 513*b*3. A diameter of each of the one or more holes 513*h* may be greater than that of the coil 513*b*3. Accordingly, heat occurring in the coil 513*b*3 when the sound generator 513 is vibrating may be more quickly dissipated to the outside through the one or more holes 513*h*. For example, the one or more holes 513*h* may have any one of a circular shape, an oval shape, and a slit shape, but embodiments of the present disclosure are not limited thereto.

Figure 18:
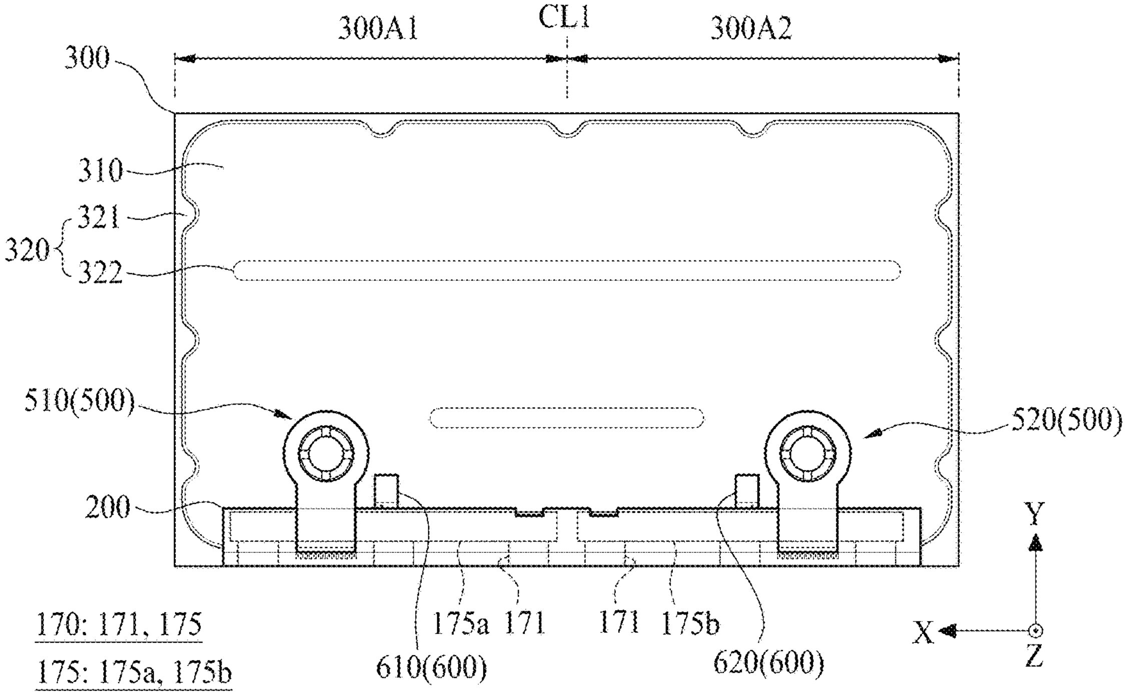
FIG. 18 illustrates an apparatus according to another example embodiment of the present disclosure.
Figure 19:
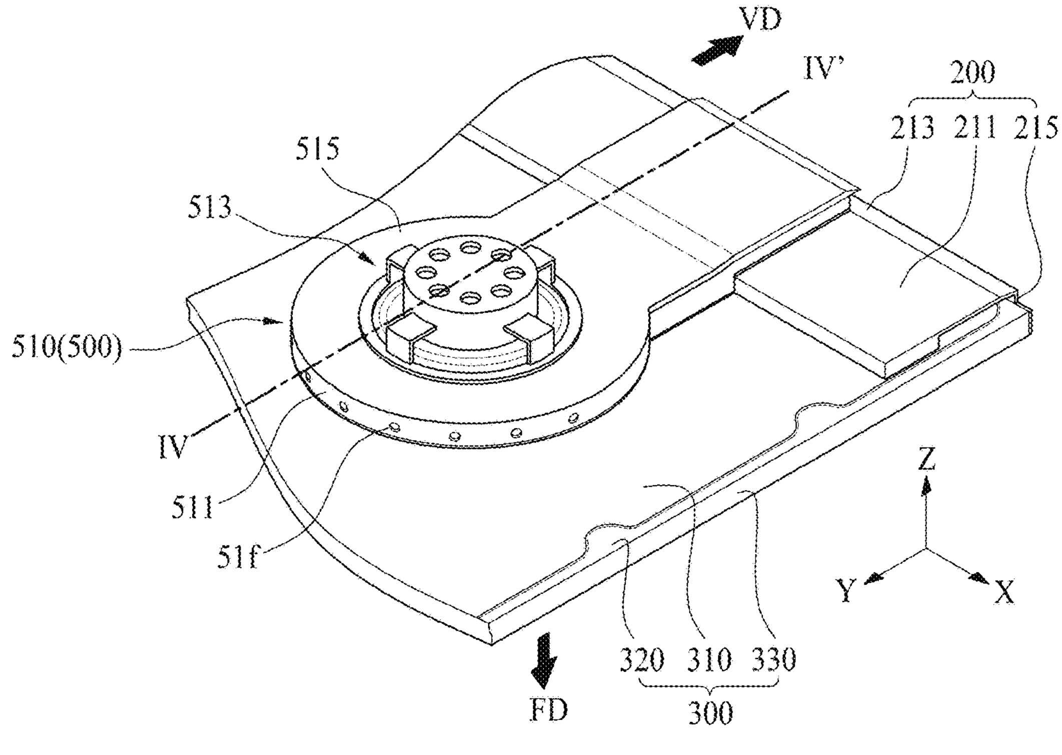
FIG. 19 illustrates an arrangement structure of a sound generating apparatus illustrated in FIG. 18 according to another example embodiment of the present disclosure.
Figure 20:
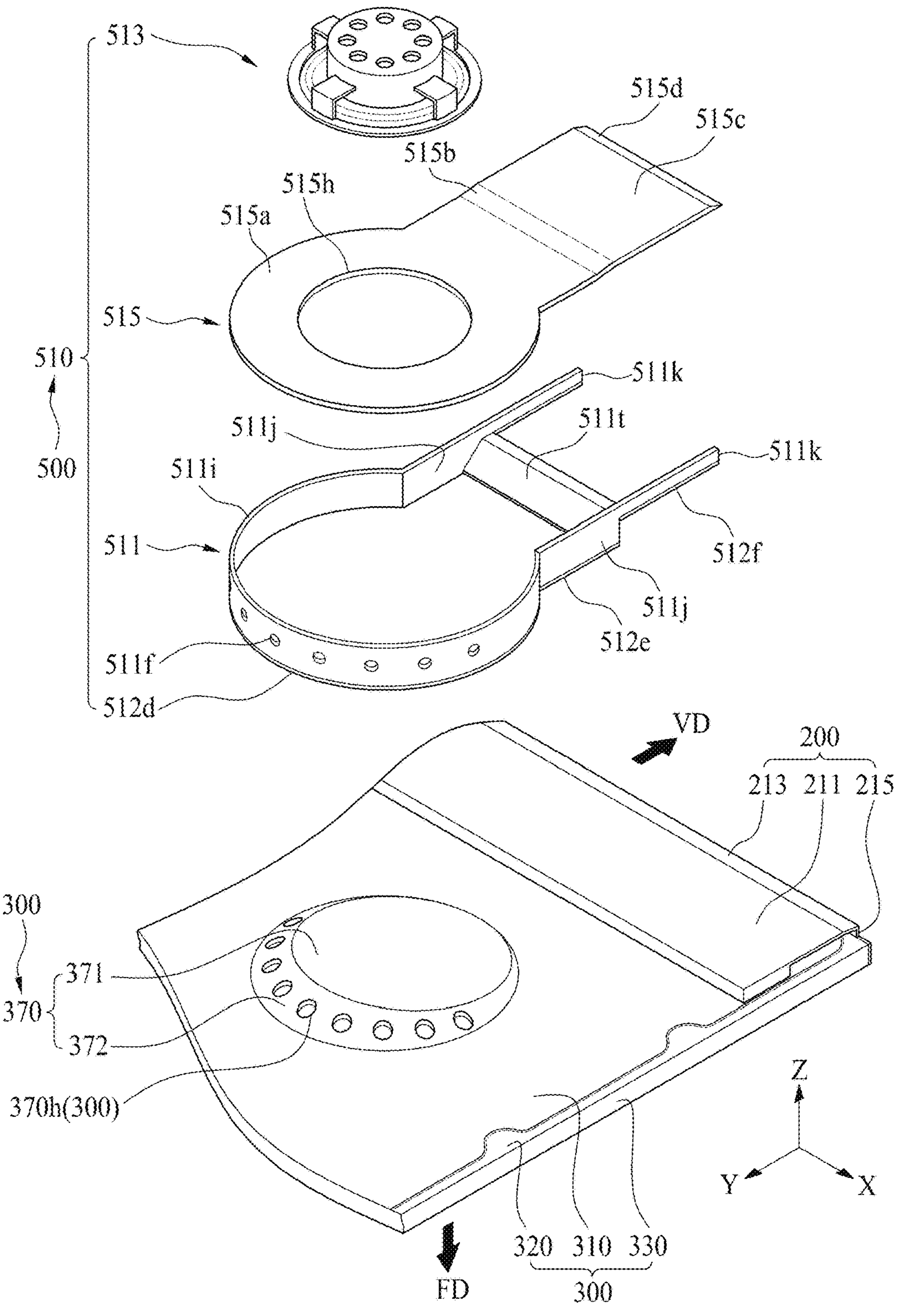
FIG. 20 is an exploded perspective view illustrating a supporting member, a circuit cover, and a sound generating apparatus illustrated in FIG. 19 according to another example embodiment of the present disclosure.
Figure 21:
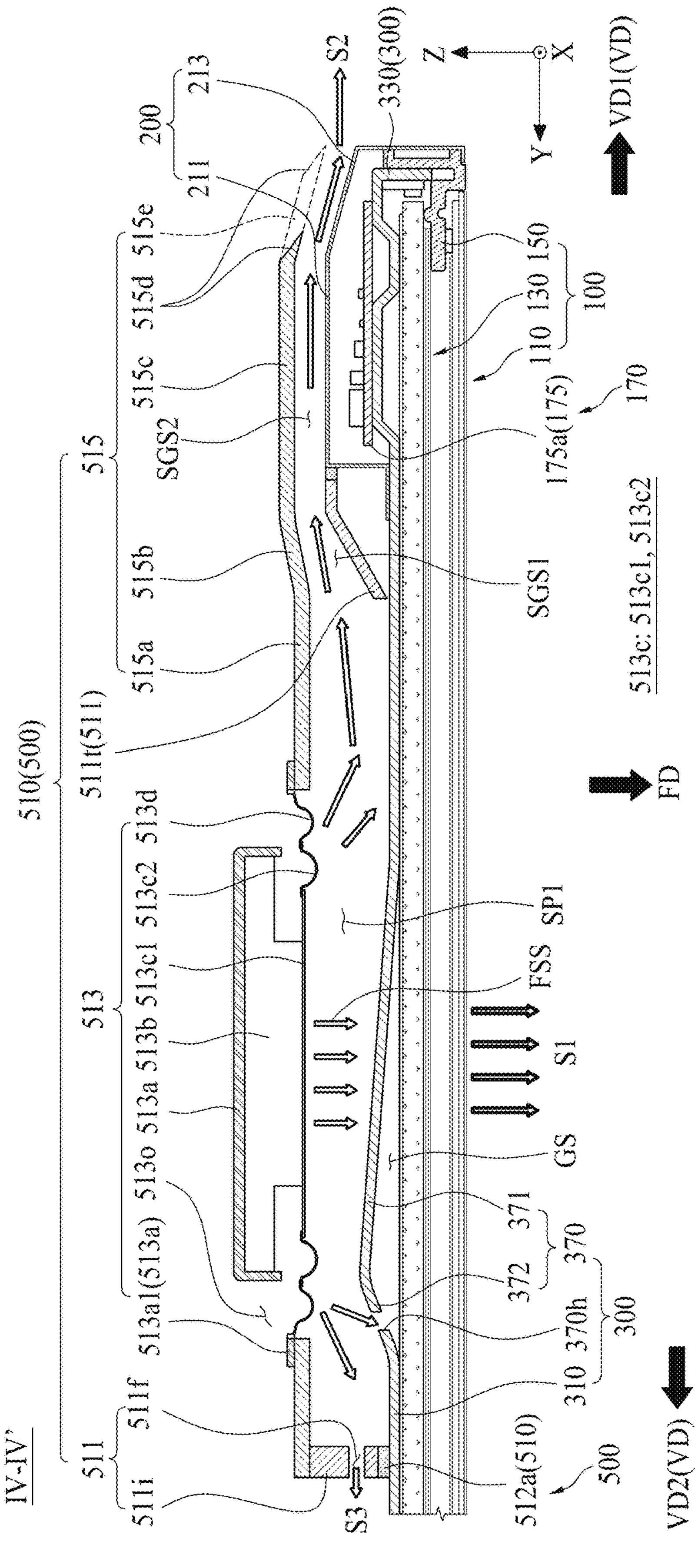
FIG. 21 is an example cross-sectional view taken along line IV-IV' illustrated in FIG. 19 according to another example embodiment of the present disclosure.

FIG. 18 illustrates an apparatus according to another example embodiment of the present disclosure. FIG. 19 illustrates an arrangement structure of a sound generating apparatus illustrated in FIG. 18 according to another example embodiment of the present disclosure. FIG. 20 is an exploded perspective view illustrating a supporting member, a circuit cover, and a sound generating apparatus illustrated in FIG. 19 according to another example embodiment of the present disclosure. FIG. 21 is a cross-sectional view taken along line IV-IV' illustrated in FIG. 19 according to another example embodiment of the present disclosure. FIGS. 18 to 21 illustrate an example embodiment implemented by modifying the supporting member and the sound generating apparatus in the example apparatus described above with reference to FIGS. 1 to 12. In the following description, therefore, only a supporting member, a sound generating apparatus, and elements relevant thereto may be described. The other elements may be referred to by the same reference numerals as in FIGS. 1 to 12, and repetitive descriptions thereof may be omitted.

With reference to FIGS. 18 to 21, in an apparatus according to another example embodiment of the present disclosure, a supporting member 300 may further include a protrusion part 370.

The protrusion part 370 may be configured at a rear surface of a supporting member 300 to overlap a sound generating apparatus 500. The protrusion part 370 may be configured to be inclined with respect to a rear surface of the supporting member 300 overlapping the sound generating apparatus 500. The protrusion part 370 may be provided to be inclined with respect to a rear part 310 of the supporting member 300 overlapping the sound generating apparatus 500. The protrusion part 370 may protrude from the rear part 310 of the supporting member 300 to include a sloped portion. For example, the protrusion part 370 may protrude in a rearward (or backside) direction of the supporting member 300 from the rear part 310 of the supporting member 300 to include a cross-sectional surface having a triangular shape. The protrusion part 370 may be configured to guide or reflect a sound, output from the sound generating apparatus 500, in a vertical direction VD of a vibration member 100. The protrusion part 370 may be configured to vibrate based on a sound output from the sound generating apparatus 500.

The protrusion part 370 may include a first slope portion 371 and a second slope portion 372.

The first slope portion 371 may overlap the sound generating apparatus 500 and may protrude in the rearward (or backside) direction of the supporting member 300 from the rear part 310 of the supporting member 300 to have a predetermined slope (or gradient). The first slope portion 371 may have a circular shape one-dimensionally, but embodiments of the present disclosure are not limited thereto, for example, the first slope portion 371 may have an oval shape one-dimensionally. The first slope portion 371 may have a height which decreases progressively toward a circuit cover 200, with respect to the rear part 310 of the supporting member 300. The first slope portion 371 may reflect a sound, output from the sound generating apparatus 500, toward the circuit cover 200. For example, the first slope portion 371 may reflect a sound, output in a forward direction FD of a vibration member 100 from the sound generating apparatus 500, in a vertical direction VD (or a first vertical direction VD1) of the vibration member 100. For example, the first slope portion 371 may be a first inclined portion, a first sound reflection portion, or a first sound reflection surface, or the like, but embodiments of the present disclosure are not limited thereto.

The second slope portion 372 may overlap the sound generating apparatus 500 and may protrude between the rear part 310 of the supporting member 300 and the first slope portion 371 to have a predetermined slope (or gradient). The second slope portion 372 may have an arc shape one-dimensionally. A height of the second slope portion 372 may decrease progressively toward the rear part 310 of the supporting member 300 from the first slope portion 371. For example, the second slope portion 372 may reflect a sound, output in the forward direction FD of the vibration member 100 from the sound generating apparatus 500, in the vertical direction VD (or a second vertical direction VD2) of the vibration member 100. For example, the second slope portion 372 may be a second inclined portion, a second sound reflection portion, or a second sound reflection surface, or the like, but embodiments of the present disclosure are not limited thereto.

The apparatus according to another example embodiment of the present disclosure may further include a gap space GS provided between the vibration member 100 and the supporting member 300.

The gap space GS may be provided between the protrusion part 370 of the supporting member 300 and the vibration member 100. For example, the gap space GS may be provided between the protrusion part 370 of the supporting member 300 and a backlight 130 of the vibration member 100. For example, the gap space GS may be provided between the protrusion part 370 of the supporting member 300 and the reflective sheet 137 of the backlight 130. The gap space GS may include a space where a sound or a sound pressure level is generated based on a vibration of the protrusion part 370, a space where a vibration of the protrusion part 370 is smoothly performed, or a space where a sound wave generated based on a vibration of the sound generating apparatus 500 is propagated to the vibration member 100. For example, the gap space GS may be an air gap, a sound pressure level generating space, a sound space, a sound pressure level space, a sounding part, a sounding box, or a sound energy incident part, or the like, but embodiments of the present disclosure are not limited thereto.

The supporting member 300 may further include one or more holes 370*h* which are formed in the protrusion part 370. The one or more holes 370*h* may be formed at the second slope portion 372 of the protrusion part 370. The one or more holes 370*h* may be formed to pass through the second slope portion 372. The one or more holes 370*h* may be formed to connect (or communicate) a gap space GS, formed between the protrusion part 370 of the supporting member 300 and the vibration member 100, with a rear space of the supporting member 300. The one or more holes 370*h* may be configured to adjust an air impedance of the gap space GS.

The circuit cover 200 may include the first cover part 211, the second cover part 213, and the third cover part 215 described above with reference to FIGS. 2 to 6. Thus, repetitive descriptions thereof may be omitted.

The sound generating apparatus 500 or each of a first sound generating apparatus 510 and a second sound generating apparatus 520 may include a case member 511, a sound generator 513, and a sound guide member 515.

The case member 511 may be disposed at the rear part 310 of the supporting member 300 to surround the protrusion part 370 which is at a rear surface of the supporting member 300. The case member 511 may be disposed at a rear part 310 of the supporting member 300 to overlap a portion of a circuit cover 200. The case member 511 may be configured to cover the protrusion part 370 of the supporting member 300 and the portion of a circuit cover 200.

The case member 511 according to an example embodiment of the present disclosure may include a first supporting part 511*i*, a second supporting part 511*j*, and a third supporting part 511*k*.

The first supporting part 511*i* may be configured to surround the protrusion part 370 which is at the rear surface of the supporting member 300. For example, the first supporting part 511*i* may have a curved or generally circular shape with one side open. For example, the first supporting part 511*i* may include an arc shape which surrounds the protrusion part 370. For example, the first supporting part 511*i* may include one end (or one side or one portion), the other end (or the other side or the other portion), and a circumference portion having an arc shape between one end (or one side or one portion) and the other end (or the other side or the other portion). For example, the first supporting part 511*i* may have a C-shape one-dimensionally. The first supporting part 511*i* may be connected or coupled to the rear surface of the supporting member 300 by a first coupling member 512*d*. For example, the first coupling member 512*d* may be a first connection member, but embodiments of the present disclosure are not limited thereto.

The second supporting parts 511*j* may be connected to one end (or one side or one portion) and the other end (or the other side or the other portion) of the first supporting part 511*i*, respectively. The second supporting parts 511*j* may extend along a second direction Y respectively from the one end (or the one side or the one portion) and the other end (or the other side or the other portion) of the first supporting part 511*i*. The second supporting parts 511*j* may be disposed between the protrusion part 370 of the supporting member 300 and the circuit cover 200. The second supporting parts 511*j* may include a pair of second supporting parts 511*j*. The pair of second supporting parts 511*j* may extend along the second direction Y respectively from the one end (or the one side or the one portion) and the other end (or the other side or the other portion) of the first supporting part 511*i*. For example, the pair of second supporting parts 511*j* may extend in parallel along the second direction Y respectively from the one end (or the one side or the one portion) and the other end (or the other side or the other portion) of the first supporting part 511*i*. The second supporting parts 511*j* may be connected or coupled to the rear surface of the supporting member 300 by a second coupling member 512*e*. For example, the second coupling member 512*e* may be a second connection member, but embodiments of the present disclosure are not limited thereto.

The third supporting parts 511*k* may overlap the circuit cover 200 and may be connected respectively to the second supporting parts 511*j*. The third supporting parts 511*k* may extend along the second direction Y respectively from the second supporting parts 511*j* and may be disposed at the first cover part 211 of the circuit cover 200. The third supporting parts 511*k* may include a pair of third supporting parts 511*k*. The pair of third supporting parts 511*k* may extend along the second direction Y respectively from the pair of second supporting parts 511*j*. For example, the pair of third supporting parts 511*k* may extend in parallel along the second direction Y respectively from the pair of second supporting parts 511*j*. The third supporting parts 511*k* may be connected or coupled to the rear surface of the supporting member 300 by a third coupling member 512*f*. For example, the third coupling member 512*f* may be a third connection member, but embodiments of the present disclosure are not limited thereto.

The sound guide member 515 may be configured to cover the case member 511. The sound guide member 515 according to an example embodiment of the present disclosure may include a first guide part 515*a*, a second guide part 515*b*, and a third guide part 515*c*.

The first guide part (or a first guide cover part) 515*a* may be configured to cover the first supporting part 511*i* of the case member 511. The first guide part 515*a* may be configured to cover a portion of each of the first supporting part 511*i* and the second supporting parts 511*j* of the case member 511. The first guide part 515*a* may include a shape corresponding to a portion of each of the first supporting part 511*i* and the second supporting parts 511*j* of the case member 511. For example, the first guide part 515*a* may include a circular plate and a protrusion plate which extends or protrudes from one side (or one portion) of the circular plate.

The first guide part 515*a* and the first supporting part 511*i* of the case member 511 may provide a first space SP1 at the protrusion part 370 of the supporting member 300 and a periphery of the protrusion part 370. The first space SP1 may be a sound space, a sound output space, a front space, a vibration space, or a front sound space, or the like corresponding to the sound generator 513, but embodiments of the present disclosure are not limited thereto.

The first guide part 515*a* may be configured to support the sound generator 513. For example, a circular plate of the first guide part 515*a* may be configured to support the sound generator 513.

The first guide part 515*a* may further include a through hole 515*h*. The through hole 515*h* may be configured to pass through the circular plate of the first guide part 515*a*. The through hole 515*h* may be formed to have a size which is smaller than that of the sound generator 513.

The second guide part 515*b* may extend from the first guide part 515*a*. The second guide part 515*b* may extend along the second direction Y from the first guide part 515*a* and may be configured to cover the other portion of the second supporting part 511*j* of the case member 511. The second guide part 515*b* may extend from the first guide part 515*a* to have a plate shape or a predetermined slope (or gradient) with respect to the second direction Y. The second guide part 515*b* may overlap the circuit cover 200.

A first sound guide space SGS1 may be formed between the second guide part 515*b* and the supporting member 300. The first sound guide space SGS1 may be formed between the second guide part 515*b*, the second supporting parts 511*j* of the case member 511, and the rear surface of the supporting member 300 and may be connected (or may communicate) with the first space SP1.

The third guide part 515*c* may extend from the second guide part 515*b*. The third guide part 515*c* may extend along the second direction Y from the second guide part 515*b* and may be configured to cover the third supporting parts 511*k* of the case member 511. The third guide part 515*c* may extend along the second direction Y from the second guide part 515*b* to have a plate shape covering the first cover part 211 of the circuit cover 200.

A second sound guide space SGS2 may be formed between the third guide part 515*c* and the circuit cover 200. The second sound guide space SGS2 may be formed between the third guide part 515*c*, the third supporting parts 511*k* of the case member 511, and the first cover part 211 of the circuit cover 200 and may be connected (or may communicate) with the first sound guide space SGS1. The third guide part 515*c* may overlap the circuit cover 200. For example, the second guide part 515*b* and the third guide part 515*c* may cover or overlap a portion of the circuit cover 200.

The sound guide member 515 according to an example embodiment of the present disclosure may further include a guide tip 515*d*. The guide tip (or a sound guide tip) 515*d* may be sharply configured at an end of the sound guide member 515. The guide tip 515*d* may be sharply configured at an end of the third guide part 515*c*. The guide tip 515*d* may be inclined in parallel with the second cover part 213 of the circuit cover 200. The guide tip 515*d* may be substantially the same as the guide tip 515*d* described above with reference to FIGS. 7 to 12. Thus, repetitive descriptions thereof may be omitted.

The sound generator 513 may be disposed at or connected to the sound guide member 515. The sound generator 513 may be configured to output a sound to the protrusion part 370 of the supporting member 300 through a through hole or hole 515*h* which is in the sound guide member 515. The sound generator 513 may be supported by or connected to the sound guide member 515 to overlap the through hole 515*h*. For example, the sound generator 513 may be configured to directly output a sound to the protrusion part 370 of the supporting member 300 through the through hole 515*h* of the sound guide member 515. For example, the sound generator 513 may be disposed at or connected to the sound guide member 515 to have a forward-direction arrangement structure opposite to the reverse-direction arrangement structure described above with reference to FIGS. 7 to 12.

The sound generator 513 according to an example embodiment of the present disclosure may include the base frame 513*a*, the magnetic circuit part 513*b*, the vibration plate 513*c*, and the suspension 513*d* described above with reference to FIGS. 16 and 17. Thus, repetitive descriptions thereof may be omitted or will be briefly given.

The base frame 513*a* of the sound generator 513 may be connected or coupled to the first guide part 515*a* of the sound guide member 515 by a coupling member. For example, the first frame part 513*a*1 of the base frame 513*a* may be connected or coupled to the first guide part 515*a* of the sound guide member 515 by the coupling member. Thus, the sound generator 513 may have a forward-direction arrangement structure. For example, the vibration plate 513*c* of the sound generator 513 may be disposed to face the supporting member 300. The coupling member may be an adhesive, a double-sided tape, a double-sided foam tape, a double-sided cushion tape, bolt, or a screw, or the like, but embodiments of the present disclosure are not limited thereto.

At least a portion of each of the magnetic circuit part 513*b*, the vibration plate 513*c*, and the suspension 513*d* of the sound generator 513 may be accommodated or inserted into the though hole or hole 515*h* of the sound guide member 515. The vibration plate 513*c* of the sound generator 513 may face the rear surface of the supporting member 300. The vibration plate 513*c* of the sound generator 513 may face or directly face the rear part 310 or the protrusion part 370 of the supporting member 300. Each of the vibration plate 513*c* and the suspension 513*d* of the sound generator 513 may face or directly face the rear part 310 or the protrusion part 370 of the supporting member 300. Each of the vibration plate 513*c* and the suspension 513*d* of the sound generator 513 may face or directly face the protrusion part 370 of the supporting member 300. Accordingly, a sound (or a forward sound FSS) generated based on a vibration of the vibration plate 513*c* may be output to the protrusion part 370 of the supporting member 300 and may be reflected (or guided) in the vertical direction VD (or the first vertical direction VD1) of the vibration member 100 by the protrusion part 370, and may also vibrate the protrusion part 370.

The case member 511 according to an example embodiment of the present disclosure may further include a tilt part 511*t*.

The tilt part 511*t* may be configured to be inclined from the second supporting parts 511*j* toward or away from the rear surface of the supporting member 300. The tilt part 511*t* may be configured to be inclined toward the rear surface of the supporting member 300 to have a predetermined angle with respect to the second direction Y. The tilt part 511*t* may be connected between a pair of second supporting parts 511*j* and may be configured to be inclined toward the rear surface of the supporting member 300 to have a predetermined angle from an inner lateral surface connecting the pair of second supporting parts 511*j* (or with respect to the second direction Y).

The tilt part 511*t* may overlap a second guide part 515*b* of a sound guide member 515. The first sound guide space SGS1 may be formed between the tilt part 511*t* and the second guide part 515*b*. The first sound guide space SGS1 may be formed between the tilt part 511*t*, the second guide part 515*b*, and the rear surface of the supporting member 300 and may be connected (or may communicate) with the first space SP1. Accordingly, the tilt part 511*t* may guide a portion of a sound, output from the sound generator 513 to the first space SP1, toward the second sound guide space SGS2 or in the vertical direction VD (or the first vertical direction VD1) of the vibration member 100.

The case member 511 according to an example embodiment of the present disclosure may further include one or more lateral holes 511*f*. The case member 511 may further include a plurality of lateral holes 511*f*.

The one or more lateral holes 511*f* may be configured at a first supporting part 511*i*. The one or more lateral holes 511*f* may be formed to pass through the first supporting part 511*i* along the first direction X or the second direction Y. The one or more lateral holes 511*f* may have a diameter of about 2 mm to about 5 mm, or may have a diameter of about 3 mm to about 4 mm, but embodiments of the present disclosure are not limited thereto.

The one or more lateral holes 511*f* may be configured to balance an air pressure of the first space SP1 which is formed between the sound generator 513 and the rear surface of the supporting member 300. For example, the one or more lateral holes 511*f* may be configured to adjust an air impedance of the first space SP1. The one or more lateral holes 511*f* may be configured to output a portion of a sound in the first space SP1 in the vertical direction VD (or the second vertical direction VD2) of the vibration member 100. For example, the one or more lateral holes 511*f* may be configured to output the portion of the sound in the first space SP1 in the vertical direction VD (or the second vertical direction VD2) of the vibration member 100 and adjust the air impedance of the first space SP1.

The apparatus according to another example embodiment of the present disclosure may output the first sound S1 in the forward direction FD of the vibration member 100, based on the vibration (or driving) of the sound generating apparatus 500, and may simultaneously output the second sound S2 in the vertical direction VD (or the first vertical direction VD1) of the vibration member 100.

The first sound S1 may be generated by a vibration of the vibration member 100 and the protrusion part 370 of the supporting member 300 based on the forward sound FSS of the sound generator 513 generated in the first space SP1 by the vibration of the vibration plate 513*c* based on the vibration (or driving) of the sound generator 513 and may be output in the forward direction FD of the vibration member 100. For example, the forward sound FSS of the sound generator 513 may vibrate the protrusion part 370 of the supporting member 300 and may be transferred to the vibration member 100 through the one or more holes 370*h* which are in the protrusion part 270 of the supporting member 300. The vibration member 100 may vibrate based on a vibration of the protrusion part 370 of the supporting member 300 and the forward sound FSS of the sound generator 513 transferred through the one or more holes 370*h* to output a first sound S1 in the forward direction FD of the vibration member 100. For example, the vibration of the protrusion part 370 of the supporting member 300 and the forward sound FSS of the sound generator 513 transferred through the one or more holes 370*h* may be directly transferred to the backlight 130 of the vibration member 100. Accordingly, a sound (or the forward sound FSS) of the sound generator 513 may be efficiently transferred to the vibration member 100. Thus, a sound characteristic and/or a sound pressure level characteristic of a first sound S1 generated based on the vibration of the vibration member 100 may be further enhanced.

The second sound S2 may be generated based on a forward sound FSS of the sound generator 513 generated in the first space SP1 by the vibration of the vibration plate 513*c* based on the vibration (or driving) of the sound generator 513 and may be output in the vertical direction VD (or the first vertical direction VD1) of the vibration member 100, based on the guide of a sound guide member 515. For example, the forward sound FSS of the sound generator 513 may be a second sound S2 passing through the first sound guide space SGS1 and the second sound guide space SGS2 which are configured by the sound guide member 515 and may be output in the vertical direction VD (or the first vertical direction VD1) of the vibration member 100. For example, the second sound S2 may be output in the vertical direction VD (or the first vertical direction VD1) of the vibration member 100.

According to an example embodiment of the present disclosure, a portion of the forward sound FSS of the sound generator 513 generated in the first space SP1 by the vibration of the vibration plate 513*c* based on the vibration (or driving) of the sound generator 513 may be a third sound S3 and may be output in the vertical direction VD (or a second vertical direction VD2) of the vibration member 100 through a plurality of lateral holes 511*f* which are in the sound generating apparatus 500.

Figure 22:
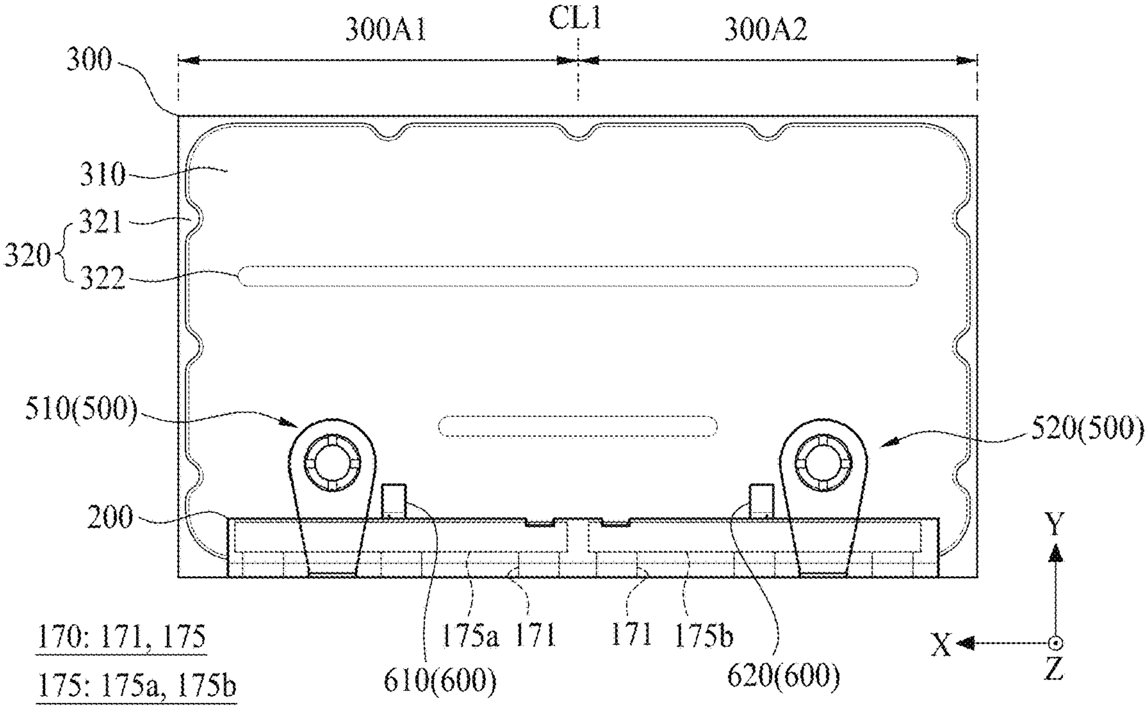
FIG. 22 illustrates an apparatus according to another example embodiment of the present disclosure.
Figure 23:
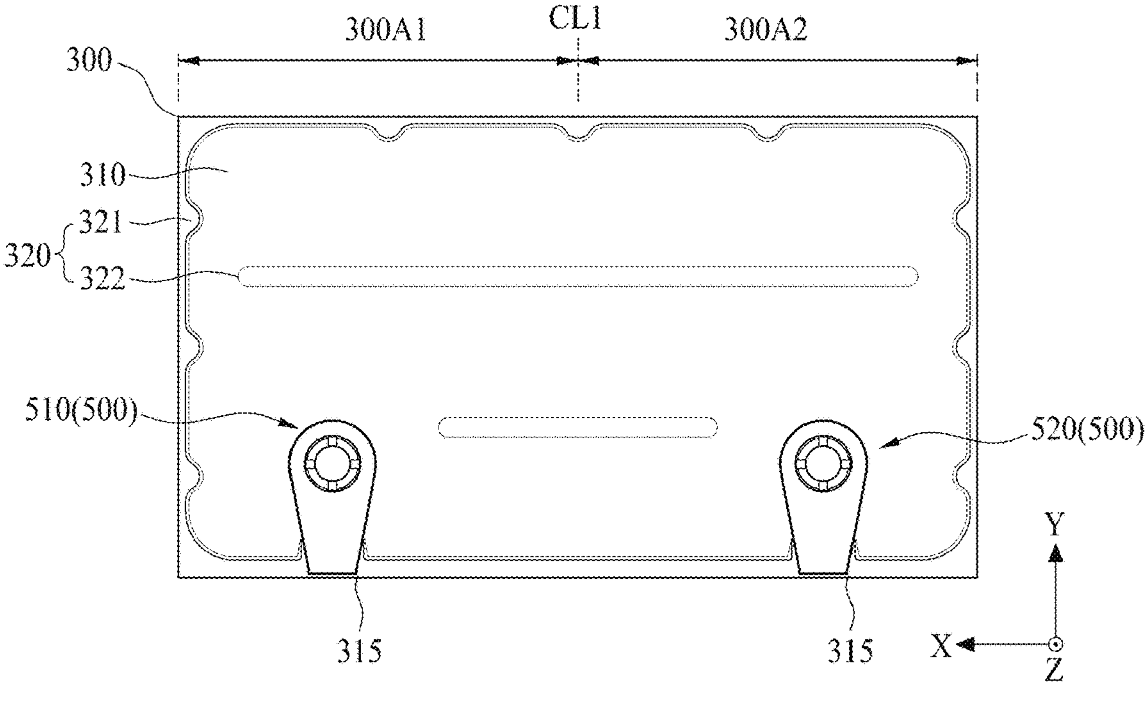
FIG. 23 illustrates a sound generating apparatus disposed at a supporting member illustrated in FIG. 22 according to another example embodiment of the present disclosure.
Figure 24:
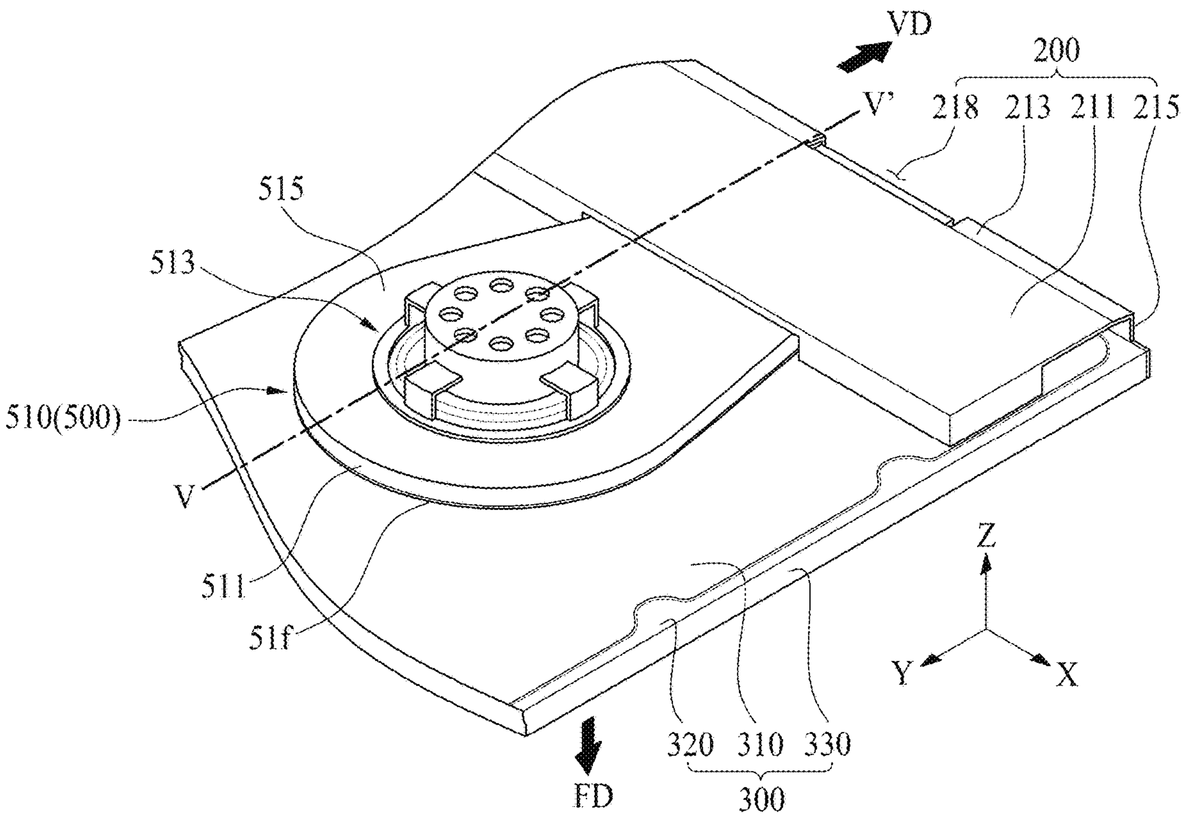
FIG. 24 illustrates an arrangement structure of a sound generating apparatus illustrated in FIG. 22 according to another example embodiment of the present disclosure.
Figure 25:
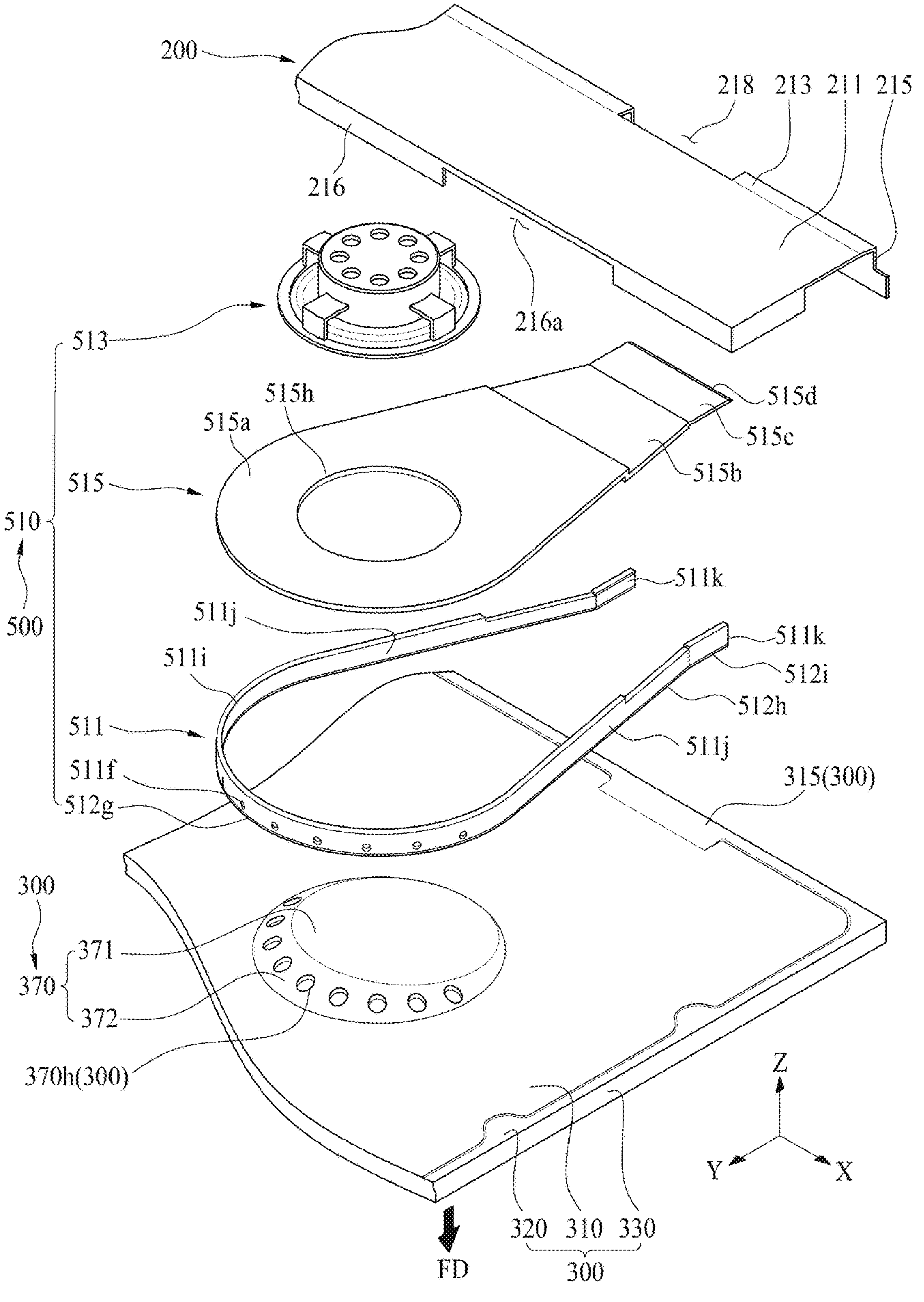
FIG. 25 is an exploded perspective view illustrating a supporting member, a circuit cover, and a sound generating apparatus illustrated in FIG. 24 according to another example embodiment of the present disclosure.
Figure 26:
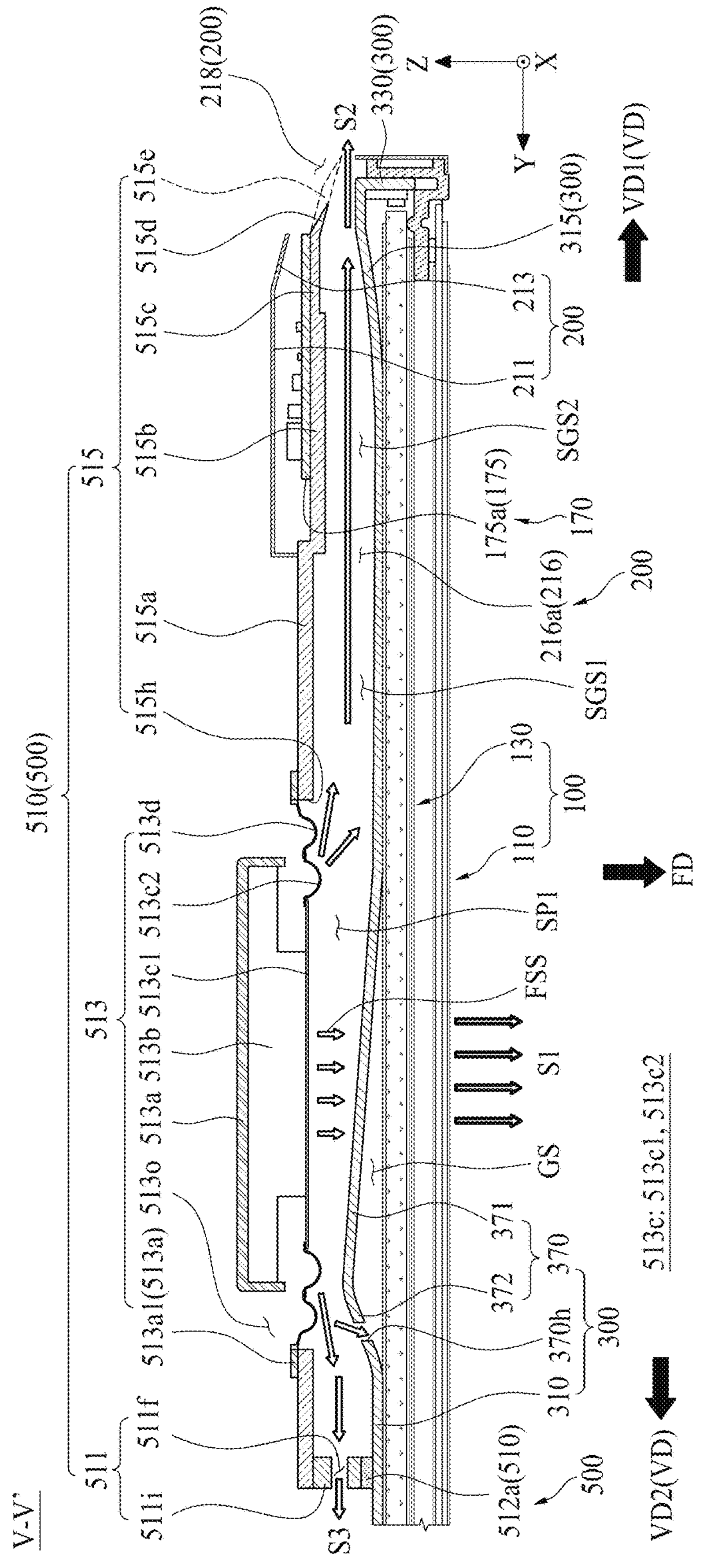
FIG. 26 is an example cross-sectional view taken along line V-V' illustrated in FIG. 24 according to another example embodiment of the present disclosure.

FIG. 22 illustrates an apparatus according to another example embodiment of the present disclosure. FIG. 23 illustrates a sound generating apparatus disposed at a supporting member illustrated in FIG. 22 according to another example embodiment of the present disclosure. FIG. 24 illustrates an arrangement structure of a sound generating apparatus illustrated in FIG. 22 according to another example embodiment of the present disclosure. FIG. 25 is an exploded perspective view illustrating a supporting member, a circuit cover, and a sound generating apparatus illustrated in FIG. 24 according to another example embodiment of the present disclosure. FIG. 26 is an example cross-sectional view taken along line V-V' illustrated in FIG. 24 according to another example embodiment of the present disclosure. FIGS. 22 to 26 illustrate an example embodiment implemented by modifying the supporting member, the circuit cover, and the sound generating apparatus in the example apparatus described above with reference to FIGS. 18 to 21. In the following description, therefore, only the supporting member, the circuit cover, the sound generating apparatus, and elements relevant thereto may be described. The other elements may be referred to by the same reference numerals as in FIGS. 18 to 21, and repetitive descriptions thereof may be omitted.

With reference to FIGS. 22 to 25, in an apparatus according to another example embodiment of the present disclosure, a sound generating apparatus 500, or a first sound generating apparatus 510 and a second sound generating apparatus 520, may be disposed at a rear surface of a supporting member 300 to overlap a protrusion part 370 of a supporting member 300. A portion of the sound generating apparatus 500, or of each of the first sound generating apparatus 510 and the second sound generating apparatus 520, may be disposed to be covered by a circuit cover 200.

The sound generating apparatus 500, or the first sound generating apparatus 510 and the second sound generating apparatus 520, may include a case member 511, a sound generator 513, and a sound guide member 515.

The case member 511 may be disposed at a rear part 310 of the supporting member 300 to cover or surround the protrusion part 370 which is at the rear surface of the supporting member 300. The case member 511 may be disposed at the rear part 310 of the supporting member 300 to overlap a portion of the circuit cover 200. The case member 511 may be configured to cover a portion of the protrusion part 370 of the supporting member 300 and the circuit cover 200. For example, the case member 511 may be a housing or a housing member, or the like, but embodiments of the present disclosure are not limited thereto.

A case member 511 according to an example embodiment of the present disclosure may include a first supporting part 511*i*, second supporting parts 511*j*, and third supporting parts 511*k*.

The first supporting part 511*i* may be provided to surround a protrusion part 370 which is at a rear surface of the supporting member 300. For example, the first supporting part 511*i* may have a curved or generally circular shape with one side (or one portion) open. For example, the first supporting part 511*i* may include an arc shape which follows the contour of the protrusion part 370 to surround the protrusion part 370. For example, the first supporting part 511*i* may include one end (or one side or one portion), the other end (or the other side or the other portion), and a circumference portion having an arc shape between one end (or one side or one portion) and the other end (or the other side or the other portion). For example, the first supporting part 511*i* may have a C-shape one-dimensionally. The first supporting part 511*i* may be connected or coupled to the rear surface of the supporting member 300 by a first coupling member 512*g*. For example, the first coupling member 512*g* may be a first connection member, but embodiments of the present disclosure are not limited thereto.

The second supporting parts 511*j* may be connected respectively to one end (or one side or one portion) and the other end (or the other side or the other portion) of the first supporting part 511*i*. The second supporting parts 511*j* may extend toward a lateral surface of the supporting member 300 at a predetermined angle respectively from one end (or one side or one portion) and the other end (or the other side or the other portion) of the first supporting part 511*i*. The second supporting parts 511*j* may include a pair of second supporting parts 511*j*. The pair of second supporting parts 511*j* may extend in a direction away from the first support part 511*i* respectively from the one end (or the one side or the one portion) and the other end (or the other side or the other portion) of the first supporting part 511*i*. A distance between the pair of second supporting parts 511*j* may decrease progressively toward a lateral surface of the supporting member 300 away from the first supporting part 511*i*. A portion of each of the second supporting parts 511*j* may be covered by a circuit cover 200. The second supporting parts 511*j* may each include a stepped portion (or a step height portion) which is formed at an end portion thereof. The second supporting parts 511*j* may be connected or coupled to the rear surface of the supporting member 300 respectively by second coupling members 512*e*. For example, the second coupling members 512*e* may be second connection members, but embodiments of the present disclosure are not limited thereto.

The third supporting parts 511*k* may be connected respectively to the second supporting parts 511*j*. The third supporting parts 511*k* may extend along the second direction Y respectively from the second supporting parts 511*j*. The third supporting parts 511*k* may include a pair of third supporting parts 511*k*. For example, the pair of third supporting parts 511*k* may extend in parallel along the second direction Y respectively from the pair of second supporting parts 511*j*. The third supporting parts 511*k* may be connected or coupled to the rear surface of the supporting member 300 respectively by third coupling members 512*i*. For example, the third coupling members 512*i* may be third connection members, but embodiments of the present disclosure are not limited thereto.

The sound guide member 515 may be configured to cover the case member 511. The sound guide member 515 may be configured between the rear surface of the supporting member 300 and a PCB 175 of a driving circuit part 170. The sound guide member 515 according to an example embodiment of the present disclosure may include a first guide part 515*a*, a second guide part 515*b*, and a third guide part 515*c*.

The first guide part (or a first guide cover portion) 515*a* may be configured to cover the first supporting part 511*i* of the case member 511. The first guide part 515*a* may be configured to cover a portion of the first supporting part 511*i* and the second supporting part 511*j* of the case member 511. The first guide part 515*a* may include a shape corresponding to a portion of the first supporting part 511*i* and the second supporting part 511*j* of the case member 511. For example, the first guide part 515*a* may include a circular plate, and a protrusion plate which extends or protrudes from one side (or one portion) of the circular plate.

The first guide part 515*a* and the first supporting part 511*i* of the case member 511 may provide a first space SP1 at a protrusion part 370 of the supporting member 300 and a periphery of the protrusion part 370. The first space SP1 may be a sound space, a sound output space, a front space, a vibration space, or a front sound space, or the like, corresponding to the sound generator 513, but embodiments of the present disclosure are not limited thereto.

The first guide part 515*a* may be configured to support the sound generator 513. For example, a circular plate of the first guide part 515*a* may be configured to support the sound generator 513.

The first guide part 515*a* may further include a through hole or hole 515*h*. The through hole or hole 515*h* may be configured to pass through the circular plate of the first guide part 515*a*. The through hole or hole 515*h* may be formed to have a size which is smaller than that of the sound generator 513.

The second guide part 515*b* may extend from the first guide part 515*a*. The second guide part 515*b* may extend along the second direction Y from the first guide part 515*a* and may be configured to cover the other portion of the second supporting parts 511*j* of the case member 511 not covered by the first guide part 515*a*. The second guide part 515*b* may be disposed at the stepped portion (or the step height portion) configured at an end portion of each of the second supporting parts 511*j*. The second guide part 515*b* may overlap a rear surface of the supporting member 300. A first sound guide space SGS1 may be formed between the second guide part 515*b* and the supporting member 300. The first sound guide space SGS1 may be formed between the second guide part 515*b*, the second supporting parts 511*j* of the case member 511, and the rear surface of the supporting member 300 and may be connected (or may communicate) with the first space SP1.

The third guide part 515*c* may extend from the second guide part 515*b*. The third guide part 515*c* may extend along the second direction Y from the second guide part 515*b* and may be configured to cover the third supporting parts 511*k* of the case member 511. The third guide part 515*c* may extend along a second direction Y from the second guide part 515*b* to have a plate shape covering the rear surface of the supporting member 300 between a pair of third supporting parts 511*k*. The third guide part 515*c* may support the PCB 175 of the driving circuit part 170. For example, the PCB 175 may be supported by the second guide part 515*b* and the third guide part 515*c*. The third guide part 515*c* may be configured between the rear surface of the supporting member 300 and the PCB 175 of the driving circuit part 170. For example, the second guide part 515*b* and the third guide part 515*c* may be accommodated (or inserted) into the circuit cover 200.

A second sound guide space SGS2 may be formed between the third guide part 515*c* and the rear surface of the supporting member 300. The second sound guide space SGS2 may be formed between the third guide part 515*c*, the third supporting parts 511*k* of the case member 511, and the first cover part 211 of the circuit cover 200 and may be connected (or may communicate) with the first sound guide space SGS1.

The sound guide member 515 according to an example embodiment of the present disclosure may further include a guide tip 515*d*. The guide tip (or a sound guide tip) 515*d* may be sharply configured at an end of the sound guide member 515. The guide tip 515*d* may be sharply configured at an end of the third guide part 515*c*. The guide tip 515*d* may be inclined in parallel with the second cover part 213 of the circuit cover 200. The guide tip 515*d* may be substantially the same as the guide tip 515*d* described above with reference to FIGS. 7 to 12. Thus, repetitive descriptions thereof may be omitted.

With reference to FIGS. 25 and 26, the supporting member 300 may be configured to support the third supporting parts 511*k* of the case member 511. The supporting member 300 may further include a sound guide surface 315 which overlaps the sound guide member 515. The supporting member 300 may further include a sound guide surface 315 which overlaps the third guide part 515*c* of the sound guide member 515. The sound guide surface 315 may overlap a portion of the sound guide member 515 and may be inclined with respect to an edge portion of the rear part 310 of the supporting member 300.

The sound guide surface 315 may be configured at the rear surface of the supporting member 300 corresponding to the second sound guide space SGS2. The sound guide surface 315 may be configured to be inclined between the rear part 310 and a reinforcement part 320 of the supporting member 300. The sound guide surface 315 may be configured to have a sloped surface at the reinforcement part 320 overlapping the third guide part 515*c* of the sound guide member 515. For example, the sound guide surface 315 may be formed to have a slope and be inclined between the rear part 310 and the reinforcement part 320 overlapping the third guide part 515*c* of the sound guide member 515. Accordingly, a second sound S2 in each of first and second sound guide spaces SGS1 and SGS2 may be smoothly output (or radiated) in a vertical direction VD (or a first vertical direction VD1) of a vibration member 100, based on a slope (or a gradient) of the sound guide surface 315. For example, the sound guide surface 315 may be a sound radiation surface, a step removal portion, a cover inclined portion, or a cover slope portion, but embodiments of the present disclosure are not limited thereto.

The sound generator 513 may be disposed at or connected to the sound guide member 515. The sound generator 513 may be configured to output a sound to the protrusion part 370 of the supporting member 300 through a through hole or hole 515*h* in the sound guide member 515. For example, the sound generator 513 may be configured to directly output a sound to the protrusion part 370 of the supporting member 300 through the through hole or hole 515*h* of the sound guide member 515. For example, the sound generator 513 may be disposed at or connected to the sound guide member 515 to have a forward-direction arrangement structure described above with reference to FIGS. 18 to 21.

The sound generator 513 according to an example embodiment of the present disclosure may include the base frame 513*a*, the magnetic circuit part 513*b*, the vibration plate 513*c*, and the suspension 513*d* described above with reference to FIGS. 16 and 17. Thus, repetitive descriptions thereof may be omitted.

The case member 511 according to an example embodiment of the present disclosure may further include one or more lateral holes 511*f*. The case member 511 may further include a plurality of lateral holes 511*f* The one or more lateral holes 511*f* may be configured at the first supporting part 511*i*. The one or more lateral holes 511*f* may be formed to pass through the first supporting part 511*i*. The one or more lateral holes 511*f* may be substantially the same as the one or more lateral holes 511*f* described above with reference to FIG. 19. Thus, repetitive descriptions thereof may be omitted.

The circuit cover 200 according to an example embodiment of the present disclosure may further include a fourth cover part 216, a connection hole 216*a*, and an opening hole 218.

The fourth cover part 216 may be connected to one end (or one side or one portion) of the first cover part 211 adjacent to the first space SP1 or the first sound guide space SGS1. The fourth cover part 216 may be vertically connected to one end (or one side or one portion) of the first cover part 211 adjacent to the first space SP1 or the first sound guide space SGS1. The fourth cover part 216 may be supported by the rear part 310 of the supporting member 300.

The first connection hole 216*a* may be formed to pass through a portion of the fourth cover part 216 adjacent to the first space SP1 or the first sound guide space SGS1. The first connection hole 216*a* may be formed to pass through a portion of the fourth cover part 216 adjacent to the first space SP1 or the first sound guide space SGS1 along a second direction Y. Therefore, the second supporting parts 511*j* and the third supporting parts 511*k* of the case member 511 of the sound generating apparatus 500 and the second guide part 515*b* and the third guide part 515*c* of the sound guide member 515 may be accommodated into an inner space of the circuit cover 200 through the first connection hole 216*a* and may be covered by the circuit cover 200.

The opening hole 218 may be formed to pass through a portion of a second cover part 213. The opening hole 218 may be formed to connect (or communicate) the second sound guide space SGS2 with an external space of the supporting member 300. For example, the opening hole 218 may be configured to expose the third guide part 515*c* and the guide tip 515*d* of the sound guide member 515 at the external space of the supporting member 300.

The apparatus according to another example embodiment of the present disclosure may output the first sound S1 in the forward direction FD of the vibration member 100, based on the vibration (or driving) of the sound generating apparatus 500, and may simultaneously output the second sound S2 in the vertical direction VD (or the first vertical direction VD1) of the vibration member 100.

The first sound S1 may be generated by a vibration of the vibration member 100 and the protrusion part 370 of the supporting member 300 based on the forward sound FSS of the sound generator 513 generated in the first space SP1 by the vibration of the vibration plate 513*c* based on the vibration (or driving) of the sound generator 513 and may be output in the forward direction FD of the vibration member 100. For example, the forward sound FSS of the sound generator 513 may vibrate the protrusion part 370 of the supporting member 300 and may be transferred to the vibration member 100 through the one or more holes 370*h* in the protrusion part 370 of the supporting member 300. The vibration member 100 may vibrate based on a vibration of the protrusion part 370 of the supporting member 300 and the forward sound FSS of the sound generator 513 transferred through the one or more holes 370*h* to output a first sound S1 in the forward direction FD of the vibration member 100. For example, the forward sound FSS of the sound generator 513 may be a sound which is output to the rear surface of the vibration member 100 with respect to the vibration member 100. For example, the forward sound FSS of the sound generator 513 may be a sound which is generated based on a vibration of the vibration plate 513*c* to directly output to the rear surface of the vibration member 100. For example, the vibration of the protrusion part 370 of the supporting member 300 and the forward sound FSS of the sound generator 513 transferred through the one or more holes 370*h* may be directly transferred to the backlight 130 of the vibration member 100. Accordingly, a sound (or the forward sound FSS) of the sound generator 513 may be efficiently transferred to the vibration member 100, and a sound characteristic and/or a sound pressure level characteristic of a first sound S1 generated based on the vibration of the vibration member 100 may be further enhanced.

The second sound S2 may be generated based on a forward sound FSS of the sound generator 513 generated in the first space SP1 by the vibration of the vibration plate 513*c* based on the vibration (or driving) of the sound generator 513 and may be output in the vertical direction VD (or the first vertical direction VD1) of the vibration member 100, based on the guide of a sound guide member 515. For example, the forward sound FSS of the sound generator 513 may be a second sound S2 passing through the first sound guide space SGS1 and the second sound guide space SGS2, which are configured by the sound guide member 515, and may be output in the vertical direction VD of the vibration member 100. For example, the second sound S2 may be output in the vertical direction VD (or the first vertical direction VD1) of the vibration member 100.

According to an example embodiment of the present disclosure, a portion of the forward sound FSS of the sound generator 513 generated in the first space SP1 by the vibration of the vibration plate 513*c* based on the vibration (or driving) of the sound generator 513 may be a third sound S3 and may be output in the vertical direction VD (or a second vertical direction VD2) of the vibration member 100 through a plurality of lateral holes 511*f* which are in the sound generating apparatus 500.

Figure 27:
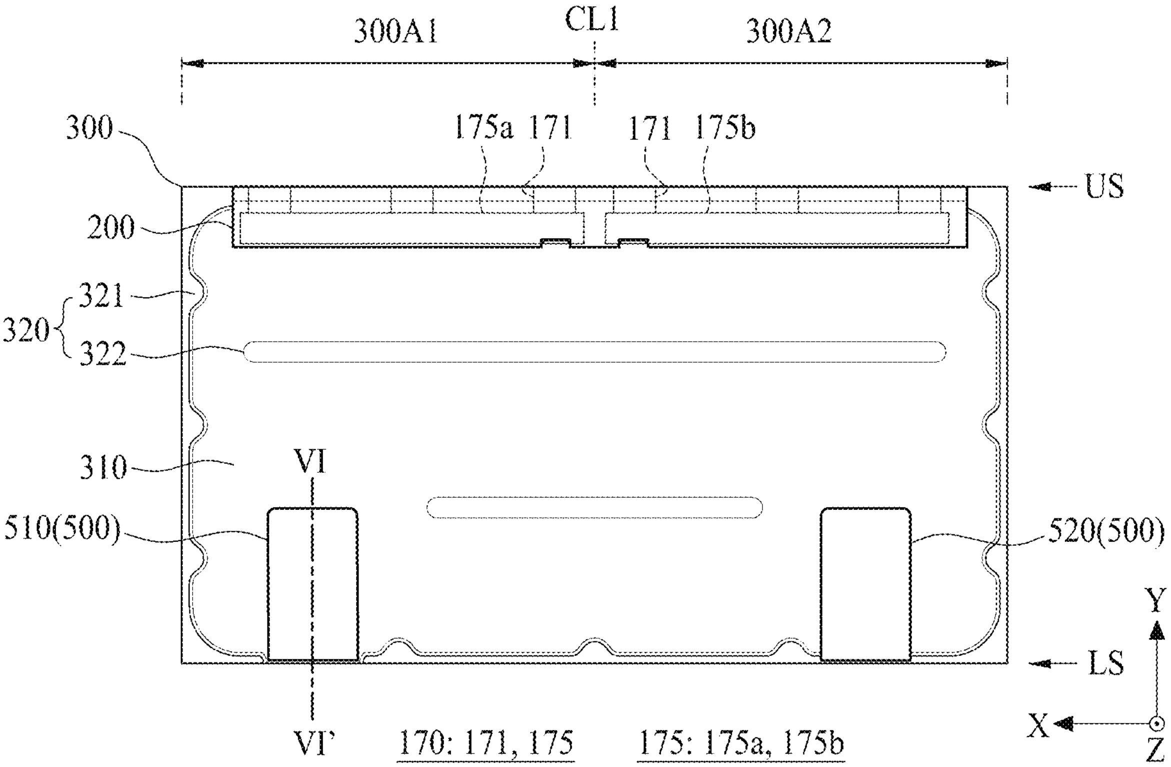
FIG. 27 illustrates an apparatus according to another example embodiment of the present disclosure.
Figure 28:
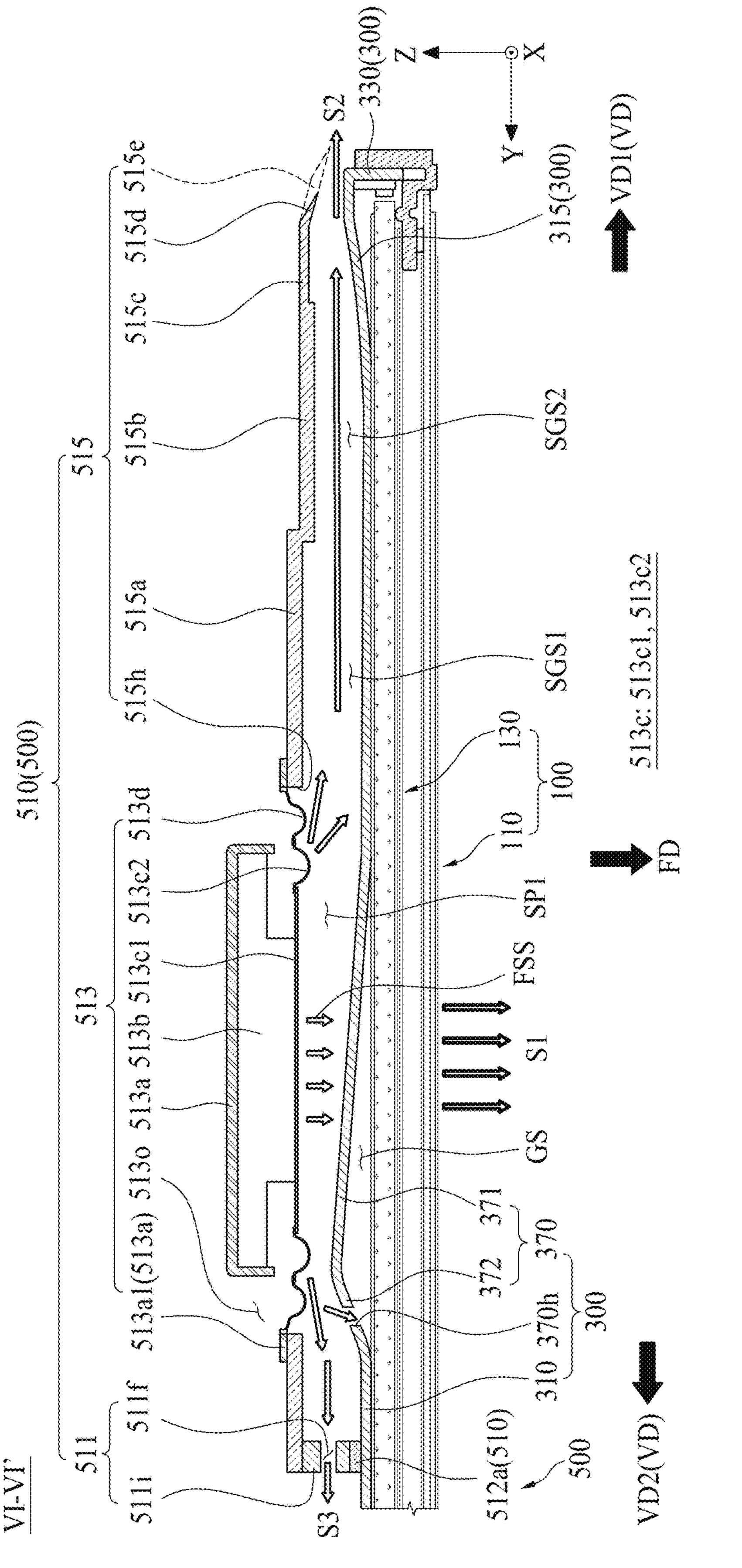
FIG. 28 is an example cross-sectional view taken along line VI-VI' illustrated in FIG. 27 according to another embodiment of the present disclosure.

FIG. 27 illustrates an apparatus according to another example embodiment of the present disclosure. FIG. 28 is a cross-sectional view taken along line VI-VI' illustrated in FIG. 27 according to another example embodiment of the present disclosure. FIGS. 27 and 28 illustrate an example embodiment implemented by modifying the driving circuit part, the circuit cover, and the sound generating apparatus in the example apparatus described above with reference to FIGS. 18 to 26. In the following description, therefore, only the driving circuit part, the circuit cover, and the sound generating apparatus, and elements relevant thereto may be described. The other elements may be referred to by the same reference numerals as in FIGS. 18 to 26, and repetitive descriptions thereof may be omitted.

In the apparatus according to another example embodiment of the present disclosure, a driving circuit part 170 may be disposed at an upper side (or an upper portion) US of the apparatus. A PCB 175 of the driving circuit part 170 may be disposed at a rear periphery portion of an upper side (or an upper portion) US of a supporting member 300. Except for the driving circuit part 170 being disposed at the upper side (or the upper portion) US of the apparatus, the driving circuit part 170 may be the same or substantially the same as the driving circuit part 170 described above in connection with other example embodiments. Thus, repetitive descriptions thereof may be omitted.

The circuit cover 200 may be disposed at a rear edge portion (or a rear periphery portion) of the upper side (or the upper portion) US of the supporting member 300 and may be provided to cover the driving circuit part 170. Except for the circuit cover 200 being provided to cover the driving circuit part 170 disposed at the upper side (or the upper portion) US of the apparatus, the circuit cover 200 may be the same or substantially the same as the circuit cover 200 described above with reference to FIGS. 18 to 26. Thus, repetitive descriptions thereof may be omitted.

A sound generating apparatus 500 (or a first sound generating apparatus 510 and a second sound generating apparatus 520) may be disposed at a rear surface of a lower side (or a lower portion) LS of the supporting member 300. Except for the sound generating apparatus 500, or each of the first sound generating apparatus 510 and the second sound generating apparatus 520, not overlapping the driving circuit 170 and the circuit cover 200 and overlapping a rear surface of the supporting member 300, the sound generating apparatus 500 (or the first sound generating apparatus 510 and the second sound generating apparatus 520) may be the same or substantially the same as the sound generating apparatus 500 (or the first sound generating apparatus 510 and the second sound generating apparatus 520) described above with reference to FIGS. 18 to 26. Thus, repetitive descriptions thereof may be omitted.

The supporting member 300 may further include a sound guide surface 315 which overlaps the sound generating apparatus 500, or the first sound generating apparatus 510 and the second sound generating apparatus 520. The sound guide surface 315 may be configured to be inclined between a rear part 310 and a reinforcement part 320 of the supporting member 300.

The apparatus according to another example embodiment of the present disclosure may output the first sound S1 in the forward direction FD of the vibration member 100, based on the vibration (or driving) of the sound generating apparatus 500, and may simultaneously output the second sound S2 in the vertical direction VD (or the first vertical direction VD1) of the vibration member 100.

The first sound S1 may be generated by a vibration of the vibration member 100 and the protrusion part 370 of the supporting member 300 based on the forward sound FSS of the sound generator 513 generated in the first space SP1 by the vibration of the vibration plate 513*c* based on the vibration (or driving) of the sound generator 513 and may be output in the forward direction FD of the vibration member 100. For example, the forward sound FSS of the sound generator 513 may vibrate the protrusion part 370 of the supporting member 300 and may be transferred to the vibration member 100 through the one or more holes 370*h* which are in the protrusion part 270 of the supporting member 300, and the vibration member 100 may vibrate based on a vibration of the protrusion part 370 of the supporting member 300 and the forward sound FSS of the sound generator 513 transferred through the one or more holes 370*h* to output a first sound S1 in the forward direction FD of the vibration member 100. For example, the vibration of the protrusion part 370 of the supporting member 300 and the forward sound FSS of the sound generator 513 transferred through the one or more holes 370*h* may be directly transferred to the backlight 130 of the vibration member 100. For example, the forward sound FSS of the sound generator 513 may be a sound output to the rear surface of the vibration member 100 with respect to the vibration member 100. For example, the forward sound FSS of the sound generator 513 may be a sound which is generated based on a vibration of the vibration plate 513*c* to directly output to the rear surface of the vibration member 100. Accordingly, a sound (or the forward sound FSS) of the sound generator 513 may be efficiently transferred to the vibration member 100, and a sound characteristic and/or a sound pressure level characteristic of a first sound S1 generated based on the vibration of the vibration member 100 may be further enhanced.

The second sound S2 may be generated based on a forward sound FSS of the sound generator 513 generated in the first space SP1 by the vibration of the vibration plate 513*c* based on the vibration (or driving) of the sound generator 513 and may be output in the vertical direction VD (or the first vertical direction VD1) of the vibration member 100, based on the guide of a sound guide member 515. For example, the forward sound FSS of the sound generator 513 may be a second sound S2 passing through the first sound guide space SGS1 and the second sound guide space SGS2, which are configured by the sound guide member 515, and may be output in the vertical direction VD of the vibration member 100. For example, the second sound S2 may be output in the vertical direction VD (or the first vertical direction VD1) of the vibration member 100.

According to an example embodiment of the present disclosure, a portion of the forward sound FSS of the sound generator 513 generated in the first space SP1 by the vibration of the vibration plate 513*c* based on the vibration (or driving) of the sound generator 513 may be a third sound S3 and may be output in the vertical direction VD (or a second vertical direction VD2) of the vibration member 100 through a plurality of lateral holes 511*f* which are in the sound generating apparatus 500.

Figure 29:
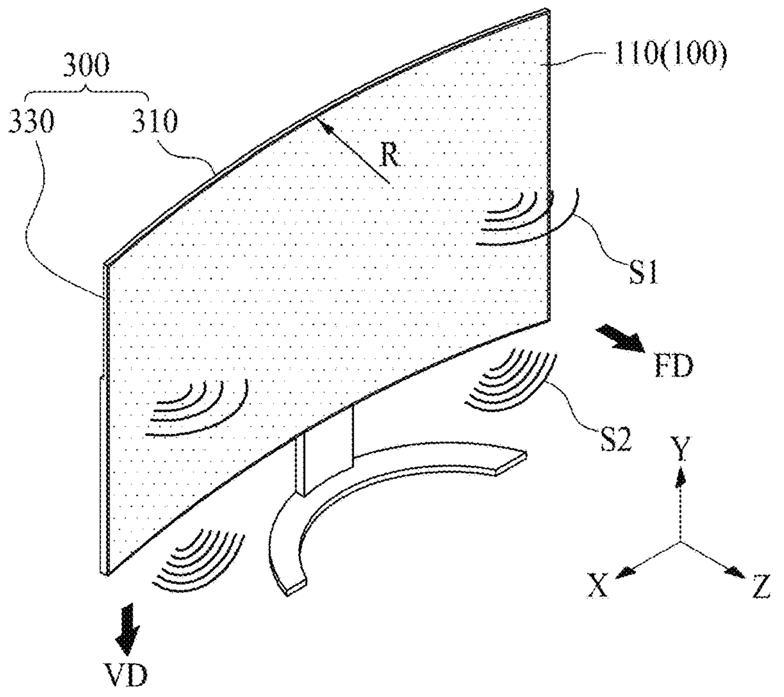
FIG. 29 illustrates an apparatus according to another example embodiment of the present disclosure.

FIG. 29 illustrates an apparatus according to another example embodiment of the present disclosure. FIG. 29 illustrates an example embodiment where the apparatus described above with reference to FIGS. 1 to 28 according to other example embodiments of the present disclosure is configured as a curved type apparatus.

With reference to FIG. 29, an apparatus according to another example embodiment of the present disclosure may be a curved type apparatus. The curved type apparatus may be a curved apparatus, a curved type display apparatus, or a variable type display apparatus, but embodiments of the present disclosure are not limited thereto.

The apparatus according to another example embodiment of the present disclosure may include the vibration member 100, the supporting member 300, and the sound generating apparatus described above with reference to FIGS. 1 to 28. Thus, repetitive descriptions thereof may be omitted.

A rear surface of the supporting member 300 may be configured to include a convex or concave curved structure having a predetermined curvature radius R. The rear part 310 of the supporting member 300 may be configured to include the convex or concave curved structure having the predetermined curvature radius R. For example, a distance between the rear part 310 and a vibration member 100 may increase progressively toward an edge portion (or a periphery portion) of the vibration member 100 from a center portion of the vibration member 100.

The vibration member 100 may be accommodated (or inserted) into the concave rear part 310 of the supporting member 300 and may thus be recessed or bent to have the predetermined curvature radius R. For example, a display panel 110 of the supporting member 300 may be bent along a curved shape of the concave rear part 310 of the supporting member 300.

The apparatus according to another example embodiment of the present disclosure may be implemented as a curved type apparatus. Thus, the example apparatus may output a first sound S1 based on driving (or vibration) of the sound generating apparatus in a forward direction FD of the vibration member 100 and may simultaneously output a second sound S2 in a vertical direction VD of the vibration member 100, thereby increasing all of the immersion experience of an image and the immersion experience of a sound of a viewer.

Figure 30:
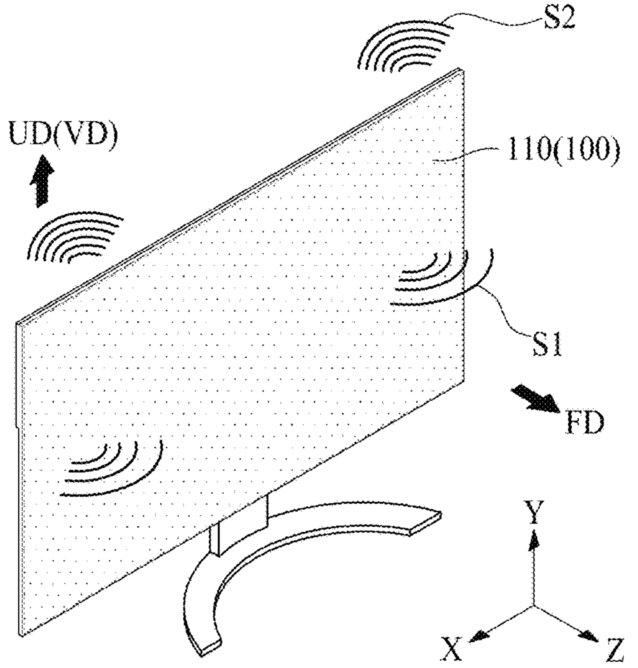
FIG. 30 illustrates an apparatus according to another example embodiment of the present disclosure.
Figure 31:
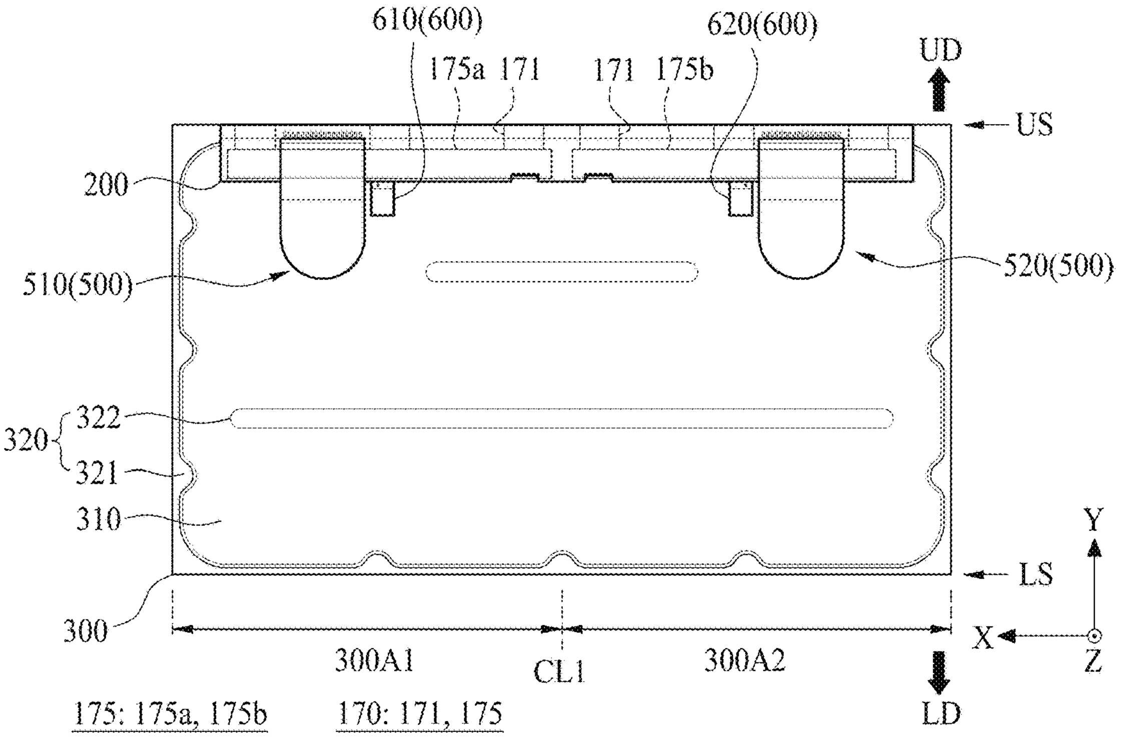
FIG. 31 is a rear view illustrating an apparatus according to another example embodiment of the present disclosure.

FIG. 30 illustrates an apparatus according to another example embodiment of the present disclosure. FIG. 31 is an example rear view illustrating an apparatus according to another example embodiment of the present disclosure. FIGS. 30 and 31 illustrate an example embodiment implemented by modifying the driving circuit part, the circuit cover, and the sound generating apparatus in the example apparatus described above with reference to FIGS. 1 to 17. In the following description, therefore, only the driving circuit part, the circuit cover, and the sound generating apparatus, and elements relevant thereto may be described. The other elements may be referred to by the same reference numerals as FIGS. 1 to 17, and repetitive descriptions thereof may be omitted.

With reference to FIGS. 30 and 31, in an apparatus according to another example embodiment of the present disclosure, each of a driving circuit part 170 and a circuit cover 200 may be disposed at an upper side (or an upper portion) US of the apparatus. The driving circuit part 170 and the circuit cover 200 may be the same or substantially the same as the driving circuit part 170 and the circuit cover 200, respectively, described above with reference to FIG. 27. Thus, repetitive descriptions thereof may be omitted.

A sound generating apparatus 500, or a first sound generating apparatus 510 and a second sound generating apparatus 520, may be disposed at a rear surface of a supporting member 300 to overlap the driving circuit part 170 and the circuit cover 200. The sound generating apparatus 500 (or the first sound generating apparatus 510 and the second sound generating apparatus 520) may be the same or substantially the same as the sound generating apparatus 500 (or the first sound generating apparatus 510 and the second sound generating apparatus 520) described above with reference to FIGS. 1 to 17. Thus, repetitive descriptions thereof may be omitted.

The sound generating apparatus 500 (or the first sound generating apparatus 510 and the second sound generating apparatus 520) may be configured to output a first sound S1, generated based on a vibration (or driving) of the sound generating apparatus 500, in a forward direction FD of a vibration member 100 and also to output a second sound S2, differing from the first sound S1, in an upward direction UD of the vibration member 100 (or the apparatus). For example, the upward direction UD of the vibration member 100 (or the apparatus) may be a short-side length direction, a lengthwise direction, or a direction parallel to a vertical direction. For example, the upward direction UD of the vibration member 100 (or the apparatus) may be an upward direction opposite to a direction toward the ground (or a downward direction) LD. Each of the upward direction UD and the downward direction LD may be referred to as a vertical direction VD.

According to an example embodiment of the present disclosure, the example apparatus illustrated in FIG. 31 may be identically applied to the curved type apparatus (or a curved apparatus, or a curved type display apparatus, or a curved display apparatus, or a variable type display apparatus, or a variable display apparatus) illustrated in FIG. 29.

Figure 32:
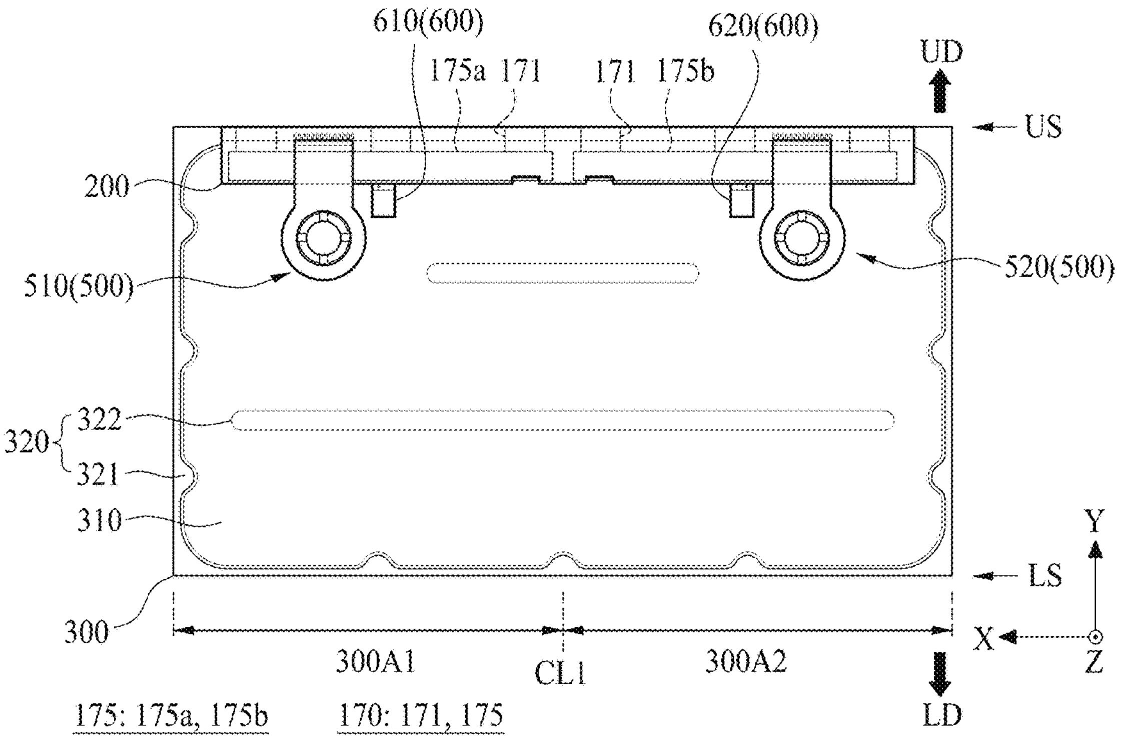
FIG. 32 is another rear view illustrating an apparatus according to another example embodiment of the present disclosure illustrated in FIG. 30.

FIG. 32 is another example rear view illustrating an apparatus according to another example embodiment of the present disclosure illustrated in FIG. 30. FIG. 32 illustrates an example embodiment implemented by modifying the driving circuit part, the circuit cover, and the sound generating apparatus in the example apparatus described above with reference to FIGS. 18 to 21. In the following description, therefore, only the driving circuit part, the circuit cover, and the sound generating apparatus, and elements relevant thereto may be described. The other elements may be referred to by the same reference numerals as FIGS. 18 to 21, and repetitive descriptions thereof may be omitted.

With reference to FIG. 32, in an apparatus according to another example embodiment of the present disclosure, each of a driving circuit part 170 and a circuit cover 200 may be disposed at an upper side (or an upper portion) US of the apparatus. The driving circuit part 170 and the circuit cover 200 may be the same or substantially the same as the driving circuit part 170 and the circuit cover 200, respectively, described above with reference to FIG. 27. Thus, repetitive descriptions thereof may be omitted.

A sound generating apparatus 500, or a first sound generating apparatus 510 and a second sound generating apparatus 520, may be disposed at a rear surface of a supporting member 300 to overlap the driving circuit part 170 and the circuit cover 200. The sound generating apparatus 500, or the first sound generating apparatus 510 and the second sound generating apparatus 520, may be the same or substantially the same as the sound generating apparatus 500, or the first sound generating apparatus 510 and the second sound generating apparatus 520, described above with reference to FIGS. 18 to 21. Thus, repetitive descriptions thereof may be omitted.

The sound generating apparatus 500, or each of the first sound generating apparatus 510 and the second sound generating apparatus 520, may be configured to output a first sound S1, generated based on a vibration (or driving) of the sound generating apparatus 500, in a forward direction FD of a vibration member 100 and also to output a second sound S2, differing from the first sound S1, in an upward direction UD of the vibration member 100 (or the apparatus).

According to an example embodiment of the present disclosure, the example apparatus illustrated in FIG. 32 may be identically applied to the curved type apparatus (or a curved apparatus, or a curved type display apparatus, or a curved display apparatus, or a variable type display apparatus, or a variable display apparatus) illustrated in FIG. 29.

Figure 33:
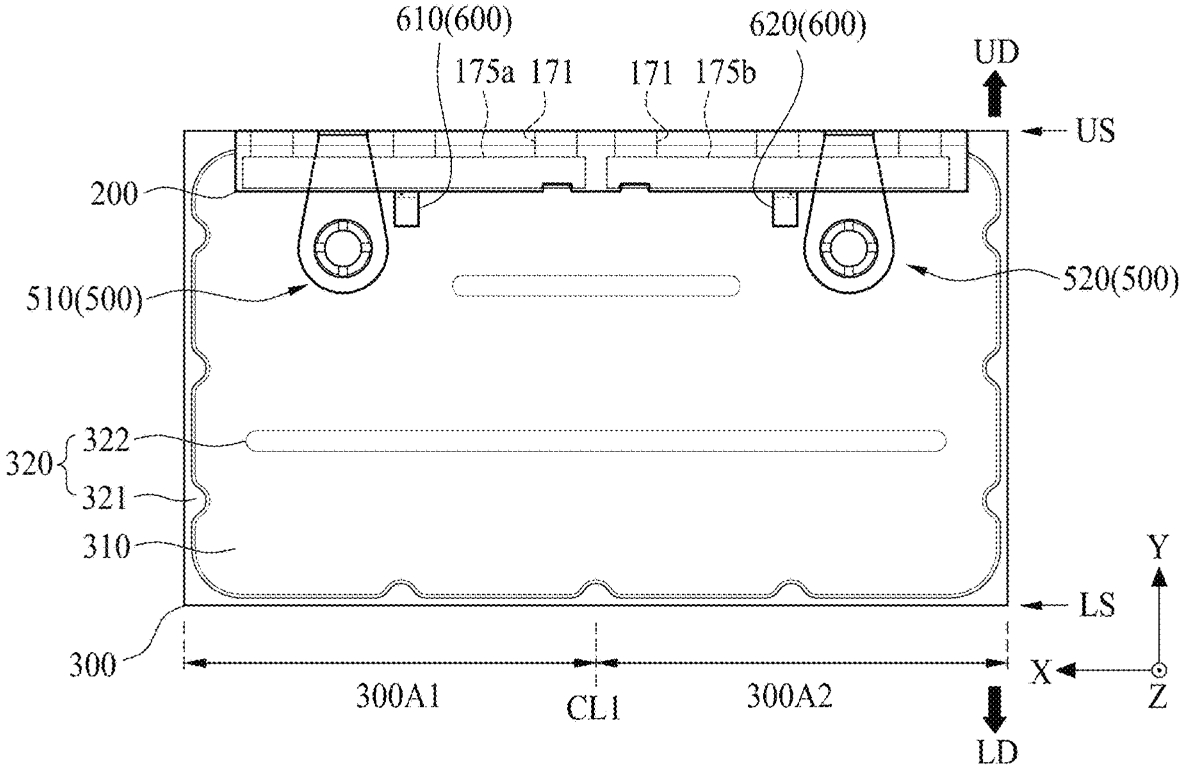
FIG. 33 is another rear view illustrating an apparatus according to another example embodiment of the present disclosure illustrated in FIG. 30.

FIG. 33 is another example rear view illustrating an apparatus according to another example embodiment of the present disclosure illustrated in FIG. 30. FIG. 33 illustrates an example embodiment implemented by modifying the driving circuit part, the circuit cover, and the sound generating apparatus in the example apparatus described above with reference to FIGS. 22 to 26. In the following description, therefore, only the driving circuit part, the circuit cover, and the sound generating apparatus, and elements relevant thereto may be described. The other elements may be referred to by the same reference numerals as FIGS. 22 to 26, and repetitive descriptions thereof may be omitted.

With reference to FIG. 33, in an apparatus according to another example embodiment of the present disclosure, each of a driving circuit part 170 and a circuit cover 200 may be disposed at an upper side (or an upper portion) US of the apparatus. The driving circuit part 170 and the circuit cover 200 may be the same or substantially the same as the driving circuit part 170 and the circuit cover 200, respectively, described above with reference to FIG. 27. Thus, repetitive descriptions thereof may be omitted.

A sound generating apparatus 500, or a first sound generating apparatus 510 and a second sound generating apparatus 520, may be disposed at a rear surface of a supporting member 300 to overlap the driving circuit part 170 and the circuit cover 200. The sound generating apparatus 500, or the first sound generating apparatus 510 and the second sound generating apparatus 520, may be the same or substantially the same as the sound generating apparatus 500, or the first sound generating apparatus 510 and the second sound generating apparatus 520, described above with reference to FIGS. 22 to 26. Thus, repetitive descriptions thereof may be omitted.

The sound generating apparatus 500, or the first sound generating apparatus 510 and the second sound generating apparatus 520, may be configured to output a first sound S1, generated based on a vibration (or driving) of the sound generating apparatus 500, in a forward direction FD of a vibration member 100 and also to output a second sound S2, differing from the first sound S1, in an upward direction UD of the vibration member 100 (or the apparatus).

According to an example embodiment of the present disclosure, the example apparatus illustrated in FIG. 33 may be identically applied to the curved type apparatus (or a curved apparatus, or a curved type display apparatus, or a curved display apparatus, or a variable type display apparatus, or a variable display apparatus) illustrated in FIG. 29.

Figure 34:
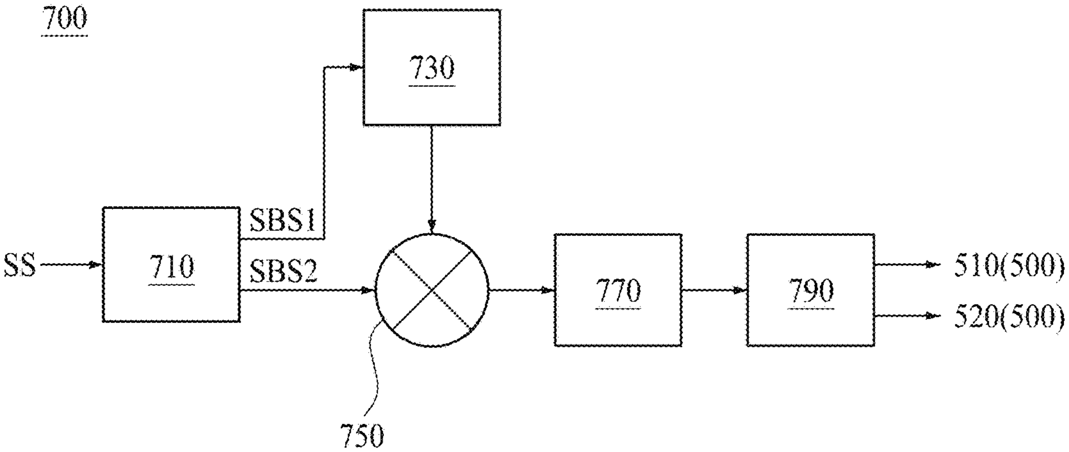
FIG. 34 illustrates a sound driving circuit part of an apparatus according to an example embodiment of the present disclosure.
Figure 35:
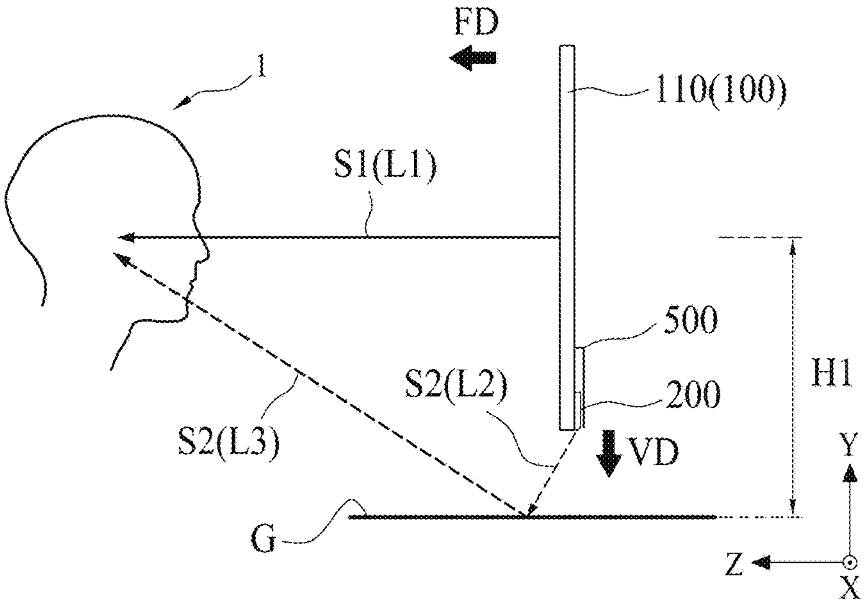
FIG. 35 illustrates a sound path of each of a first sound and a second sound output from an apparatus according to an example embodiment of the present disclosure.

FIG. 34 illustrates a sound driving circuit part of an apparatus according to an example embodiment of the present disclosure. FIG. 35 illustrates a sound path of each of a first sound and a second sound output from an apparatus according to an example embodiment of the present disclosure.

With reference to FIGS. 34 and 35, a sound driving circuit part 700 of an apparatus according to an example embodiment of the present disclosure may include a signal separation circuit 710, a delay circuit 730, a mixing circuit 750, a correction circuit 770, and a driving signal generator 790.

The signal separation circuit 710 may be configured to separate a source sound SS, input thereto, into a first pitched sound band signal SBS1 and a second pitched sound band signal SBS2, based on control by a host controller. For example, the signal separation circuit 710 may be configured to separate the source sound SS into the first pitched sound band signal SBS1 and the second pitched sound band signal SBS2 with respect to a reference frequency. For example, the reference frequency may be a frequency of about 1 kHz to about 3 kHz. For example, the signal separation circuit 710 may include a crossover circuit, but embodiments of the present disclosure are not limited thereto.

The first pitched sound band signal SBS1 may have a frequency of about 3 kHz or less. For example, the first pitched sound band signal SBS1 may correspond to the first sound S1 which is output in the forward direction FD of the vibration member 100 described above with reference to FIGS. 1 to 17, or may correspond to a rearward sound (or a reverse-phase sound) of the sound generator.

The second pitched sound band signal SBS2 may have a frequency of about 3 kHz or more. For example, the second pitched sound band signal SBS2 may correspond to the second sound S2 which is output in the vertical direction VD of the vibration member 100 described above with reference to FIGS. 1 to 17, or may correspond to a forward sound (or a reverse-phase sound) of the sound generator.

The delay circuit 730 may be configured to delay the first pitched sound band signal SBS1 putput from the signal separation circuit 710. The delay circuit 730 may delay the first pitched sound band signal SBS1 and may thus reduce or minimize a time difference (or delay time) between the first sound S1 output in the forward direction FD of the vibration member 100 and the second sound S2 output in the vertical direction VD of the vibration member 100.

The delay circuit 730 may delay the first pitched sound band signal SBS1, based on a first distance L1 by which the first sound S1 output in the forward direction FD reaches ears of a user 1, a second distance L2 by which the second sound S2 output in the vertical direction VD of the apparatus reaches the ground G, and a third distance L3 by which the second sound S2 reflected from the ground G reaches the ears of the user 1.

According to an experiment example of the present disclosure, when a distance H1 between a center portion of an apparatus and the ground G is 200 mm to 400 mm and the first distance L1 is 500 mm, the third distance L3 may be about 580 mm to about 590 mm. As another example, when the distance H1 between the center portion of the apparatus and the ground G is 200 mm to 400 mm and the first distance L1 is 800 mm, the third distance L3 may be about 850 mm to about 860 mm. According to an experiment example of the present disclosure, when the distance H1 is 500 mm, the second sound S2 may take about 1.50 μs to 1.65 μs more than the first sound S1 to reach the ears of the user 1. According to another experiment example of the present disclosure, when the first distance L1 is 800 mm, the second sound S2 may take about 2.40 μs to 2.60 μs more than the first sound S1 to reach the ears of the user 1.

The delay circuit 730 may be configured to delay the first pitched sound band signal SBS1 or the first sound S1, based on a time difference between a time in which the first sound S1 reaches the ears of the user 1 and a time in which the second sound S2 reaches the ears of the user 1. For example, the delay circuit 730 may be configured to delay the first pitched sound band signal SBS1 or the first sound S1 within a range of about 0 μs to about 2.60 μs when a distance between the ears of the user 1 and each of the vibration member 100 and the display panel 110 is about 850 mm to about 860 mm.

The mixing circuit 750 may mix the second pitched sound band signal SBS2, output from the signal separation circuit 710, with the first pitched sound band signal SBS1 delayed by the delay circuit 730 to output a mixing signal.

The correction circuit 770 may cut or amplify a frequency range of the mixing signal with respect to a reference level and may thus reinforce the sound quality of the mixing signal or improve the flatness of a sound pressure level to output the mixing signal. For example, the correction circuit 770 may amplify or attenuate the mixing signal with respect to a reference level for each frequency to output a sound correction signal. For example, the correction signal 770 may be a parametric equalizer, but embodiments of the present disclosure are not limited thereto.

The driving signal generator 790 may generate and output a driving signal (or a vibration driving signal or a voice signal), based on the sound correction signal supplied from the correction circuit 770. For example, the driving signal generator 790 may generate and output a first driving signal and a second driving signal, based on the sound correction signal supplied from the correction circuit 770. For example, the first driving signal may be applied to the first sound generating apparatus 510 of the sound generating apparatus 500, and the second driving signal may be applied to the second sound generating apparatus 520 of the sound generating apparatus 500. But embodiments of the present disclosure are not limited thereto, for example, the first driving signal may be applied to the second sound generating apparatus 520 of the sound generating apparatus 500, and the second driving signal may be applied to the first sound generating apparatus 510 of the sound generating apparatus 500.

The sound driving circuit part 700 according to an example embodiment of the present disclosure may delay the first pitched sound band signal SBS1 or the first sound S1, based on a time difference between a time in which the first sound S1 reaches the ears of the user 1 and a time in which the second sound S2 reaches the ears of the user 1, thereby enhancing the quality of a sound provided to the user 1.

Figure 36:
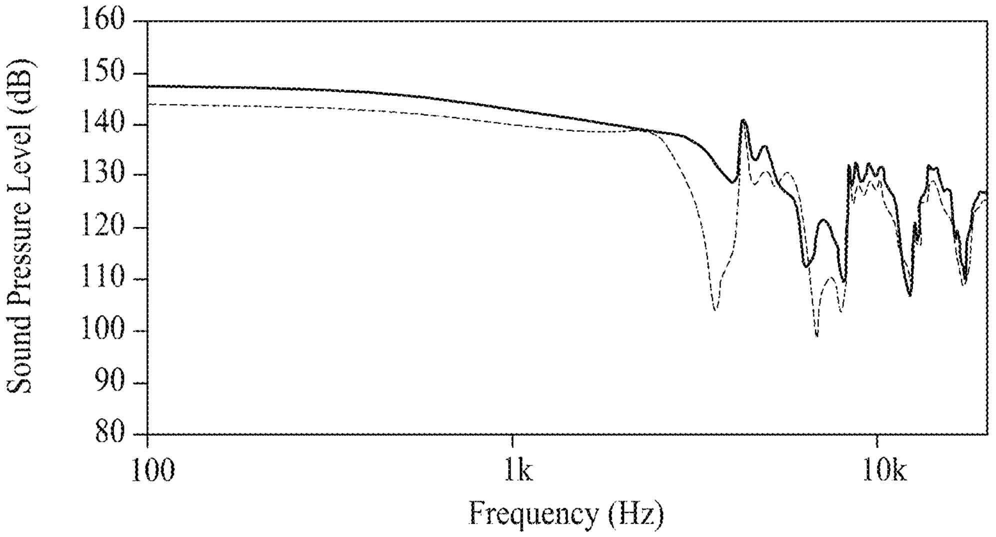
FIG. 36 illustrates a sound output characteristic of an apparatus according to an example embodiment of the present disclosure.

FIG. 36 illustrates a sound output characteristic of an apparatus according to an example embodiment of the present disclosure. FIG. 36 shows a sound output characteristic of a second sound with respect to a slope of the second supporting part of the sound guide member described above with reference to FIGS. 7 to 12. In FIG. 36, the abscissa axis represents a frequency in hertz (Hz), and the ordinate axis represents a sound pressure level (SPL) in decibels (dB). In FIG. 36, a dotted line represents a sound output characteristic when the slope of the second supporting part is about 0 degrees, and a thick solid line represents a sound output characteristic when the slope of the second supporting part is about 10 degrees.

As seen in FIG. 36, in comparison with the dotted line, the thick solid line has one or more of peaks and dips reduced in a range of about 3 kHz to about 10 kHz. Thus, each of a highest sound pressure level and a lowest sound pressure level may be reduced, thereby enhancing the flatness of a sound pressure level.

Figure 37:
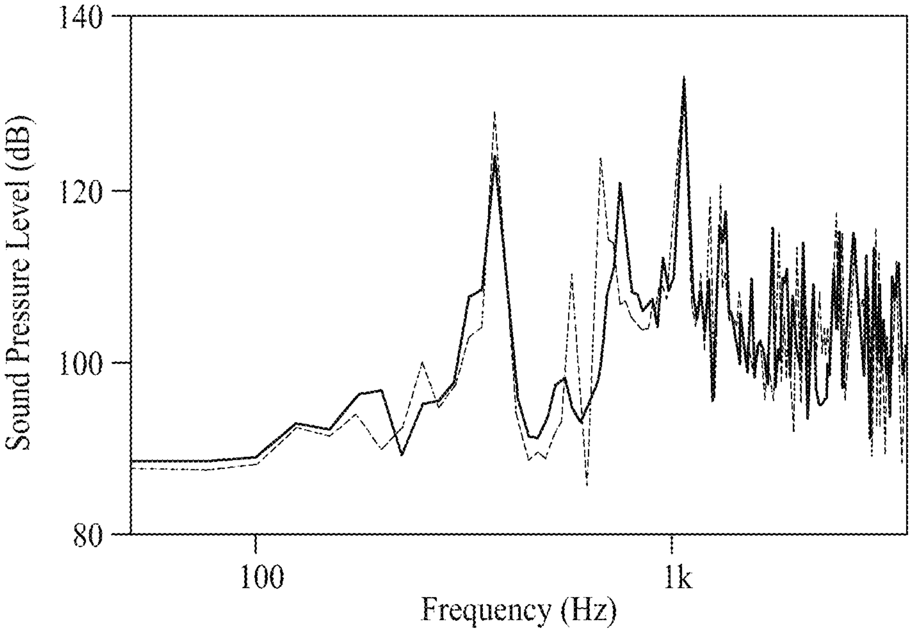
FIG. 37 illustrates a sound output characteristic of an apparatus according to an example embodiment of the present disclosure.

FIG. 37 illustrates a sound output characteristic of an apparatus according to an example embodiment of the present disclosure. FIG. 37 shows a sound output characteristic of a second sound with respect to an open structure of a hole part or a closed structure of the hole part in the circuit cover described above with reference to FIGS. 7 to 12. In FIG. 37, the abscissa axis represents a frequency in hertz (Hz), and the ordinate axis represents a sound pressure level (SPL) in decibels (dB).

In FIG. 37, a thick solid line shows a sound output characteristic of a second sound in an apparatus according to an example embodiment of the present disclosure which includes a hole part of a circuit cover. A dotted line shows a sound output characteristic of a second sound in an apparatus according to an experiment example which does not include a hole part of a circuit cover.

As seen in FIG. 37, in comparison with the dotted line, in the thick solid line has one or more of peaks and dips reduced in a range of about 3 kHz or less. Thus, each of a highest sound pressure level and a lowest sound pressure level may be reduced, thereby enhancing the flatness of a sound pressure level.

An apparatus according to one or more example embodiments of the present disclosure are described below.

An apparatus according to one or more embodiments of the present disclosure may comprise a vibration member, a supporting member at a rear surface of the vibration member, and a sound generating apparatus at a rear surface of the supporting member. The sound generating apparatus may be configured to output a first sound in a first direction and to output a second sound in a second direction different from the first direction.

According to one or more embodiments of the present disclosure, the first direction may be a forward direction of the vibration member and the second direction may be a direction vertical to the first direction and may be a vertical direction parallel with the vibration member in an up or down direction.

According to one or more embodiments of the present disclosure, the first sound and the second sound may have different phases from each other or may have different sound bands from each other.

According to one or more embodiments of the present disclosure, the first sound may have a first phase, and the second sound may have a second phase opposite to the first phase.

According to one or more embodiments of the present disclosure, the sound generating apparatus may comprise a sound generator configured to generate the first sound and the second sound, and a sound guide member configured to guide the second sound generated from the sound generator to be output in the second direction, the second direction being different from the first direction of the vibration member.

According to one or more embodiments of the present disclosure, the sound guide member may comprise a guide part at the rear surface of the supporting member and a guide tip at an end thereof pointing toward the rear surface of the supporting member.

According to one or more embodiments of the present disclosure, the sound generator may comprise a vibration plate, and the vibration plate may face the sound guide member or may face the rear surface of the supporting member.

According to one or more embodiments of the present disclosure, the apparatus may further comprise a driving circuit part at the rear surface of the supporting member, the driving circuit part including a printed circuit board connected to the vibration member and a circuit cover at the rear surface of the supporting member, the circuit cover covering the printed circuit board.

According to one or more embodiments of the present disclosure, the sound generating apparatus may be configured to overlap the rear surface of the supporting member and the circuit cover.

According to one or more embodiments of the present disclosure, the circuit cover may comprise one or more holes through for outputting the second sound.

According to one or more embodiments of the present disclosure, the apparatus may further comprise a noise reduction part connected to the circuit cover.

According to one or more embodiments of the present disclosure, a space is provided between the circuit cover and the printed circuit board for outputting the second sound in the second direction.

According to one or more embodiments of the present disclosure, the sound generating apparatus may comprise a case member disposed at the rear surface of the supporting member, the case member including an accommodating hole; a sound generator accommodated into the accommodating hole of the case member to output the first sound and the second sound; and a sound guide member connected to the case member covering the sound generator and overlap a portion of the circuit cover. A space may be formed between the circuit cover and the sound guide member to output the second sound therethrough.

According to one or more embodiments of the present disclosure, the circuit cover may comprise a first cover part covering the printed circuit board, a second cover part extending the first cover part toward the rear surface of the supporting member, the second cover part being inclined with respect to at least one of the first cover part and the rear surface of the supporting member, and one or more holes formed in the second cover part. A portion of the second sound may be output through the one or more holes in the second cover part.

According to one or more embodiments of the present disclosure, the sound generator may comprise a base frame connected to the case member; a magnetic circuit part disposed at the base frame, the magnetic circuit part including a bobbin; a vibration plate connected to the bobbin; and a suspension connected between the vibration plate and the base frame.

According to one or more embodiments of the present disclosure, the sound guide member may comprise a first guide part overlapping the vibration plate and being an inclined with respect to the vibration plate, a second guide part extending from the first guide part to overlap the suspension, and a third guide part extending from the second guide part and overlapping the rear surface of the supporting member.

According to one or more embodiments of the present disclosure, the case member may comprise a first supporting part including an accommodating hole; a second supporting part configured along a periphery portion of a first surface of the first supporting part and connected to the first guide part; a third supporting part configured along a periphery portion of a second surface of the first supporting part and connected to the rear surface of the supporting member; and a pair of extension parts extending from the second supporting part to overlap the circuit cover, the pair of extending parts being connected to the third guide part.

According to one or more embodiments of the present disclosure, the second supporting part may include a pair of rectilinear portions parallel with each other and a circumference portion connected between the pair of rectilinear portions.

According to one or more embodiments of the present disclosure, the case member may further comprise a tilt part. The tilt part may be inclined toward the rear surface of the supporting member from a lateral surface of the first supporting part.

According to one or more embodiments of the present disclosure, a first sound guide space may be formed between respective inclined surfaces of the tilt part and the second guide part.

According to one or more embodiments of the present disclosure, the third guide part may be spaced apart from the first cover part of the circuit cover by the pair of extension parts. A second sound guide space may be formed between the third guide part and the first cover part of the circuit cover.

According to one or more embodiments of the present disclosure, the case member may further comprise one or more lateral holes formed to pass through the third supporting part.

According to one or more embodiments of the present disclosure, the supporting member may comprise a rear part covering the rear surface of the vibration member and configured to support the sound generating apparatus; and a first hole formed in the rear part and overlapping the sound generator.

According to one or more embodiments of the present disclosure, the supporting member may further comprise one or more second holes in the rear part at a periphery of the first hole, the one or more second holes overlapping the sound generating apparatus.

According to one or more embodiments of the present disclosure, the sound generating apparatus may comprise a case member disposed at the rear surface of the supporting member, a sound guide member covering the case member and including a through hole, and a sound generator connected to the sound guide member to overlap the through hole and configured to output the first sound to the rear surface of the supporting member.

According to one or more embodiments of the present disclosure, the supporting member may comprise a rear part covering the rear surface of the vibration member and configured to support the sound generating apparatus; and a protrusion part protruding from the rear part toward the sound generator and overlapping the sound generator, the protrusion part being inclined with respect to the rear part.

According to one or more embodiments of the present disclosure, the supporting member may further comprise one or more holes at one side of the protrusion part.

According to one or more embodiments of the present disclosure, the protrusion part may include a first slope portion and a second slope portion, the first slope portion overlapping with the sound generator, and the one or more holes being at the second slope portion.

According to one or more embodiments of the present disclosure, the supporting member may comprise a rear part covering the rear surface of the vibration member and configured to support the sound generating apparatus; and a sound guide surface at a periphery portion of the rear part to be inclined toward the sound guide member from the rear part. The sound guide surface may be overlap a portion of the sound guide member.

According to one or more embodiments of the present disclosure, the sound guide member may comprise a first guide part including the through hole and configured to support the sound generator, a second guide part extending from the first guide part, and a third guide part extending from the second guide part. The second guide part may overlap the circuit cover. The third guide part may overlap the circuit cover.

According to one or more embodiments of the present disclosure, the sound guide member may further include a guide tip overlapping the circuit cover. The guide tip may provide a sound emitting space.

According to one or more embodiments of the present disclosure, the first guide part may be spaced apart from the sound generator by the second supporting part. A space may be formed between the first guide part and the first supporting part. A sound generated in the space may be configured to output in the second direction.

According to one or more embodiments of the present disclosure, at least one of the second guide part and the third guide part may be accommodated in the circuit cover and are may be configured to support the printed circuit board.

According to one or more embodiments of the present disclosure, the sound guide member may comprise a first guide part including the through hole and configured to support the sound generator, a second guide part overlapping the rear surface of the supporting member and extending from the first guide part, and a third guide part overlapping a rear periphery portion of the supporting member and extending from the second guide part.

According to one or more embodiments of the present disclosure, the sound guide member may further include a guide tip overlapping the circuit cover. The guide tip may provide a sound emitting space.

According to one or more embodiments of the present disclosure, the sound generating apparatus may comprise a sound generator configured to generate the first sound and the second sound, and a sound guide member configured to guide the second sound generated from the sound generator toward in the second direction.

According to one or more embodiments of the present disclosure, the sound guide member may comprise a guide part at the rear surface of the supporting member, and a guide tip at an end thereof pointing toward the rear surface of the supporting member.

According to one or more embodiments of the present disclosure, the sound generator may comprise a vibration plate, and the vibration plate may face the sound guide member or face the rear surface of the supporting member.

According to one or more embodiments of the present disclosure, the vibration member may comprise a display panel including a plurality of pixels configured to display an image, and a backlight between the display panel and the supporting member.

According to one or more embodiments of the present disclosure, the sound generating apparatus may output the second sound in an upward direction or a downward direction of the vibration member.

According to one or more embodiments of the present disclosure, the sound generating apparatus may be configured to output the second sound through the circuit cover.

According to one or more embodiments of the present disclosure, the second sound may be output in a downward direction of the supporting member through a sound path between the circuit cover and the printed circuit board.

According to one or more embodiments of the present disclosure, the circuit cover may comprise one or more first holes between the sound generating apparatus and the sound path, and one or more second holes connecting the sound path to the exterior of the apparatus.

According to one or more embodiments of the present disclosure, the sound generating apparatus may comprise a sound generator configured to generate the first sound and the second sound, and a sound guide member configured to guide the second sound generated from the sound generator in a vertical direction.

According to one or more embodiments of the present disclosure, the apparatus may further comprise a driving circuit part at the rear surface of the supporting member, the driving circuit part including a printed circuit board connected to the vibration member; and a circuit cover at the rear surface of the supporting member, the circuit cover covering the printed circuit board, and the sound guide member may be configured outside or inside the circuit cover.

According to one or more embodiments of the present disclosure, the sound guide member may be configured to cover the sound generator and the circuit cover.

According to one or more embodiments of the present disclosure, the sound guide member may comprise a first surface covering the sound generator and a second surface covering the circuit cover.

According to one or more embodiments of the present disclosure, the second surface of the sound guide member may be spaced apart from the circuit cover.

According to one or more embodiments of the present disclosure, the sound guide member may further comprise a guide tip protruding from the second surface to the circuit cover.

According to one or more embodiments of the present disclosure, the sound guide member may further comprise a third surface inclined between the first surface and the second surface.

According to one or more embodiments of the present disclosure, the sound generator may comprise a base member connected to the supporting member, a bobbin on the base member, a magnet provided at an inner side or an outer side of the bobbin, a coil wound around the bobbin, a damper connected between the base member and the bobbin, and a vibration plate connected to the bobbin, the third surface of the sound guide member may overlap the damper.

According to one or more embodiments of the present disclosure, the sound generator may comprise a base member connected to the supporting member, a bobbin on the base member, a magnet provided at an inner side or an outer side of the bobbin, a coil wound around the bobbin, a vibration plate connected to the bobbin, and a damper connected between the base member and the vibration plate.

According to one or more embodiments of the present disclosure, the vibration plate of the sound generator may comprise a first vibration plate connected to the bobbin and a second vibration plate adjacent to the first vibration plate.

According to one or more embodiments of the present disclosure, the second vibration plate may surround the first vibration plate.

According to one or more embodiments of the present disclosure, the vibration plate of the sound generator may be disposed toward the supporting member or may be disposed in a direction opposite to a direction toward the supporting member.

According to one or more embodiments of the present disclosure, the supporting member may comprise a sound guide surface overlapping the sound guide member.

According to one or more embodiments of the present disclosure, the supporting member may comprise a rear part connected to the sound generating apparatus and a stiffness reinforcement part configured at a periphery portion of the rear part, and the sound guide surface may be configured to be inclined between the rear part and the stiffness reinforcement portion.

According to one or more embodiments of the present disclosure, the sound generating apparatus may further comprise a sound guide member supporting the sound generator and guiding an output direction of the second sound.

According to one or more embodiments of the present disclosure, the sound guide member may be configured to cover the reinforcement part of the supporting member.

According to one or more embodiments of the present disclosure, the sound guide member may be configured between a rear surface of the supporting member and the circuit cover.

According to one or more embodiments of the present disclosure, the sound guide member may be configured between a rear surface of the supporting member and the printed circuit board.

According to one or more embodiments of the present disclosure, the apparatus may further comprise a damping member (or a noise reduction part) connected to a rear surface of the supporting member.

According to one or more embodiments of the present disclosure, the damping member may comprise a damping part spaced apart from a rear surface of the supporting member, and the damping part may be configured to vibrate based on a vibration of the supporting member.

According to one or more embodiments of the present disclosure, the damping member may comprise a mass part connected to the damping part.

According to one or more embodiments of the present disclosure, the mass part may comprise a mass structure having a metal material or a nonmetal material.

According to one or more embodiments of the present disclosure, the mass part may comprise a hemming part which is bent once or more from the damping part.

According to one or more embodiments of the present disclosure, the damping part may extend from the circuit cover.

According to one or more embodiments of the present disclosure, the damping member may further comprise a fixing member to fix an area between the damping part and the circuit cover to a rear surface of the supporting member.

According to one or more embodiments of the present disclosure, the apparatus may further comprise a damping member (or a noise reduction part) connected to the circuit cover.

A sound generating apparatus according to one or more example embodiments of the present disclosure may be applied to or included in a sound vibration generating apparatus or a vibration generating apparatus which is disposed at an apparatus. The apparatus according to one or more example embodiments of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. In addition, the sound generating apparatus according to one or more example embodiments of the present disclosure may be applied to or included in organic light-emitting lighting apparatuses or inorganic light-emitting lighting apparatuses. Where the sound generating apparatus is applied to or included in lighting apparatuses, the lighting apparatuses may function as lighting and a speaker. In addition, where the sound apparatus according to one or more example embodiments of the present disclosure is applied to or included in a mobile device, or the like, the sound generating apparatus may be one or more of a speaker, a receiver, and a haptic device, but embodiments of the present disclosure are not limited thereto.

It will be apparent to those skilled in the art that various modifications and variations can be made in the present disclosure without departing from the scope of the present disclosure. Thus, it is intended that the present disclosure covers the modifications and variations of this disclosure provided they come within the scope of the appended claims and their equivalents.

What is claimed is:

1. An apparatus, comprising:

a vibration member;

a supporting member at a rear surface of the vibration member;

a sound generating apparatus at a rear surface of the supporting member;

a driving circuit part at the rear surface of the supporting member, the driving circuit part including a printed circuit board connected to the vibration member; and a circuit cover at the rear surface of the supporting member, the circuit cover covering the printed circuit board, wherein the sound generating apparatus is configured to output a first sound in a first direction and to output a second sound in a second direction different from the first direction, wherein the sound generating apparatus comprises:

a case member disposed at the rear surface of the supporting member, the case member including an accommodating hole;

a sound generator accommodated into the accommodating hole of the case member and configured to output the first sound and the second sound; and a sound guide member connected to the case member covering the sound generator and a portion of the circuit cover, and wherein a space is formed between the circuit cover and the sound guide member to output the second sound therethrough.

2. The apparatus of claim 1, wherein the circuit cover comprises:

a first cover part covering the printed circuit board;

a second cover part extending the first cover part toward the rear surface of the supporting member, the second cover part being inclined with respect to at least one of the first cover part and the rear surface of the supporting member; and one or more holes formed in the second cover part, and wherein a portion of the second sound is output through the one or more holes in the second cover part in the second cover part.

3. The apparatus of claim 2, wherein the sound generator comprises:

a base frame connected to the case member;

a magnetic circuit part disposed at the base frame, the magnetic circuit part including a bobbin;

a vibration plate connected to the bobbin; and a suspension connected between the vibration plate and the base frame.

4. The apparatus of claim 3, wherein the sound guide member comprises:

a first guide part overlapping the vibration plate and being inclined with respect to the vibration plate;

a second guide part extending from the first guide part and overlapping the suspension; and a third guide part extending from the second guide part and overlapping the rear surface of the supporting member.

5. The apparatus of claim 4, wherein the case member comprises:

a first supporting part including an accommodating hole;

a second supporting part configured along a periphery portion of a first surface of the first supporting part and connected to the first guide part;

a third supporting part configured along a periphery portion of a second surface of the first supporting part and connected to the rear surface of the supporting member; and a pair of extension parts extending from the second supporting part to overlap the circuit cover, the pair of extending parts being connected to the third guide part.

6. The apparatus of claim 5, wherein the second supporting part includes a pair of rectilinear portions parallel with each other and a circumference portion connected between the pair of rectilinear portions.

7. The apparatus of claim 5, wherein the case member further comprises a tilt part, and wherein the tilt part is inclined toward the rear surface of the supporting member from a lateral surface of the first supporting part.

8. The apparatus of claim 7, wherein a first sound guide space is formed between respective inclined surfaces of the tilt part and the second guide part.

9. The apparatus of claim 5, wherein the third guide part is spaced apart from the first cover part of the circuit cover by the pair of extension parts, and wherein a second sound guide space is formed between the third guide part and the first cover part of the circuit cover.

10. The apparatus of claim 5, wherein the case member further comprises one or more lateral holes formed to pass through the third supporting part.

* * * * *